United States Patent
Biggs

(10) Patent No.: US 10,390,139 B2
(45) Date of Patent: Aug. 20, 2019

(54) APPARATUS AND METHODS FOR AUDIO-TACTILE SPATIALIZATION OF SOUND AND PERCEPTION OF BASS

(71) Applicant: Taction Technology Inc., Los Gatos, CA (US)

(72) Inventor: Silmon James Biggs, Los Gatos, CA (US)

(73) Assignee: Taction Technology, Inc., Los Gatos, CA (US)

( * ) Notice: Subject to any disclaimer, the term of this patent is extended or adjusted under 35 U.S.C. 154(b) by 21 days.

(21) Appl. No.: 15/268,423

(22) Filed: Sep. 16, 2016

(65) Prior Publication Data

US 2017/0180863 A1 Jun. 22, 2017

Related U.S. Application Data

(60) Provisional application No. 62/219,371, filed on Sep. 16, 2015.

(51) Int. Cl.
| | |
|---|---|
| *H04R 5/033* | (2006.01) |
| *B06B 1/04* | (2006.01) |
| *H04R 1/10* | (2006.01) |
| *H04S 1/00* | (2006.01) |
| *G06F 3/01* | (2006.01) |
| *H04R 9/06* | (2006.01) |

(52) U.S. Cl.
CPC .............. *H04R 5/033* (2013.01); *B06B 1/045* (2013.01); *G06F 3/011* (2013.01); *G06F 3/016* (2013.01); *H04R 1/1075* (2013.01); *H04S 1/005* (2013.01); *H04R 9/06* (2013.01); *H04R 2460/13* (2013.01); *H04S 2400/11* (2013.01)

(58) Field of Classification Search
None
See application file for complete search history.

(56) References Cited

U.S. PATENT DOCUMENTS

| | | |
|---|---|---|
| 5,717,767 A | 2/1998 | Inanaga et al. |
| 6,603,863 B1 | 8/2003 | Nagayoshi |

(Continued)

FOREIGN PATENT DOCUMENTS

| | | |
|---|---|---|
| EP | 0 204 386 | 12/1986 |
| EP | 1 282 338 | 2/2003 |

(Continued)

OTHER PUBLICATIONS

R. Verillo, et al., "Sensation magnitude of vibrotactile stimuli", Perception and Psychophysics 61: 300-372 (1960).

(Continued)

*Primary Examiner* — Paul W Huber
(74) *Attorney, Agent, or Firm* — Knobbe, Martens, Olson & Bear, LLP

(57) ABSTRACT

The apparatus and methods of the present invention provide quiet, compact, robust hardware that can accurately produce a wide range of tactile frequencies at a perceptually constant intensity. For greater expressiveness, some apparatus for moving the skin in multiple axes are also disclosed. Signal processing methods are presented to enhance the user's experience of audio spatialization. The methods transform audio signals into directional tactile cues matched to the time resolution of the skin, and which exploit directional tactile illusions.

16 Claims, 38 Drawing Sheets

(56) References Cited

U.S. PATENT DOCUMENTS

| | | |
|---|---|---|
| 8,502,864 B1 | 8/2013 | Watkins |
| 8,767,996 B1 | 7/2014 | Lin |
| 8,977,376 B1 | 3/2015 | Lin |
| 9,106,986 B2 | 8/2015 | Shen |
| 9,107,011 B2 | 8/2015 | Broadley |
| 9,277,320 B1 | 3/2016 | Hoskins |
| 9,277,334 B1 | 3/2016 | Wong |
| 9,430,921 B2 | 8/2016 | Biggs |
| 2003/0015929 A1 | 1/2003 | Lee |
| 2006/0045298 A1 | 3/2006 | Westerkull |
| 2006/0293722 A1 | 12/2006 | Slatkine et al. |
| 2007/0146317 A1 | 6/2007 | Schena |
| 2007/0270196 A1* | 11/2007 | Wu .................. H04M 1/05 455/575.2 |
| 2007/0290988 A1 | 12/2007 | Nogami et al. |
| 2008/0090622 A1 | 4/2008 | Kim |
| 2008/0096726 A1 | 4/2008 | Riley |
| 2008/0194962 A1 | 8/2008 | Randall |
| 2009/0036212 A1 | 2/2009 | Provancher |
| 2010/0134225 A1 | 6/2010 | Yajima et al. |
| 2010/0141408 A1* | 6/2010 | Doy .................. G06F 3/016 340/407.2 |
| 2010/0316235 A1 | 12/2010 | Park |
| 2012/0025742 A1 | 2/2012 | Masahiko |
| 2012/0027222 A1 | 2/2012 | Kirsch |
| 2012/0163269 A1 | 6/2012 | Shuster |
| 2012/0249797 A1 | 10/2012 | Haddick |
| 2013/0022220 A1 | 1/2013 | Dong |
| 2013/0204169 A1 | 8/2013 | Poepperling et al. |
| 2013/0225915 A1 | 8/2013 | Redfield et al. |
| 2013/0339850 A1 | 12/2013 | Hardi |
| 2013/0342521 A1 | 12/2013 | Griffiths |
| 2014/0056459 A1 | 2/2014 | Oishi et al. |
| 2014/0064536 A1 | 3/2014 | Kim et al. |
| 2014/0125558 A1 | 5/2014 | Miyajima |
| 2015/0070274 A1 | 3/2015 | Morozov |
| 2015/0081110 A1 | 3/2015 | Houston et al. |
| 2015/0110277 A1 | 4/2015 | Pidgeon |
| 2015/0181338 A1 | 6/2015 | Hosoi et al. |
| 2015/0195663 A1 | 7/2015 | Lin et al. |
| 2015/0242608 A1 | 8/2015 | Kim |
| 2015/0289034 A1 | 10/2015 | Engman |
| 2015/0319546 A1 | 11/2015 | Sprague |
| 2016/0173318 A1 | 6/2016 | Ha |
| 2016/0209648 A1 | 7/2016 | Haddick |
| 2016/0212515 A1 | 7/2016 | Biggs |
| 2016/0234588 A1 | 8/2016 | Timothy |
| 2017/0059871 A1 | 3/2017 | Hashiba |
| 2017/0123499 A1 | 5/2017 | Eid |
| 2017/0171666 A1 | 6/2017 | Biggs |
| 2017/0180863 A1 | 6/2017 | Biggs |
| 2017/0227778 A1* | 8/2017 | Osterhout .......... G02B 27/0176 |

FOREIGN PATENT DOCUMENTS

| | | |
|---|---|---|
| WO | WO 2006/001436 | 1/2006 |
| WO | WO 2012/173669 | 12/2012 |
| WO | WO 2013/0134388 | 9/2013 |
| WO | WO 2016/007920 | 1/2016 |

OTHER PUBLICATIONS

International Search Report, Application No. PCT/US2015/051888, dated Sep. 24, 2015.

International Search Report, Application No. PCT/US2016/052347, dated Jan. 27, 2017.

Verillo, et al., "Sensation magnitude of vibrotactile stimuli", Perception and Psychophysics 61: 300-372 (1960).

International Search Report PCT Application No. PCT/US2016/052347, dated Jan. 27, 2017.

European Search Report for Application No. 15843916.6, dated Apr. 20, 2018.

* cited by examiner

PRIOR ART

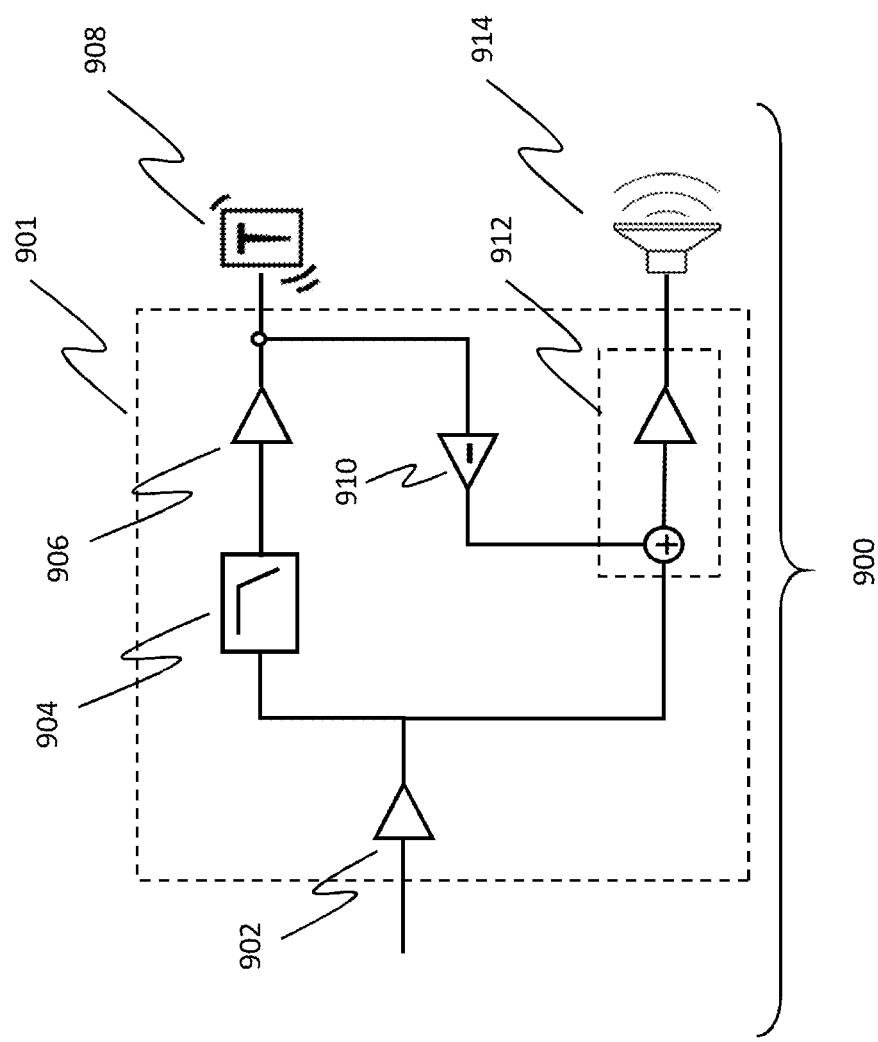

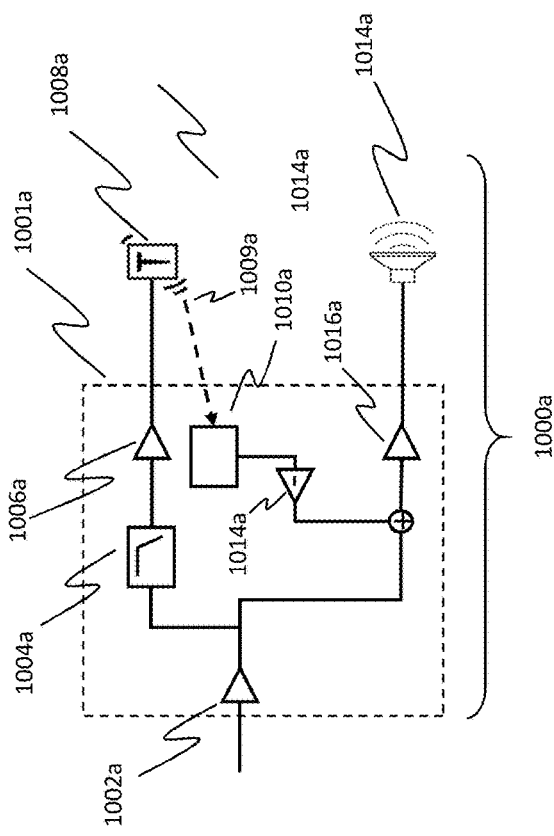
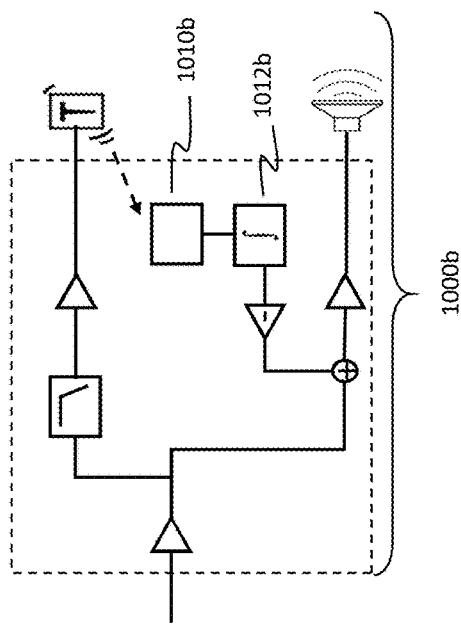

Fig. 20

```
                    2002      2004
        2006
function [ y ] = directed(x, z, f, dt)
%
% [ y ] = directed(x, z, f, dt)
%
% directed.m sharpens an audio signal to give it a directed tactile feeling
% using the pseudo-attraction illusion. It's suitable for systems where
% signal (input) scales the velocity (output) of the tactile system.
% it can process long vector of data (offline), or for real time
% it can operate on just 2 points: [x(i); x(i-1)].
%
% x = [Nx1]input signal [V]
% z = [#] direction and size of effect, typically (-1<z<1),
% f = [Hz] fundamental freq being filtered (be within ~2x for good results)
% dt =[sec/sample] sampling interval
%
% how it works:
% Adds first 2 harmonics of sawtooth to signal
%
% v = dx/dt; turns sin(x) --> cos(x)
% harm2 by dbl angle formula: sin2x=sinxcosx = x*v
% harm3 by AM modulating harm2 -> sideband at f=f(harm2)+f(harm1)
%
% Copyright 2015, S. James Biggs, Ph.D., all rights reserved omega = 2*pi*f;

v = [0; diff(x)]./dt;
harm2 = 2*x.*v./omega;

if z>0,
    harm3 = v.*harm2./omega;
end if z<0,
    harm3 = -v.*harm2./omega;
end y = 0.7*x + z*(0.4*harm2 + 0.3* harm3);

end
```

Fig. 23

2301
if(x(i)>0)&(x(i-1)<0),
  upzerocross=1;
else,
  upzerocross=0;
end
2302

2304
if (telapsed>tmin) & (upzerocross),
  x=x+(z*bump(i))
  i++
  telapsed++
end 2306
if (i)> bump_length,
  i = 1
  upzerocross = 0
  telapsed = 0
end

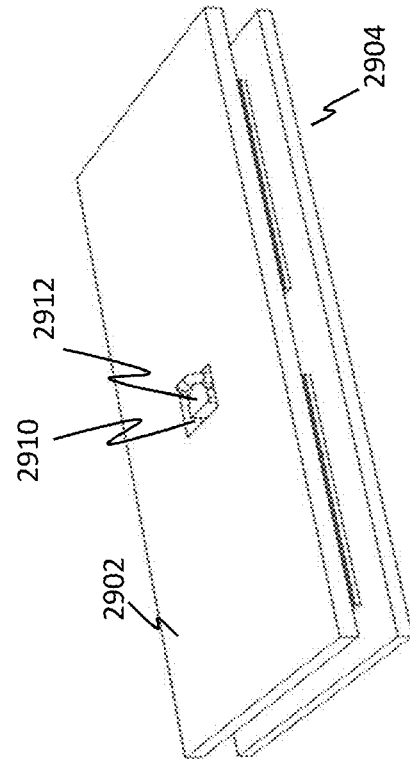
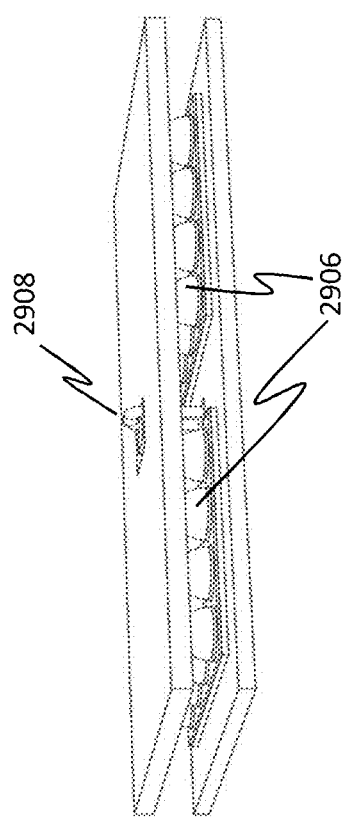
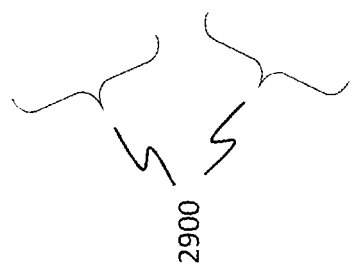
Fig. 29a
Fig. 29b

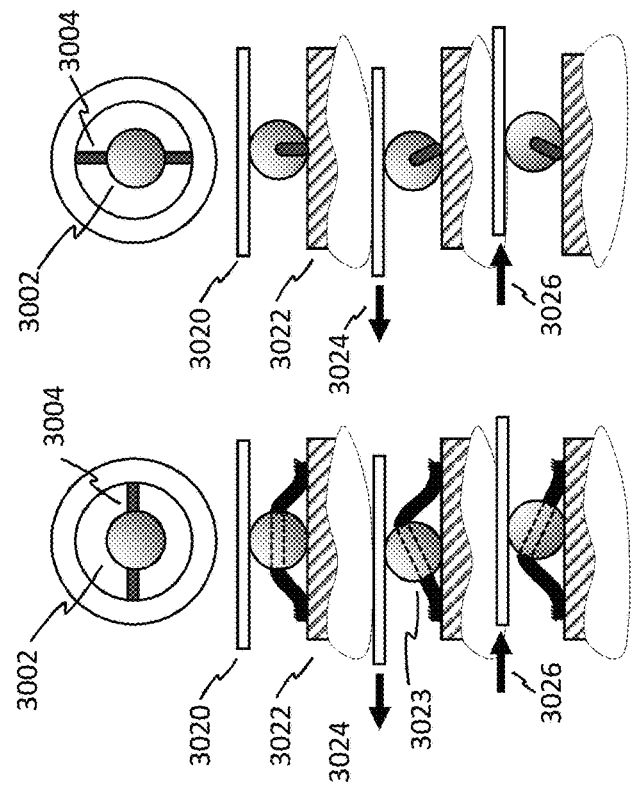
Fig. 30d
Fig. 30c
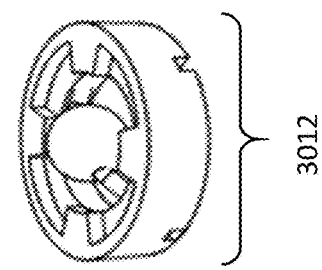
Fig. 30b
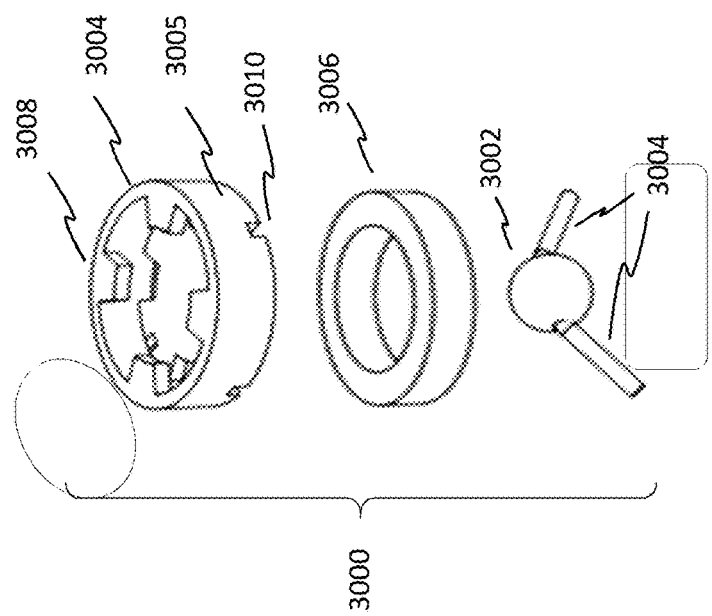
Fig. 30a

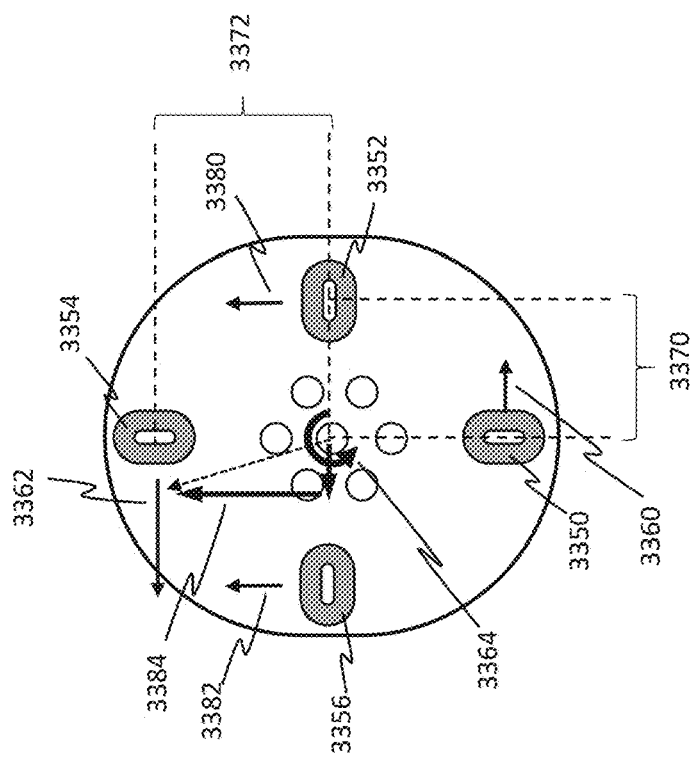
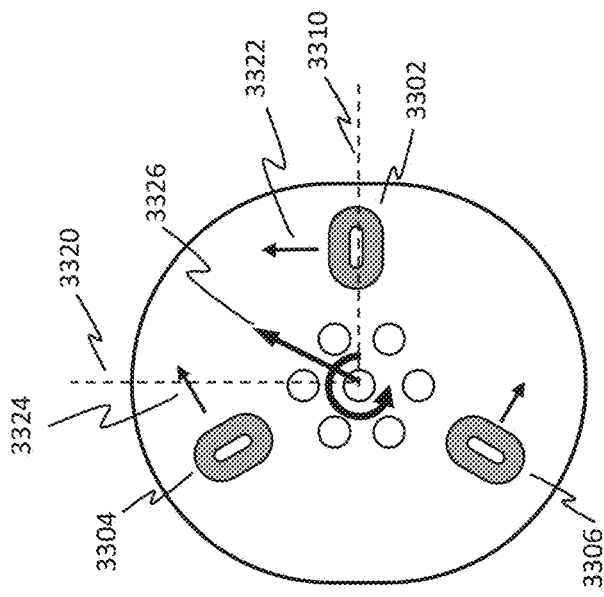
Fig. 33b
Fig. 33a

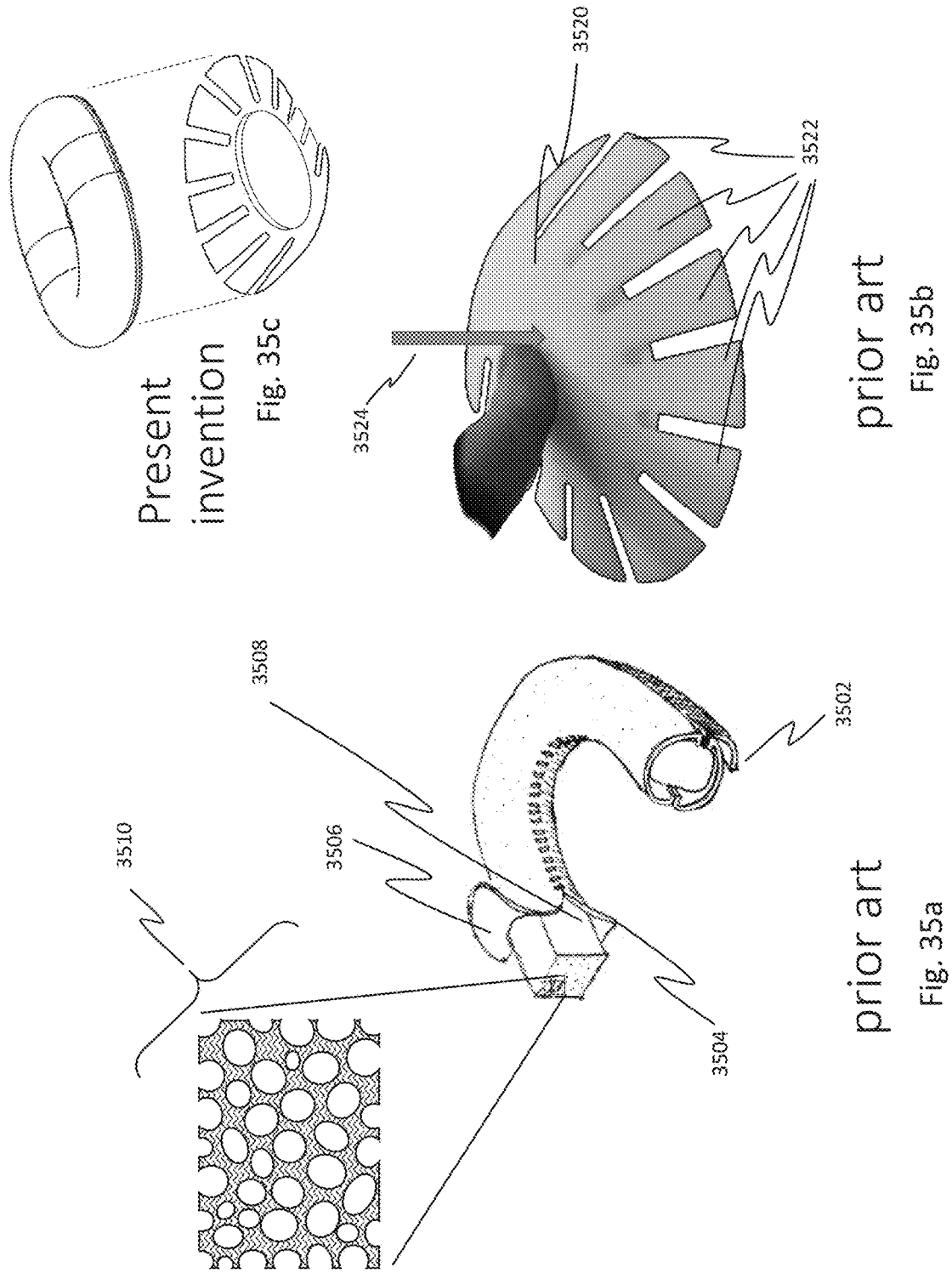

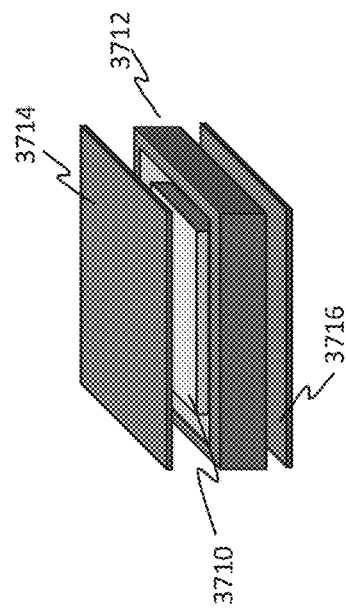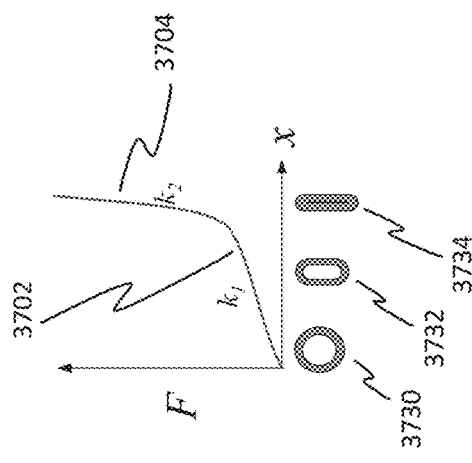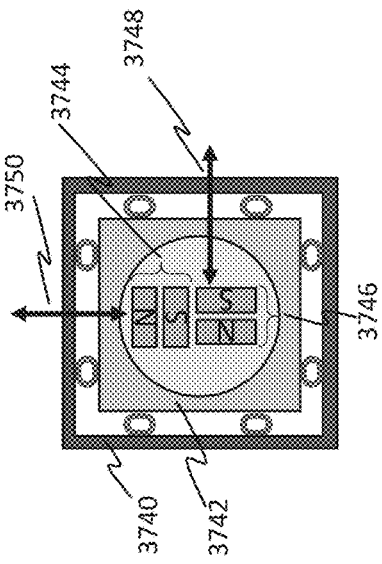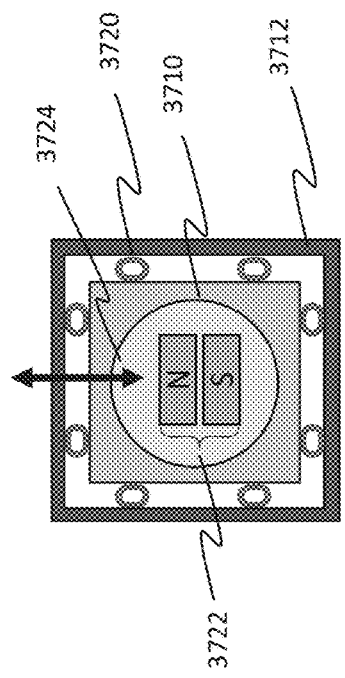

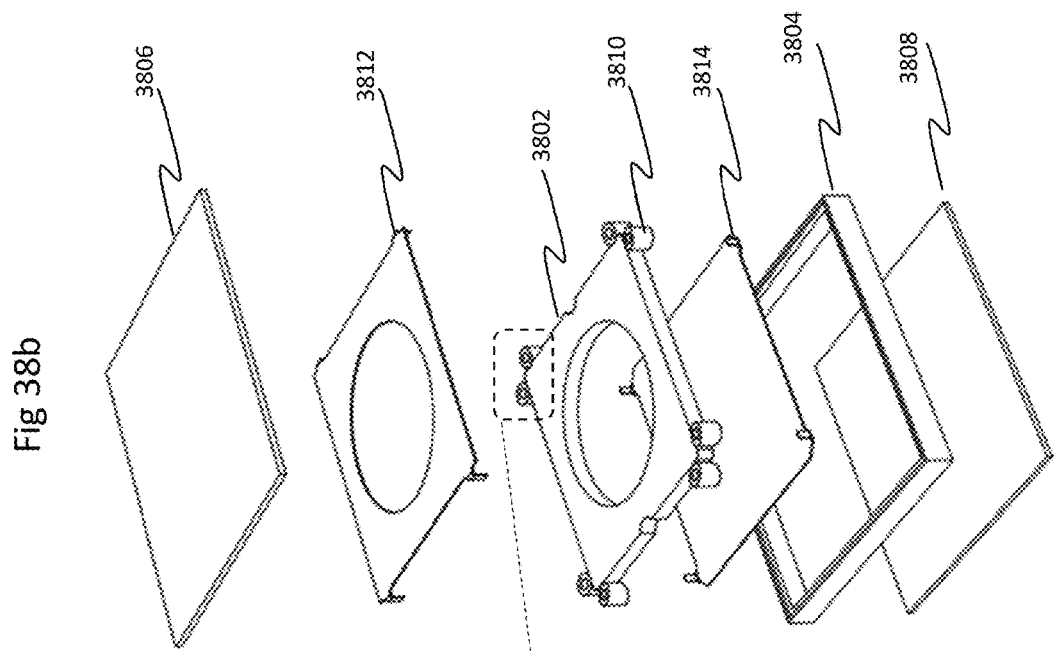
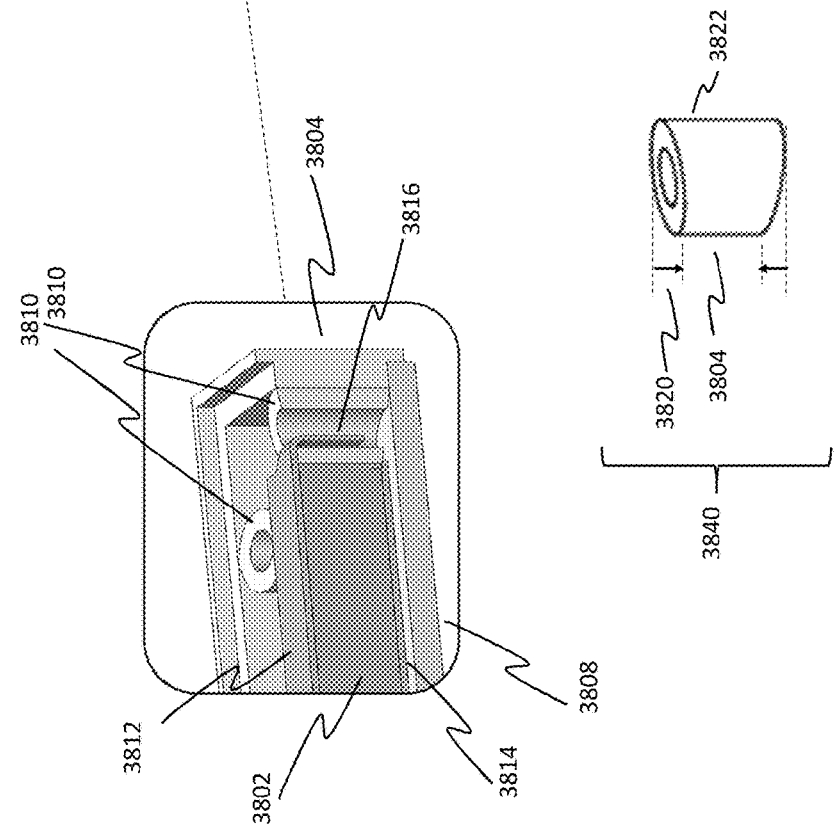
Fig 38b
Fig 38a

APPARATUS AND METHODS FOR AUDIO-TACTILE SPATIALIZATION OF SOUND AND PERCEPTION OF BASS

BACKGROUND OF THE INVENTION

Audio spatialization is of interest to many headphone users, such as gamers (where is my opponent?), audiophiles (where is the cello?), and pilots (where is ground control?), for example. Location cues can be rendered through conventional headphones to signal, for example, the location of an opponent's footsteps in a video game. The normal human array of two ears, the complex shape of the pinnae, and the computational capacities of the rest of auditory system provide sophisticated tools for sound localization.

These tools include head related transfer function (HRTF), which describes how a given sound wave input (parameterized as frequency and source location) is filtered by the diffraction and reflection properties of the head, pinna, and torso, before the sound reaches the transduction machinery of the eardrum and inner ear; interaural time difference (ITD) (when one ear is closer to the source of the sound waves than the other, the sound will arrive at the closer ear sooner than it will at the ear that is farther from the sound source); and interaural level difference (ILD) (because sound pressure falls with distance, the closer ear will receive a stronger signal than the more distant ear). Together these cues permit humans and other animals to quickly localize sounds in the real world that can indicate danger and other significant situations. However, in the artificial environment of reproduced sound, and particularly sound reproduced through headphones, localization can be more challenging.

Presenting additional information through taction can provide another means for enhancing the perception of sound location.

SUMMARY OF THE DISCLOSURE

Apparatus and methods for audio-tactile spatialization of sound and perception of bass are disclosed. The apparatus and methods of the present invention provide quiet, compact, robust hardware that can accurately produce a wide range of tactile frequencies at a perceptually constant intensity. For greater expressiveness, some apparatus for moving the skin in multiple axes are also disclosed. Signal processing methods are presented to enhance the user's experience of audio spatialization. The methods transform audio signals into directional tactile cues matched to the time resolution of the skin, and which exploit directional tactile illusions.

In some embodiments, apparatus for generating tactile directional cues to a user via electromagnetically actuated motion is provided. The apparatus includes a first ear cup configured to be located proximate to a first one of the user's ears and a second ear cup configured to be located proximate to a second one of the user's ears. Each ear cup includes a vibration module that produces motion in a plane substantially parallel to the sagittal plane of a user's head and a cushion in physical contact with the vibration module. The vibration module of each ear cup is independently addressable, and electrical signals delivered simultaneously to each vibration module produce independent vibration profiles in each vibration module When applied to the user's skin the independent vibration profiles produce a directionally indicative tactile sensation. In some embodiments, each ear cup can include two or more independently addressable vibration modules to provide finer directionally indicative tactile sensations. In further embodiments, electrical signals delivered to each vibration module are offset from each other in time, preferably by at least 20 ms. In still further embodiments, the electrical signals may accelerate at least one of the vibration modules more quickly when the waveform is moving in one direction and more slowly when the waveform is moving in the opposite direction.

In some embodiments, an apparatus is provided that includes electro-acoustic drivers for reproducing audio waveforms as sound and tactors for generating electromagnetically actuated motion. The apparatus further includes one or more ear cups or frames. Each ear cup or frame locates the electro-acoustic driver proximate to an ear canal of a user and locates the tactors in direct or indirect contact with the user's skin. Each tactor is capable of generating motion along at least one axis, and two or more tactors are located proximate to the same side of said user's head. Preferably, each tactor is independently addressable and generates motion in a plane parallel to the user's sagittal plane. In some embodiments, the ear cups or frames locate one or more tactors in an anterior direction relative the user's ear and one or more vibration modules in a posterior direction relative to the user's ear. In these and other embodiments, the ear cups or frames locate one or more tactors in a superior direction relative the user's ear and one or more vibration modules in an inferior direction relative to the user's ear.

In some embodiments, a vibration module is provided that generates electromagnetically actuated motion along a first axis and a second axis, where the first and second axes lie in substantially the same plane. The vibration module includes a first conductive coil and a second conductive coil, where said first coil is configured to generate a magnetic field that is oriented substantially orthogonal to the orientation of the magnetic field generated by said second coil. The vibration module also includes a pair of magnets aligned with the magnetic field generated with said first conductive coil and a pair of magnets aligned with the magnetic field generated with said second conductive coil. Still further, the vibration module includes a moveable member formed from at least the magnets or said conductive coils, a suspension that that guides said moveable member with respect to the other of said magnets or said conductive coils, and at least a damping member in communication with said moveable member. At least one of said tactors may be driven independently of at least one other of said tactors located proximate to the same side of said user's head.

The details of one or more implementations are set forth in the accompanying drawings and the description below. Other features and advantages will be apparent from the description and drawings.

BRIEF DESCRIPTION OF THE DRAWINGS

For a fuller understanding of the inventive embodiments, reference is made to the following description taken in connection with the accompanying drawings in which:

FIG. 9 shows a schematic representation of an alternative audio-tactile system, including a cross-over circuit, a taction driver, and a conventional driver, in accordance with some embodiments;

FIGS. 10a and 10b show a schematic representations of further audio-tactile systems, in accordance with some embodiments;

FIG. 20 shows code for transforming a non-directed sine wave into a directed one, in accordance with various embodiments;

FIG. 23 shows exemplary pseudocode for transforming a non-directed sine wave into a directed one, in accordance with various embodiments;

FIGS. 29a and 29b show alternative perspective views a suspension, in accordance with some embodiments;

FIGS. 30a and 30b show perspective exploded and perspective views of a suspension system component, in accordance with various embodiments;

FIGS. 30c and 30d show plan and cross-sectional views of the suspension system component of FIGS. 30a and 30b, in accordance with various embodiments;

FIGS. 33a and 33b show simplified plan views of FIG. 33a illustrates how various vectors of movement can be accomplished with an array of three tactors and an array of four tactors, respectively, in accordance with various embodiments;

FIGS. 35a and 35b show a cross-sectional view of the foam commonly found in headphone and a low-profile cushion support, respectively, as known in the prior art;

FIG. 35c shows an exploded view of incorporating an anisotropic structure into an ear cup, in accordance with various embodiments;

FIG. 37a shows a graph of a tactor operating as an impact device, in accordance with various embodiments;

FIG. 37b illustrates a simplified exploded view of mechanical components of a tactor without collapsible elastic elements, in accordance with various embodiments;

FIG. 37c illustrates a perspective view of an exemplary collapsible elastic element, in accordance with various embodiments;

FIGS. 37d and 37e show cross-sectional views of tactors in which collapsible elements locate and suspend a moving mass inside a frame, in accordance with various embodiments; and FIGS. 38a and 38b show detailed cross sectional and exploded views of a tactor, in accordance with some embodiments.

DETAILED DESCRIPTION OF THE PREFERRED EMBODIMENTS

Frequencies below about 200 Hz are perceived both by sound and touch, a fact that is familiar to anyone who has "felt the beat" of strong dance music in the chest, or rested their hand on a piano. Thus, the tactile sense has much to offer a listener when proper apparatus and signals are provided. Adding sound-derived tactile stimulation, appropriately processed, can improve the sense of sound location. Adding tactile stimulation ("taction") is also of interest to those who enjoy loud music, as it can provide a listener with the enhanced intensity at a reduced acoustic volume, thereby sparing their hearing from damage.

Figure 1:
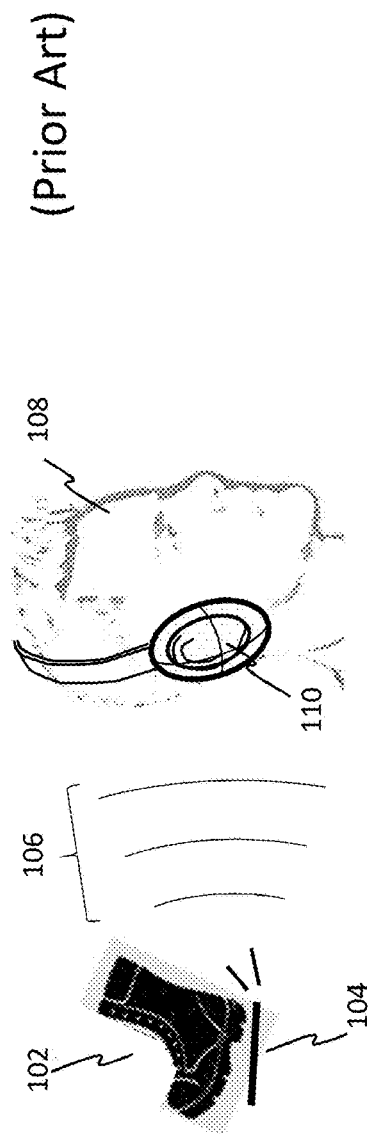
FIGS. 1a and 1b show pictorial representations of the perception of a footfall, in accordance with the prior art and embodiments of the present invention, respectively.

A number of advantages can be achieved by enhancing the directional cues already present in sound with taction. Some embodiments of the present invention are directed to delivering a Tactile InterAural Level Difference (TILD). The enhancement offered by the subject invention may be understood with a simple example: an observer witnessing another person walking on a resonant floor, as illustrated in FIGS. 1a and 1b. This information may be relevant, for example, in a virtual reality environment, or in a video game in which a player seeks to find an opponent before that opponent finds her. In the prior art, information about an event (foot 102 striking against floor 104) is conveyed via sound waves 106 reaching the ears of the observer 108. When the observer is physically in the same room as the event generating sound, the sound waves travel through the air to reach the observer's ears; when the event has been recorded and is played back via headphones 110, it is generally conveyed as electrical signals that are transduced into sound by drivers in the headphones.

A pictorial representation the tactile enhancements provided by embodiments of the present invention is shown in FIG. 1b. If a footfall 120 on floor 122 has (or is artificially enhanced to include) audio content in the tactile range (~5-200 Hz), the acoustic ILD can also be presented (in addition to conventional audio) as physical vibration to the skin of the head with an array of two or more tactors, so that the tactile sensation is stronger on the side closer to the sound source. This type of tactile signaling may be analogous to having a virtual stick 124 connecting the sound source to the user's ear cup 128, where the stick transmits only the mechanical vibrations 126 of foot hitting the floor. A second virtual stick 130 may be thought of as transmitting the physical vibration of the footfall to the ear on the distant side (not shown), but with relative attenuation. The observer is likely to process the difference in amplitude of the taction as an indication of the origin of the signal on the side where the signal is stronger.

Transmission of a signal conveying spatial information via relative amplitude differences using taction can be accomplished with two tactors—one on each side of the head. Tactors could also be used to convey more complex signals. For example, if the ear cup of a headphone, or a portion thereof, could alternatively push forward, or backward, or upward or downward, then a great deal more information could be communicated, including the direction of movement of an object such as the opponent's foot in the air. By this metaphor and others, one can imagine how an appropriately expressive headphone could naturally augment the cues of spatial audio.

Studies with low-fidelity actuators playing tones on the skin of the head and torso have shown that tactile cues can speed reaction time over audio alone, and can help users discriminate direction (J. B. F. van Erp and B. P. Self. RTO-TR-HFM-122-Tactile Displays for Orientation, Navigation and Communication in Air, Sea and Land Environments. NATO Science and Technology Organization, 2008).

Accordingly, the inventor undertook measurements of reaction times in a left/right discrimination task to see if low-frequency vibrations derived from audio could provide similar benefits when displayed to skin contacting the cushions of headphones. The headphones produced damped, electromagnetically-actuated motion in the sagittal plane, as disclosed previously in application Ser. No. 14/864,278, now issued as U.S. Pat. No. 9,430,921, the disclosure of which is incorporated by reference herein in its entirety. Improvement in median response time for the three subjects in the test was 60 milliseconds, indicating that the added tactile signal enabled users to respond to a left or right stimulus more quickly.

In another preliminary study conducted by the inventor and a colleague, the effect of audio-derived tactile stimulation on a user's preferred listening level was investigated, to see if adding skin vibration would lower user's preferred acoustic volume (Schweitzer, H. C. & Biggs, J. (2014). Prospects for hearing protection with multi-sensory headphone innovations. Presentation to the Annual meeting of the American Academy of Audiology. Orlando Fla.). On average, the 5 subjects in the inventor's study lowered their preferred acoustic volume 4 dB when skin vibration was added. This volume reduction was non-trivial in terms of hearing preservation, since NIOSH hearing safety guidelines show a 4 dB reduction is equivalent to cutting sound exposure time by more than half. Thus, taction may provide a long-term hearing protection benefit.

The perceptual enhancement of directional cues described above can be applied in a number of additional contexts. For example, many hearing impaired people rely heavily on visual input, but the human visual field is limited to, at best, roughly a half sphere; events outside that range may be undetected by the profoundly hearing impaired. In general, such people are likely to be at least as sensitive to taction as are fully hearing people. It would be very helpful to those with hearing impairments to have a means by which sound-generating events occurring outside a person's field of view could be conveyed via tactors, such information could be coded via TILD, for example, so as to cue the wearer as to the direction of the source of the signal. Thus, if a hearing-impaired person is crossing a street and does not see an approaching automobile, that person would receive tactile cueing indicating that a horn is honking nearby. But without directional cueing, it is likely to take the wearer precious time to find the source visually. It would be far more useful (and potentially life-saving) to use tactors to convey directional information. While such tactors can be incorporated into a headphone that also conveys information via sound waves, some hearing impaired users might prefer a system that conveys only tactile signals.

In addition to assisting the hearing impaired, this aspect of the subject invention may be used to augment the senses of people with normal hearing when they operate under conditions in which normal hearing is compromised. For example, workers in industrial settings that are very loud (e.g., steel mills and other heavy industries) often wear (and may be required to wear) hearing protection. While earplugs or over-the-ear hearing protectors can preserve hearing against long-term exposure to high sound levels, they also block audible cueing that a worker may very much want to receive, such as the sound of a forklift approaching from behind, or the voice of a co-worker. Taction could provide a means for cueing a worker wearing hearing protection of the location of a sound source that is outside her visual field.

Similarly, taction could provide soldiers with a virtually silent cueing mechanism to inform them of the location of friendly (or unfriendly) actors, and could help firefighters locate each other inside burning buildings. Situational awareness is vital in these and other high-risk situations. Battlefields can very loud, and hearing loss among soldiers is a serious problem. Hearing protection reduces situational awareness. The problem may be exacerbated when other equipment, such as night vision goggles, reduce the visual field. But a taction-based system could protect hearing while preserving situational awareness. Signal processing could convert relevant audio and other information into specific types of tactive signals. For example, if a 4-member patrol is operating in a low-visibility environment, it would be useful to provide a means by which each soldier could sense the location of each of the other team members.

There are multiple ways of determining the spatial relationship between multiple persons or objects. One such method is described US Patent application number US20150316383A1 and in WO2012167301A1, both to Ashod Donikian, which uses data from inertial sensors such as accelerometers and gyroscopes commonly found in mobile devices to provide 3D information. The acquisition of position information is outside the scope of the current invention. However, there are likely contexts in which presentation of that spatial information via traditional methods (hand-held displays, heads-up displays or even traditional audio prompts) are all impractical or ineffective. The subject invention can relieve information overload from the visual and auditory communications channel, which may both lower the cognitive load of users and provide a shorter "signal path" to the decision-making areas of the brain.

Figure 2:
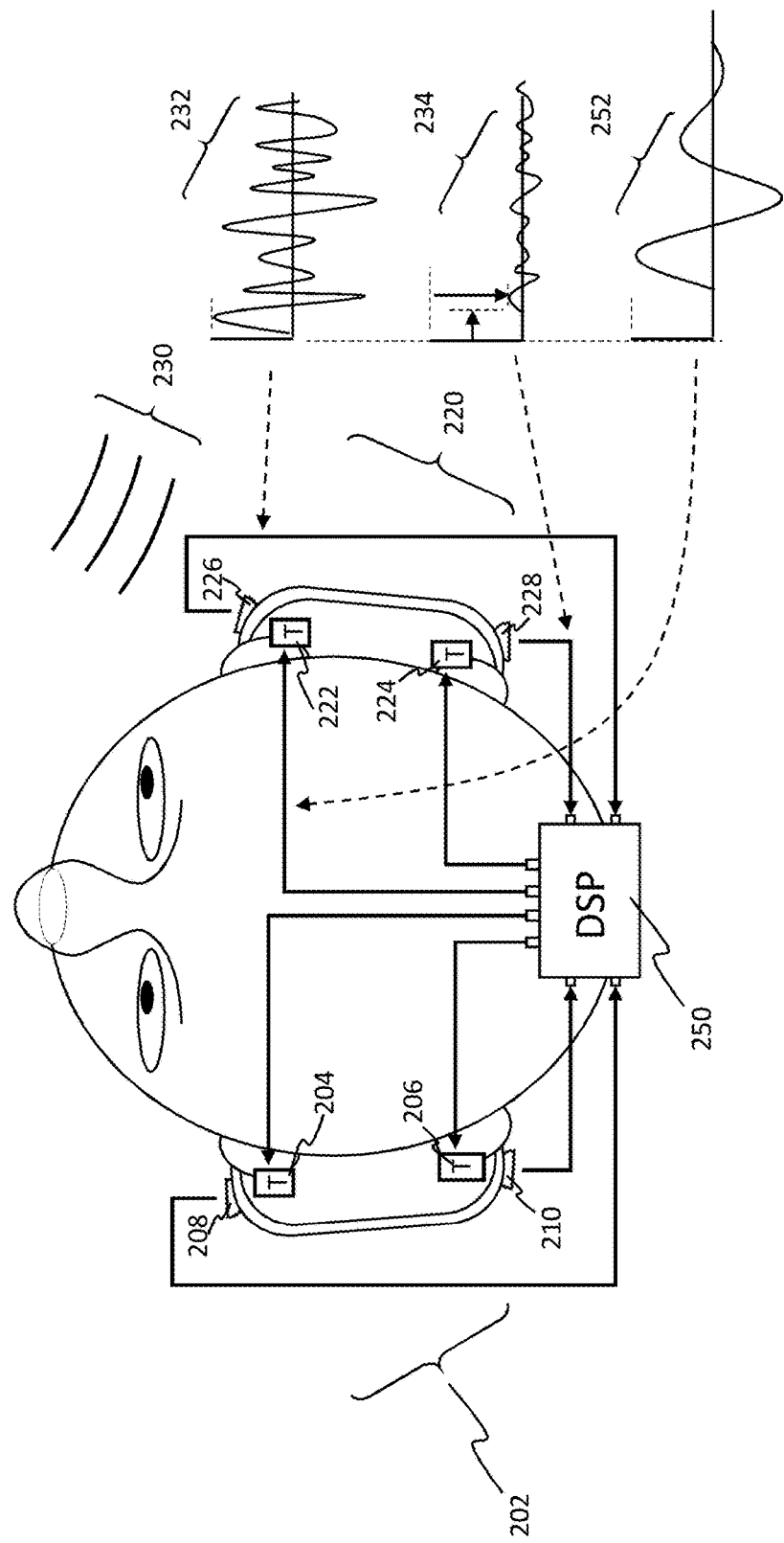
FIG. 2 shows a top plan view of a person wearing a tactor-enhanced headset that conveys location information, in accordance with various embodiments.

FIG. 2 shows a top plan view of a person wearing a tactor-enhanced headset that conveys location information, in accordance with various embodiments. Left headphone cup 202 incorporates front tactor 204 and rear tactor 206. It also incorporates front microphone 208 and rear microphone 210. Right headphone cup 220 incorporates front tactor 222 and rear tactor 224, as well as front microphone 226 and rear microphone 228. (It should be noted that in some applications the headphone cups, and/or even the conventional headphone drivers, may be omitted.)

When audio-frequency signal 230 is generated forward and to the right of the person wearing the headset, front right microphone 226 captures strong signal 232, while right rear microphone 228 captures weaker signal 234. The signals from both microphones are transmitted to digital signal processor ("DSP") 250. DSP 250 may analyze relative loudness, arrival times and other parameters in order to determine the vector of origin for the sound. DSP 250 then generates signal 252 to send to the appropriate tactor or tactors. In this case, signal 252 might be sent to solely to tactor 222, to each tactor (or a subset of all tactors) with amplitudes varying in relation to the relative distance from the vector of origin to the respective tactor.

The signal sent to the tactor must match to the frequency response of the tactor and perceptual range of the skin, even though the original sound received by the microphone might be well outside one or more of those ranges. Thus, the signal generated by DSP 250 may be harmonically related to the original signal (as when the original signal is processed through a divider network). Or it may be unrelated to the source signal, but chosen based on maximum sensitivity of the subject, or on some other basis.

When employing taction in order to enhance the bass response of headphones, it may be important to ensure good matching of the perceived volume level produced by the conventional sound-generating means (one or more transducers that create sound waves in the air between the driver and the eardrum) and the tactors, which produce vibration directly on the skin rather than through the air. Similar problems have been addressed for decades in multi-driver loudspeakers (and more recently, headphones), which may use crossover networks (traditionally comprised of capacitors, inductors and resistors) to send low frequencies to one driver and high frequencies to another. In such systems it is generally necessary to attenuate the output of at least one driver in order present the desired overall frequency response to the listener.

Presenting a desired overall frequency response is more complex when combining tactors with conventional drivers, in part because the two different drivers present information via two different perceptual channels, which the brain effectively re-assembles into the desired result. Where a calibrated microphone can take a single measurement of a multi-driver speaker system (putting aside issues of positioning, room effects, etc.), a microphone cannot integrate sound pressure levels generated by conventional drivers with the vibrations generated by tactors. As used herein, the terms "conventional driver" and "audio driver" are used interchangeably and encompass a wide range of technologies, including moving coil drivers, electrostatic drivers, balanced armatures, planar drivers and other design. As used herein, the term "conventional drivers" refer to drivers that produce sound by compressing and rarifying air, thereby creating sound waves detected primarily through hearing.

It may also be the case that there are different target tactile frequency responses for headphones relative to head-mounted displays, and other wearable technology. Finally, there are at least three ways of quantifying the magnitude of the taction effect on a "listener": acceleration (measured in, for example, meters/second/second); velocity (measured, for example in meters/second); and displacement (measured, for example, in meters). Previous research developed the iso-sensation curves for touch illustrated in FIG. 3. (Verillo-RT, Fraioli-AJ, Smith-RL. Sensation magnitude of vibrotactile stimuli. Perception and Psychophysics 61:300-372 (1960)).

Previous attempts to present audio frequency information via taction have tended to design and measure those systems based upon their characteristics in terms of displacement (i.e., the distance traveled by the tactor when producing vibration) and/or acceleration (the rate of change in its movement). It is likely that these measurements were favored because of the common and inexpensive availability of tools (e.g., Linear Variable Displacement Transducers, accelerometers) that can directly measure those parameters. This prior work, based on measurements of displacement, does not yield subjectively flat frequency response for taction in the range of 20 to 150 Hz.

Figure 3:
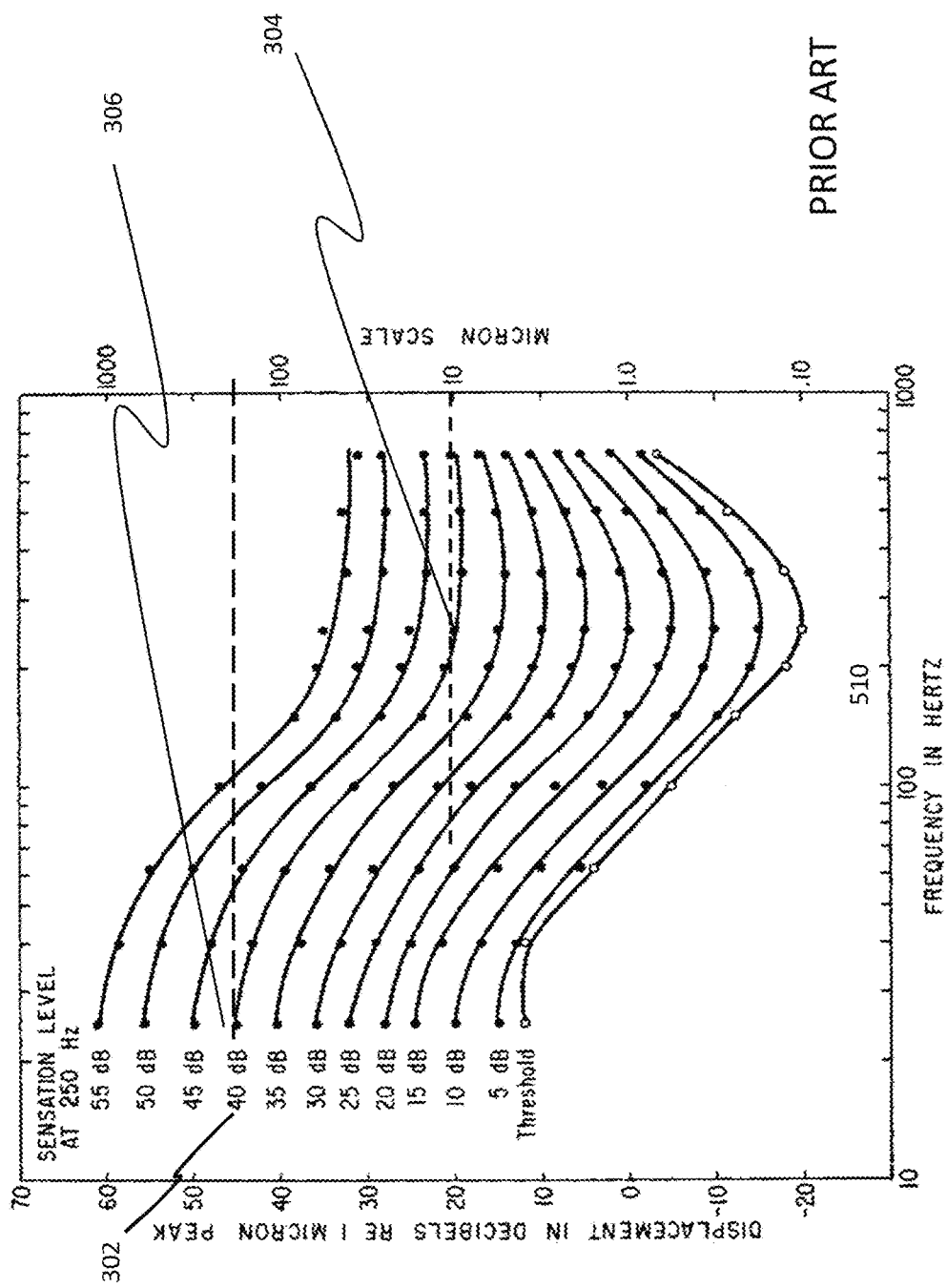
FIG. 3 shows a prior art graph of iso-sensation curves for touch.

As shown in FIG. 3, which is reproduced from Verillo et al. paper, the iso-sensations over that frequency range show a strong frequency dependence: for a given amount of displacement, the perceptual mechanism is significantly more sensitive to a 100 Hz signal than to a 20 Hz signal. For example, the 40 dB iso-sensation curve 302 shows that approximately 10 microns of displacement at 200 Hz 304 produces a sensation level of 40 db, whereas the same curve indicates that at 20 Hz over 100 microns of displacement 306 is required to produce the same sensation level. Thus a tactor designed for constant displacement over the relevant frequency range for a given input signal level will not provide equal sensation intensity over the desired range of frequencies.

In contrast to this displacement-based description of perceived intensity, loudspeakers have been measured for decades using microphones and related equipment capable of plotting sound pressure levels at various frequencies. Measuring speakers in terms of sound power levels is interchangeable with measuring their velocity (with adjustment for the relative surface area of the drivers), since SPL=Apv, where A is area, p is pressure and v is speaker cone velocity.

Sufficient displacement data is presented in the Verillo et al. paper previously referenced to derive velocity and acceleration iso-sensations in addition to the iso-sensations provided for displacement. This is because for sinusoidal motion the displacement, acceleration, and frequency are related as in equations 1-3, where A is displacement amplitude, and ω is frequency in radian/s.

$$x = A \sin(\omega t) \quad \text{(Eq. 1)}$$

$$v = \omega A \cos(\omega t) \quad \text{(Eq. 2)}$$

$$a = -\omega^2 A \sin(\omega t) \quad \text{(Eq. 3)}$$

Figure 4A:
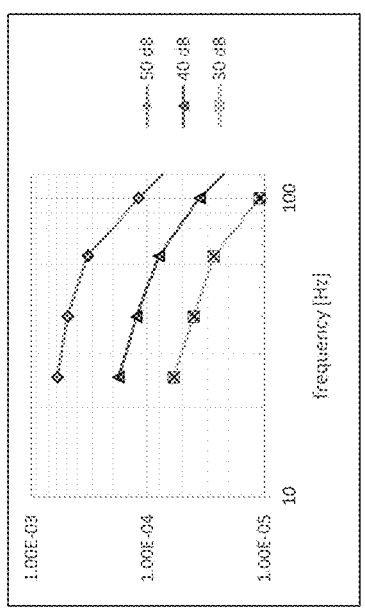
FIGS. 4a-4c show graphs of iso-sensation curves for touch, in accordance with the prior art (FIG. 4a) and embodiments of the present invention (FIGS. 4b and 4c)
Figure 4B:
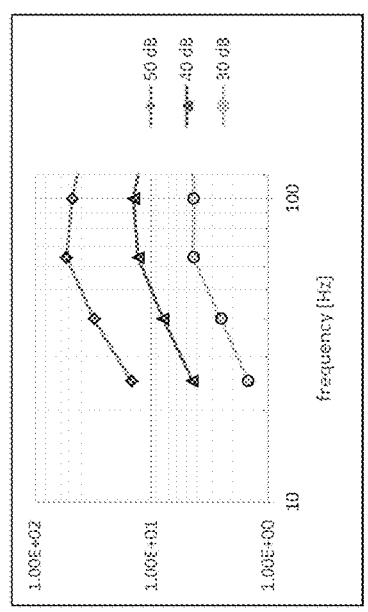
Figure 4C:
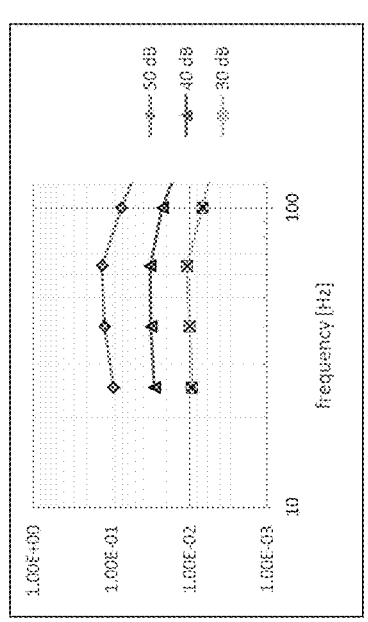

Each of those three iso-sensation graphs, limited to the relevant frequency range, is show in FIGS. 4a, 4b and 4c.

FIG. 4a shows the iso-sensation curves as measured by Verillo as described above, (that is, comparing perceived intensity to displacement) but limiting the plots to the most relevant frequency range for tactile bass (approximately 20-100 Hz). It shows that a tactor system optimized for constant displacement will not be perceived as having flat frequency response by a user, because the "listener" will be much more sensitive to a given level of displacement at 100 Hz than that same listener will be to the same level of displacement at 20 Hz.

FIG. 4b shows the same range of iso-sensation assuming that the tactor system is optimized to deliver constant acceleration amplitude. This graph demonstrates the opposite shortcoming: it shows that a tactor optimized for constant acceleration will not be perceived as having flat frequency response by a user, because the "listener" will be much less sensitive to a given level of acceleration at 100 Hz than that same listener will be to the same level of acceleration at 20 Hz.

FIG. 4c shows the same range of iso-sensation assuming that the tactor system is optimized to deliver constant velocity amplitude. Over the relevant frequency and amplitude ranges, constant velocity delivers relatively consistent sensations over the relevant frequency and amplitude regions. It has thus been found by the inventor that, over the range of intensities and frequencies of interest, the best results are obtained by treating people wearing tactors as velocity-sensors. That is, tactile iso-sensation curves are flattest over the range of 10-150 Hz when vibrations are expressed in terms of velocity, and the velocity is therefore a good physical correlate for sensation intensity in this range.

Actually delivering consistent velocity as a function of frequency with a tactor in a headphone is a complex undertaking. Some of the factors that will affect the velocity presented at the interface between the taction system and the wearer include (1) the mechanical characteristics of the tactor itself, including the inertial mass of the reciprocating portion of the tactor, the characteristics of the spring that provides restorative force to the reciprocating portion of the tactor, and the damping applied to the system; (2) the effective mass of the headphone cup or other tactor housing; (3) the stiffness and damping of the headphone bow or other means by which the tactor is held against the skin; (4) the shear stiffness and damping of the cushions or other compressible material(s) used to couple the tactor to the skin, if any; and (5) the shear stiffness and damping of the scalp around the ear or other location where the tactor is held against the skin.

Figure 5:
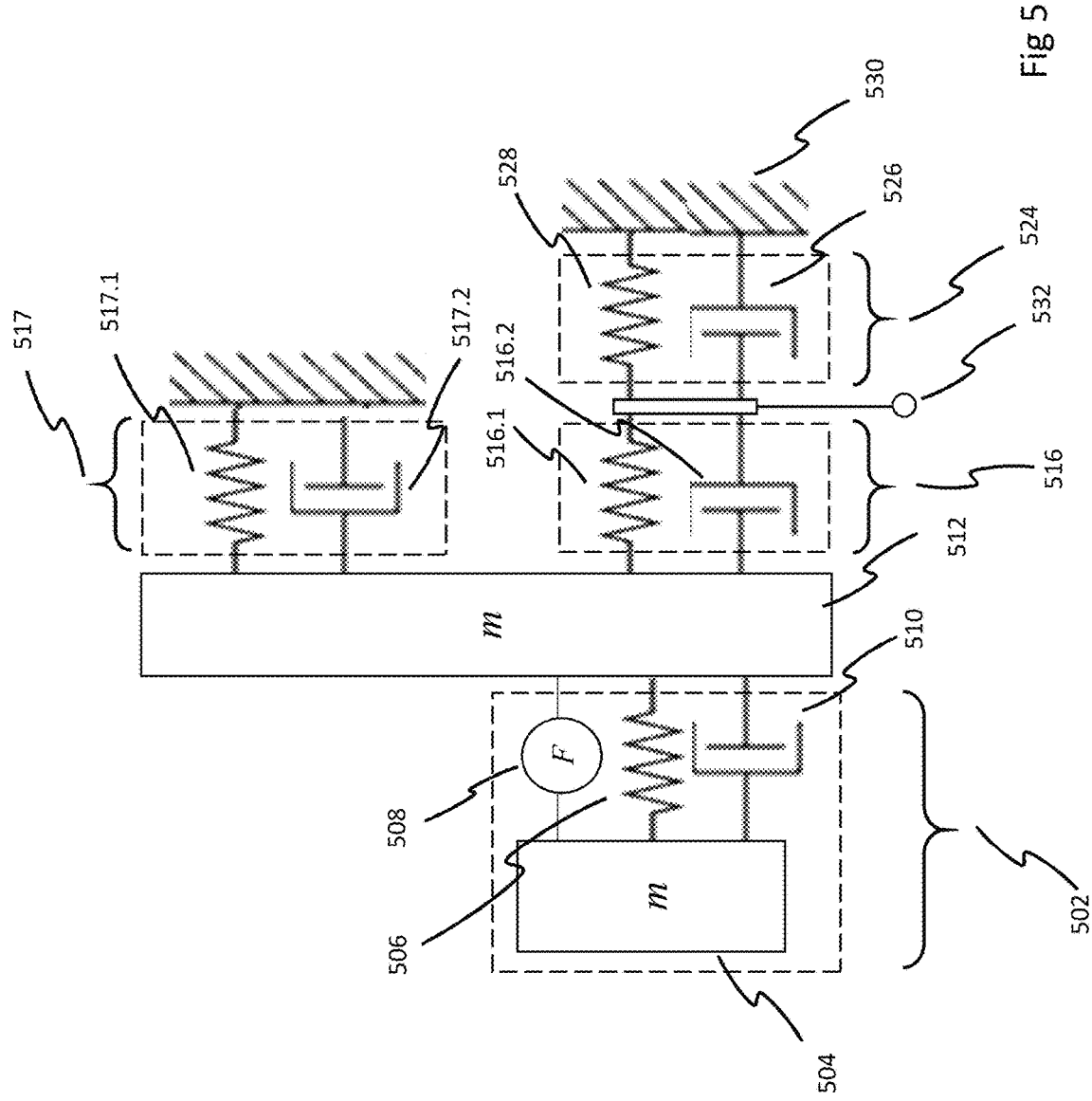
FIG. 5 shows a system dynamics model of a taction module optimized for constant skin velocity output in accordance with various embodiments.

FIG. 5 shows a system dynamics model of a taction module 502, optimized for constant skin velocity output in accordance with various embodiments. The various physical components of taction module 502 may be represented by mass 504, spring 506, which stores and release energy as the mass moves, energy source 508, which is the motor transducing electrical energy into kinetic energy, and damping member 510, which may be a ferrofluid or other means for converting kinetic energy into heat. Module 502 can be installed in ear cup 512, which may be treated as purely passive and thus consists of mass for purposes of this portion of the disclosure.

Ear cup 512 generally contacts the wearer's head via two structures: cushion 516, and the bow 517, which generally connects the left and right ear cups and provides some clamping force while distributing some of the weight of the headphones away from the cushions and to the top of the wearer's head. Some headphones use non-contact bows; these are generally lighter weight headphones. Cushion 516 may be conceptually understood as including both a spring 516.1 and a damper 516.2, which is typically provided in the form of a foam member possessing both properties. Bow 517 may also be cushioned so as to provide characteristics of both a spring 517.1 and a damper 517.2. (If the portion of the bow contacting the wearer's head does not comprise a foam or foam-like cushion, the bow may not exhibit these properties.)

The goal of taction module 502 is to move the wearer's skin 524 relative to the rigid structure underneath: cranium 530. The skin has its own elastic properties, and thus may be viewed as including spring 526 and damper 528.

Because the point of adding taction in the first place is to create the proper amount of movement at the interface 532 of the cushion and the skin, the entire system must be taken into account in order to produce the correct velocity at that point. Thus tuning the behavior of the entire system to deliver constant velocity output at intersection 532 for a given level of input is critical. It is impractical at best to change the properties of the skin on the listener, and when adding tactors to an existing system, most of the critical parameters are difficult to significantly change. One of the properties most accessible for the taction designed is the damping 510 within the tactor 502.

A mechanical system capable of producing significant output at frequencies as low as 5 or 10z requires movably suspending a significant mass. In motion, such a mass stores significant kinetic energy, and if appropriate means are not provided to dissipate that energy, such a transducer will exhibit highly under-damped motion at resonance, which is inconsistent with the goal of flat velocity response. In the context of headphones used to listen to music, an under-damped tactile transducer gives "one-note bass," which greatly reduces the pitch information present in low-frequency music. In other contexts, it may interfere with other forms of signaling associated with different frequencies.

To make the system still more complex, the resonance of the module itself becomes part of the complex resonant system discussed above. There is limited value in providing a module that has a flat frequency response when suspended in free space, if the system response becomes non-flat once it is added to headphones mounted on a human head. Accordingly, an object of present invention is to provide a method of damping of taction modules specifically adjusted to provide headphone tactors with a flat velocity response when they drive a load like cushioned ear cups shearing skin around a wearer's ears.

Figure 6:
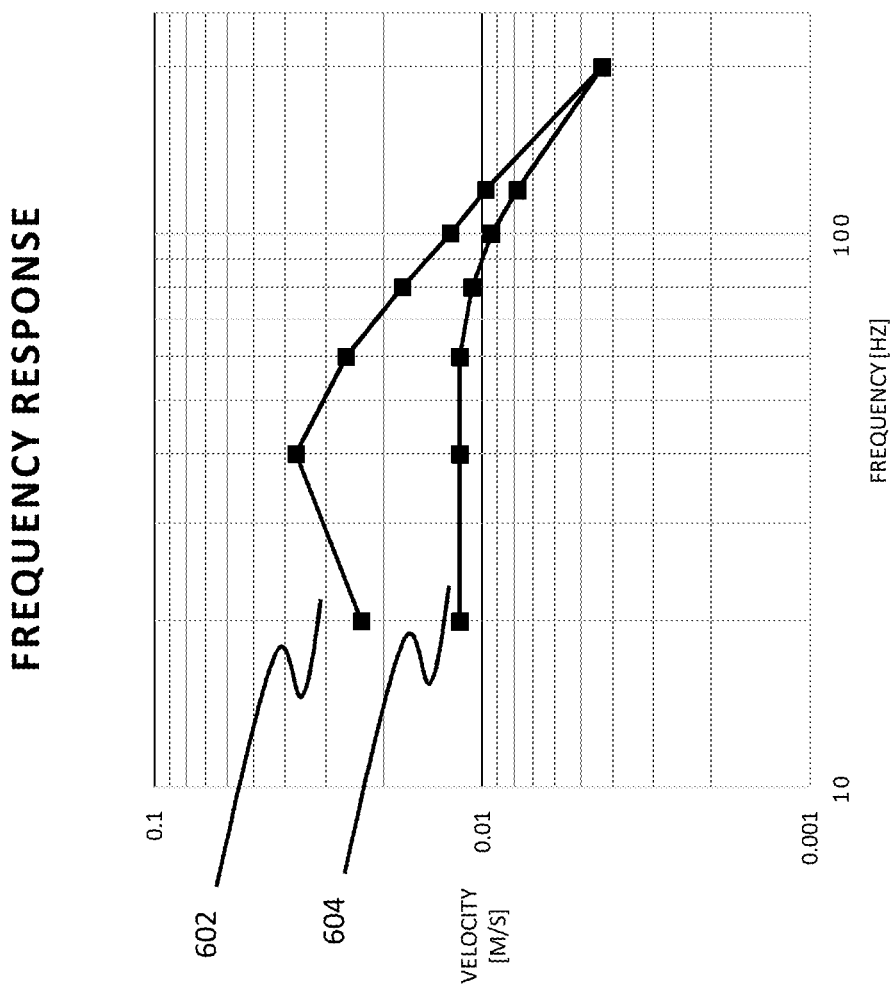
FIG. 6 shows a graph illustrating the effect on frequency response of applying damping to tactors, in accordance with various embodiments.

The effect on frequency response of applying damping to the tactors is shown in FIG. 6. Response curve 602 gives an example of the in-system velocity response of a tactor with inadequate damping. This system may be perceived by a user as providing "one-note" bass centered around the resonant frequency of 40 Hz. On the other hand, response curve 604 presents a much flatter output. It should be noted, however, that damping comes at a cost: overall output is substantially reduced for a given input, as the damping means converts more of the input signal directly into heat. Overdamped systems require more power for a given output level, placing greater demands on amplifiers, batteries, etc. Thus with properly applied damping, applying a signal, such as 1 Volt peak-to-peak, to the tactile module produces vibration of the same qualitative intensity, whether the frequency being reproduced is 20 Hz or 100 Hz.

A potential consequence of using tactors to provide deep bass is that the action of the tactors is not solely perceived via shear against the skin of the listener: the tactors may also produce audio output which can be perceived via the conventional auditory pathways. Maintaining a desired acoustic frequency response in a headphone when ear cups are vibrated thus requires accounting for the combined audio contribution of the conventional drivers and the tactors. Although moving the ear cups parallel to the side of the head (as disclosed in the present invention and in application Ser. No. 14/864,278, now issued as U.S. Pat. No. 9,430,921, and which is incorporated by reference herein in its entirety) is far quieter than moving them toward and away from the head (as practiced in the prior art), the excess sound generated may not be negligible, and could produce acoustic bass audio of 90 dB or louder all by itself. This output may not be objectionable in and of itself, but may create undesired effects when added to (or subtracted from, depending on phase) the output of the conventional driver. One way to compensate for this excess acoustic bass is to attenuate the acoustic driver when the tactile vibration is already providing the acoustic bass audio.

Figure 7:
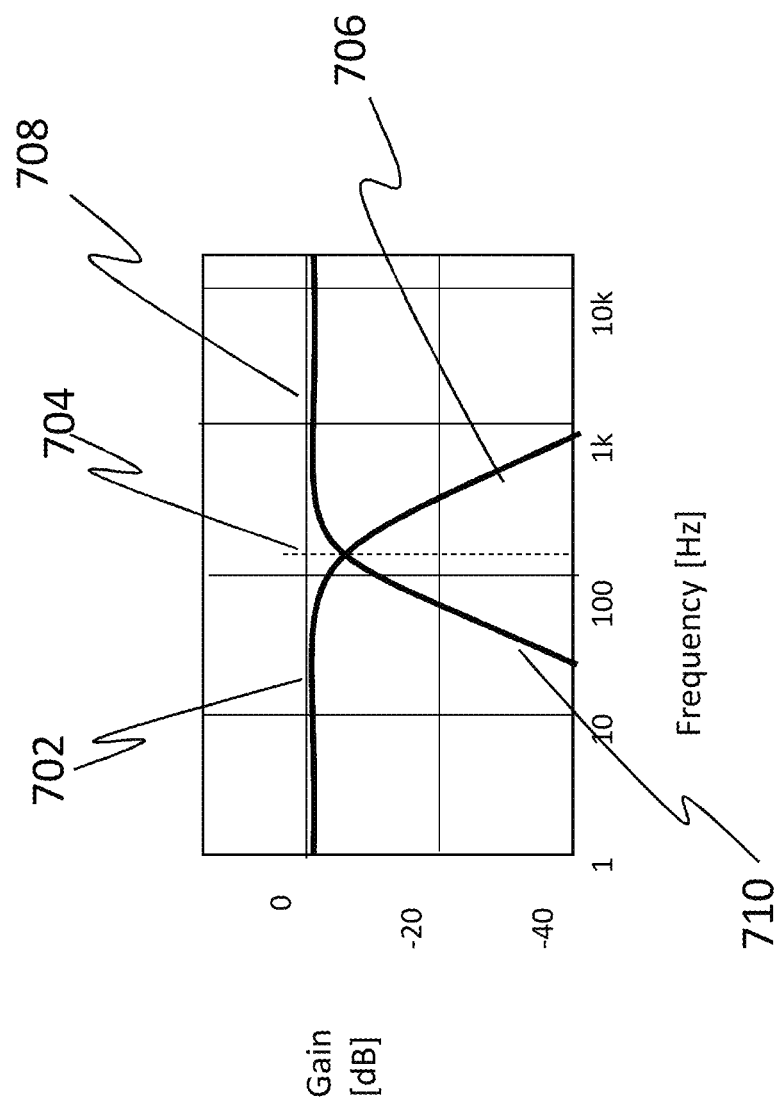
FIG. 7 shows a graph of the frequency response for a crossover circuit configured to attenuate a tactile transducer and an acoustic based on frequency, in accordance with various embodiments.

Accordingly, several methods for accomplishing this attenuation are disclosed. One method is to treat the tactile transducer as a subwoofer, and to use a crossover circuit that attenuates the acoustic driver based on frequency as illustrated in FIG. 7. In this approach the response of tactor 702 is rolled off above crossover frequency 704 at slope 706, and the response of primary audio driver 708 is rolled off at the crossover frequency at slope 710. Slopes for the crossovers may be of various types: from first order (6 dB/octave) to more complex crossovers with slopes as high as 48 dB per octave or more, as is understood in the art.

Preserving phase is a desirable aspect of the hand-off from driver acoustics to tactor acoustics. It may be attained by appropriately matching the order of the high and low-pass filters, as is understood from in the art of pure audio crossover circuits. It is also preferable to perform such crossover function with low-level signals (i.e., prior to amplification), because passive high-pass filtering generally requires physically large (and expensive) inductors.

Figure 8:
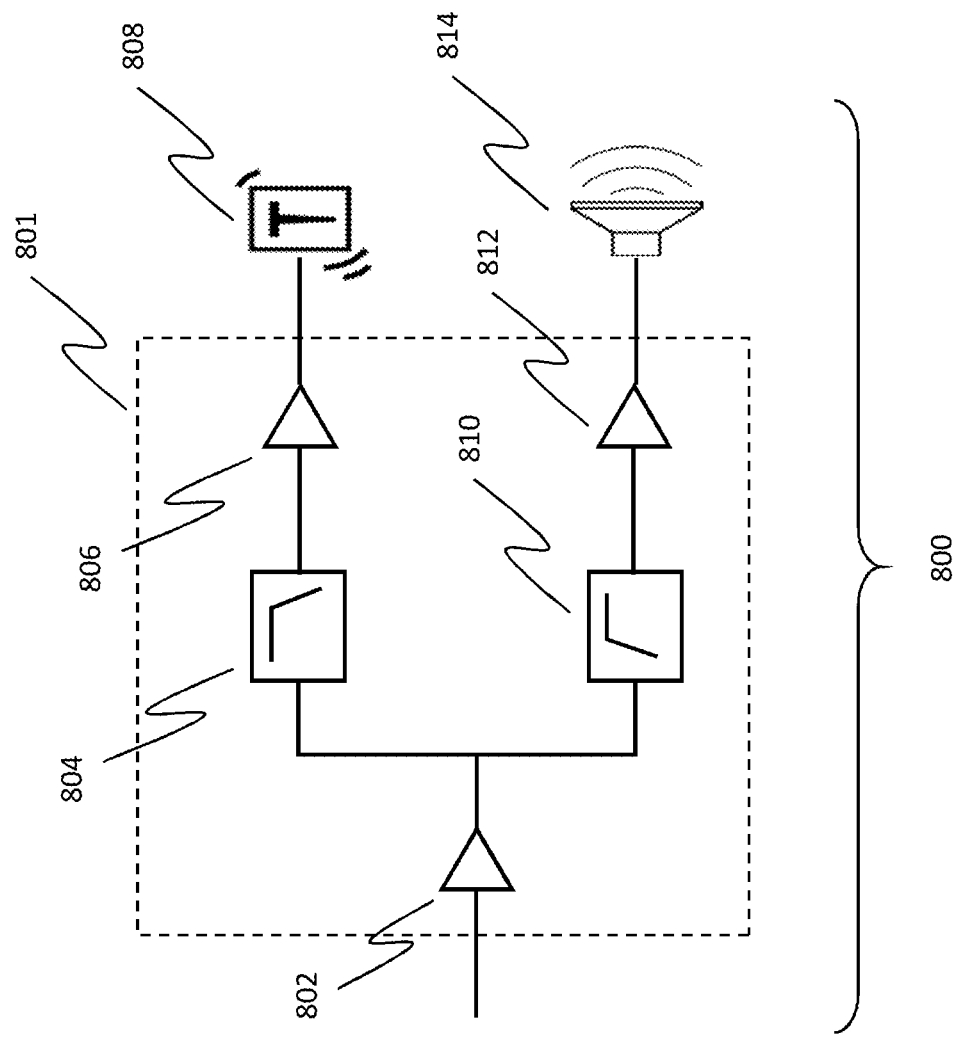
FIG. 8 shows a schematic representation of an audio-tactile system, including cross-over circuit, a taction driver, and a conventional driver, in accordance with some embodiments.

FIG. 8 shows a schematic representation of audio-tactile system 800, including cross-over circuit 801, taction driver 808, and conventional driver 814, in accordance with some embodiments. Circuit 801 may include a buffer 802 to prevent interaction between the crossovers and circuitry upstream of those crossovers. After buffer 802, the signal may feed circuit elements specific to each of the two drivers. Low pass crossover network 804 feeds the frequencies intended for the tactors to gain stage 806. Gain stage 806 may adjust gain or attenuate the signal, as known in the art, in order to account for listener preferences for the amount of bass enhancement provided. The signal then passes to taction driver 808. At the same time, the signal from the buffer is passed to a high pass filter 810, which passes the signal in turn to gain stage 812, and then to conventional driver 814.

FIG. 9 shows a schematic representation of an alternative audio-tactile system 900, including cross-over circuit 901, taction driver 908, and conventional driver 914, in accordance with some embodiments. In taction system 900, some of the tactile transducer signal is fed forward so that it may be subtracted from the signal provided to conventional driver 914. As in FIG. 8, buffer 902 isolates the network from upstream circuitry. Buffer 902 feeds low pass network 904, which in turn feeds gain stage 906, which may be adjustable. In addition to feeding taction driver 908, the output of gain stage 908 also feeds an inverter/scaler 910. This module inverts the signal of the output from gain stage 908, and (if required) adjusts the level of the signal in order to provide the appropriate level of cancellation relative to the output of buffer 902 as presented to summing gain stage 912, which in turn drives conventional driver 914.

FIG. 10a shows a schematic representation of another audio-tactile system 1000a, including cross-over circuit 1001a, taction driver 1008a, and conventional driver 1014a, in accordance with some embodiments. In taction system 1000a, sensor-based feedback is used to attenuate acoustic driver 1014a. In particular, buffer 1002a again isolates the network, and low-pass filter 1004a feeds gain stage 1006a, which in turn feeds the signal to taction driver 1008a. The physical movement 1009a generated by taction driver 1008a is measured by accelerometer 1010a. Using an accelerometer to measure ear cup motion is a convenient source of the feedback signal, since there is no acoustic transmission delay as there would be for a microphone. Accelerometer 1010a then outputs a proportionate electrical signal, which is in turn fed to an inverting gain stage 1014a. Gain stage 1014a inverts this signal and scales it to provide appropriate cancellation when it is mixed with the output of buffer 1002a. This summed signal is finally provided to gain stage 1016a, which drives conventional transducer 1014a.

FIG. 10b shows a schematic representation of taction system 1000b, which modifies audio-tactile system 1000a to improve the uniformity of cancellation across a range of frequencies, in accordance with various embodiments. In particular, in taction system 1000b, the signal of the accelerometer 1010b may be modified by leaky integrator 1012b. In this embodiment, before proceeding to inverting gain stage 1014b, the accelerometer signal is passed through a leaky integrator 1012b to transform the accelerometer signal into one proportional to ear cup velocity, since sound pressure level scales with velocity of the emitter independent of frequency.

The approach shown in FIGS. 10a and 10b may have several advantages. Because the accelerometer reacts to movement, and is ideally physically coupled to the tactor itself, the response time of the system is quick. And because the accelerometer is sensitive to motion rather than sound, it easily isolates the output of the tactor as it is relatively insensitive to the output of the conventional driver.

Figure 11:
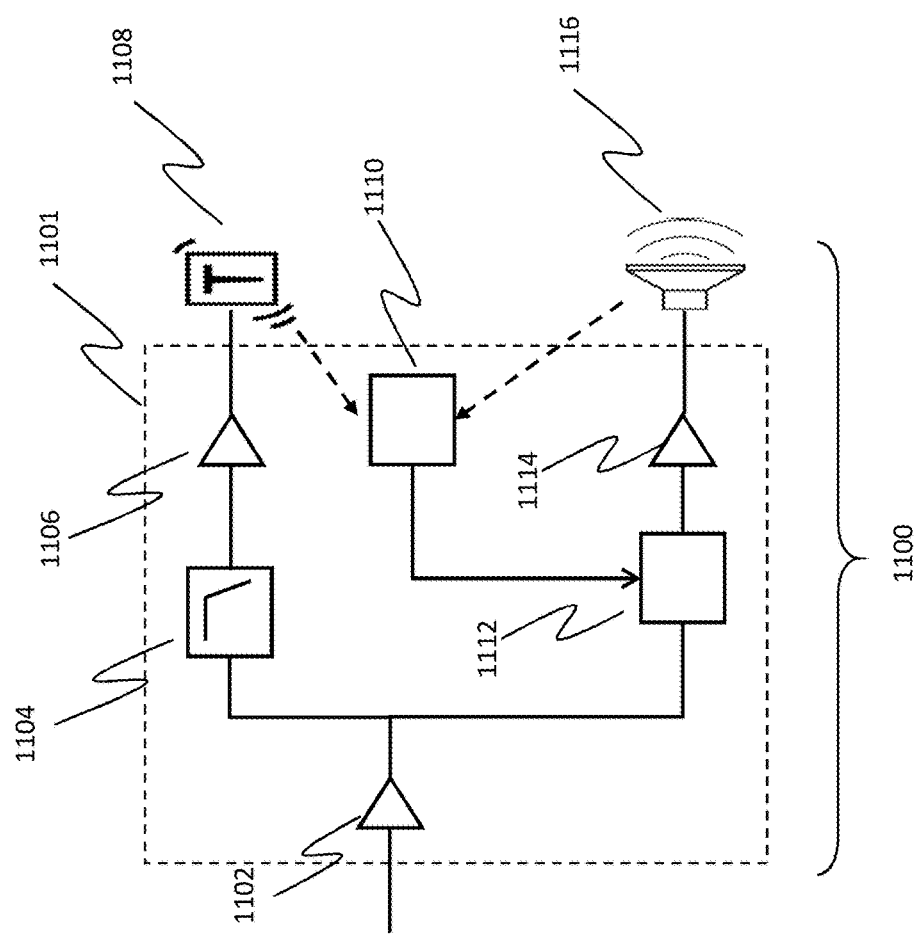
FIG. 11 shows a schematic representation of yet another audio-tactile system 1100, in accordance with some embodiments.

FIG. 11 shows a schematic representation of yet another audio-tactile system 1100, including cross-over circuit 1101, taction driver 1108, and conventional driver 1116, in accordance with some embodiments. Buffer 1102 again isolates the network; low-pass filter 1104 feeds gain stage 1106, which in turn feeds the signal to tactor 1108. When the tactor physically moves the ear cup, changes in air pressure are measured by microphone 1110, located within the chamber created by the earphone against the head. The output of microphone 1110 is fed to a noise-cancelling circuit 1112, as known in the art. Noise-cancelling circuit 1112 feeds its output to gain stage 1114, which in turn feeds conventional driver 1116. An advantage of this approach may be that the microphone used to provide active noise cancellation may also be used to tune the output of driver 1116 relative to tactor 1110. In effect, the system may treat the output of the tactor as a source of undesirable noise (at least within the range where the tactor overlaps with the conventional driver).

It is also possible to reduce or eliminate unwanted effects resulting from overlapping coverage between tactors and conventional drivers by attenuating output of the tactors in the frequency range of concern, either through crossover design or through feedback mechanisms as disclosed above.

As previously discussed, one benefit of the instant invention is the ability to convey complex spatial information using taction. For a number of reasons, it is desirable to address how embodiments of the invention can integrate with current audio standards. Tactile technology that leverages existing audio tools has a better chance of success because sound authoring tools already exist and professionals, like sound designers for games, movies, and virtual environments, are in place to apply them. Accordingly, the present invention contemplates extending existing audio editing tools, so that authors may embed useful tactile content into existing audio streams. The present invention also contemplates the creation of hardware that is capable of extracting that tactile content from conventional audio streams and delivering that content to the user. Accordingly, plugins for audio editors such as Virtual Studio Technology ("VST") and Audio Units are explicitly contemplated.

VST is a software interface that integrates software audio synthesizer and effect plugins with audio editors and recording systems. VST and similar technologies use digital signal processing to simulate traditional recording studio hardware in software. Audio Units are digital-audio plug-ins provided by Core Audio in Apple's OS X and iOS operating systems. AU are a set of application programming interface (API) services provided by the operating system to generate, process, receive, or otherwise manipulate streams of audio with minimal latency. There are also large existing libraries for the audio APIs of video game engines. It would be desirable to provide a means for delivering spatial cueing that is compatible with existing techniques and protocols for delivering audio content.

On the hardware side, things can be simple when the tactile content aims primarily to reinforce the audio signal. Since the tactile content is generally simultaneous with the higher-frequency audio signal, low-pass filtering can be sufficient to extract it.

As discussed above, if headphones are provided with at least two tactors in each ear cup, it is possible to do more than just enhance audio content with deep bass: if two tactors per side of the head are provided, taction can provide cues about the front-versus-back location of a sound source, in addition to right-left information. For example, an array of four tactors can be provided such that one is located in front of the left ear, the second behind the left ear, the third in front of the right ear, and the fourth behind the right ear. Such an arrangement can be achieved for example by placing multiple tactors in segmented headphone cushions, for example, as is discussed more fully below. With such an arrangement, audio-derived tactile vibration may be routed to the tactor closest to the sound source. It should also be noted that the same concept can be used to integrate the third dimension in tactile spatial signaling. That is, if additional tactors are provided and arranged so that some are higher on the user's head and some are lower, it is possible to signal not just front-back information, but also up-down information.

Figure 12:
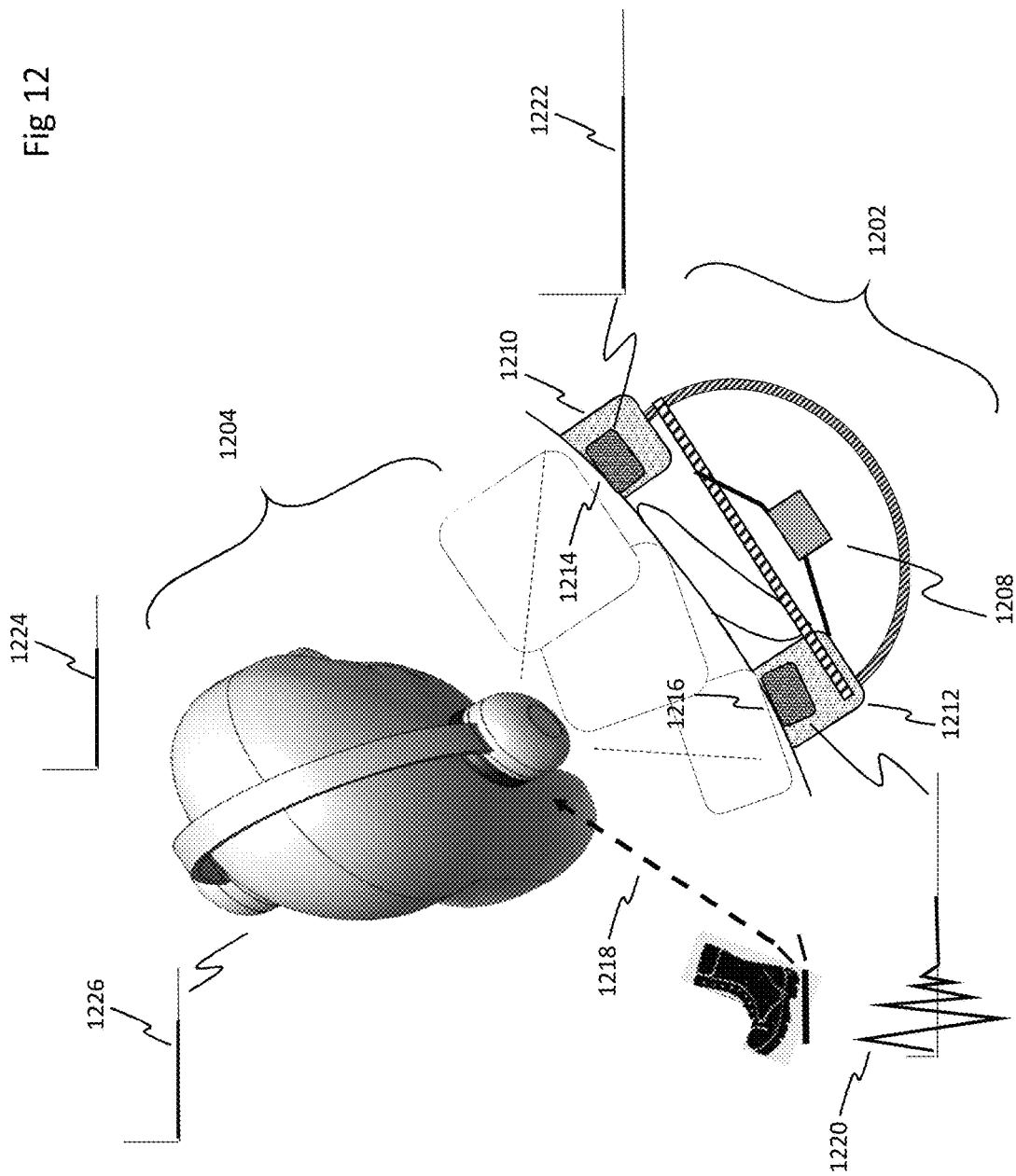
FIG. 12 shows a perspective view and a cross-sectional detail of a simplified headphone, including headphone cup assemblies provided with front and back tactors, in accordance with some embodiments.

FIG. 12 combines perspective and cross-sectional detail of a simplified headphone 1204, including headphone cup assemblies 1202 provided with front and back tactors, in accordance with some embodiments. Headphone cup assembly 1202 includes conventional driver 1208, as well as front cushion 1210 and rear cushion 1212, which are physically separated. The front cushion contains front right tactor 1214; the rear cushion contains right rear tactor 1216.

When presenting a sound intended to be localized as coming from behind and to the right of the headphone wearer, such as footfall 1218, a corresponding signal 1220 (represented as a waveform over time) may be sent to right rear tactor 1216, while no signal (represented by a flat line 1222) is sent to right front tactor 1214. Similarly, the left rear tactor (not shown) would receive null signal 1224, and the left front tactor would receive null signal 1226. To present a sound as localized as coming from the right front, tactor 1214 would receive a signal, while the other three would not.

In the simplest case, taction signals would go to only one tactor. However, it is also possible to represent intermediate vectors with weighted signals going to more than one tactor. Thus sending 75% of the signal to the left rear and 25% to the left front would convey that the source was to the left and somewhat to the rear; sending 50% to the left rear and 50% to the right rear would convey that the source was directly behind the user, and so on.

Figure 13B:
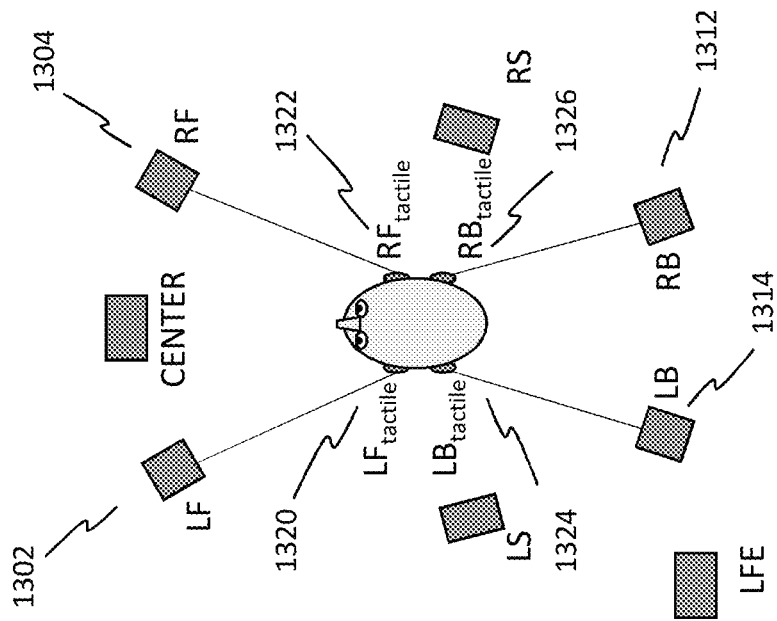
FIG. 13b shows a pictorial representation of using multiple tactors to encode multi-channel spatial information, in accordance with various embodiments.
Figure 13A:
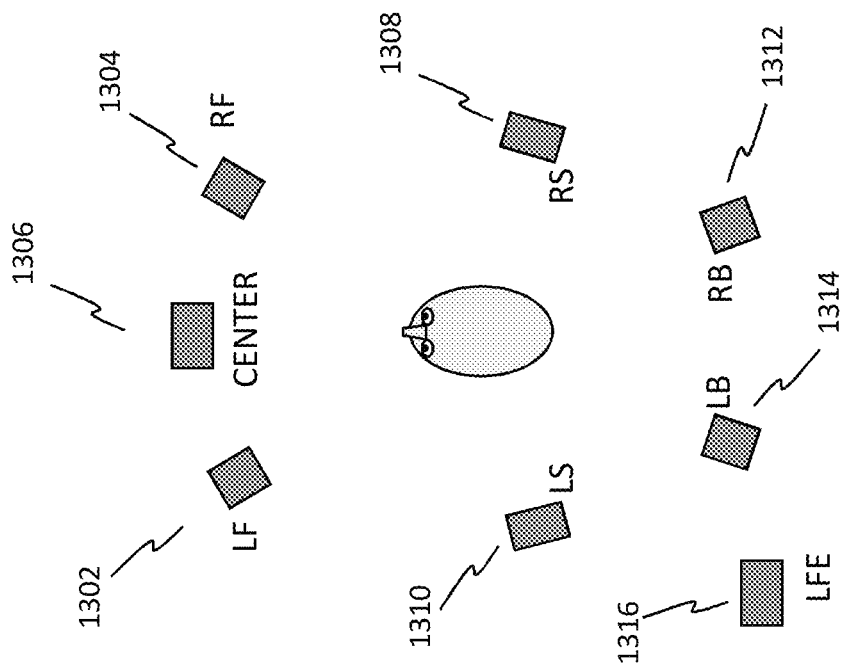
FIG. 13a shows a pictorial representation of the channels of the prior art Dolby 7.1 surround sound format.

One example of a widely used spatial coding system is Dolby 7.1, which is used in a variety of equipment including sound cards for personal computers and home theater receivers and processors. As shown in FIG. 13*a*, in addition to the conventional stereo channels for left (front) 1302 and right (front) 1304, Dolby 7.1 presents another 5 channels intended to provide spatial cueing: center channel 1306, right side channel 1308, left side channel 1310, right back channel 1312 and left back channel 1314. Finally, a low frequency channel 1316 is also provided. A single low frequency channel is generally considered adequate for reasons including (a) subwoofers tend to be large and expensive, making it impractical to place multiple subwoofers in most rooms, and (b) because low frequencies when presented as sound waves in a room, are relatively non-directional, so that the added value of multiple, spatially dispersed subwoofers may yield limited benefit relative to the cost.

Other surround standards have included Dolby 5.1 and DTS. Those with ordinary skill in the art will appreciate that the techniques discussed in this document may be applied in those and other similar contexts as well.

There have been multiple commercial products that seek to provide the "surround sound" experience using headphones. Many of these involve providing a relatively large number of conventional drivers within each ear cup. The limited real estate inside a headphone cup generally requires that those conventional drivers be smaller than the drivers in typical stereo headphones, which can compromise audio quality. Furthermore, the close proximity of the drivers, and the difficulty of isolating those drivers from each other, makes providing a convincing experience challenging. Providing a method for mapping the information encoded in Dolby 7.1 to stereo headphones provided with four tactors, on the other hand, presents spatial information without compromising audio quality.

One aspect of the subject invention is a means for using multiple tactors to encode multi-channel spatial information using conventional stereo headphones. A simplified conceptual version of this concept is shown in FIG. 13b. Information encoded for left front speaker 1302 is routed to left front tactor 1320; information encoded for right front speaker 1304 is routed to right front tactor 1322; information encoded for left back speaker 1314 is routed to left back tactor 1324; information encoded for right back speaker 1312 is routed to right back tactor 1326.

One drawback to such a simplified approach is that taction is most effective for low frequencies, and tactors are likely to be used with low-pass filtering, so that high frequency content in the surround channels will be filtered out of the taction signal, thereby reducing the surround effect. While tactors alone will not be capable of fully realizing a surround effects, aspects of the subject invention present more sophisticated matrix approaches that can deliver significant surround effects despite these limitations.

Figure 14:
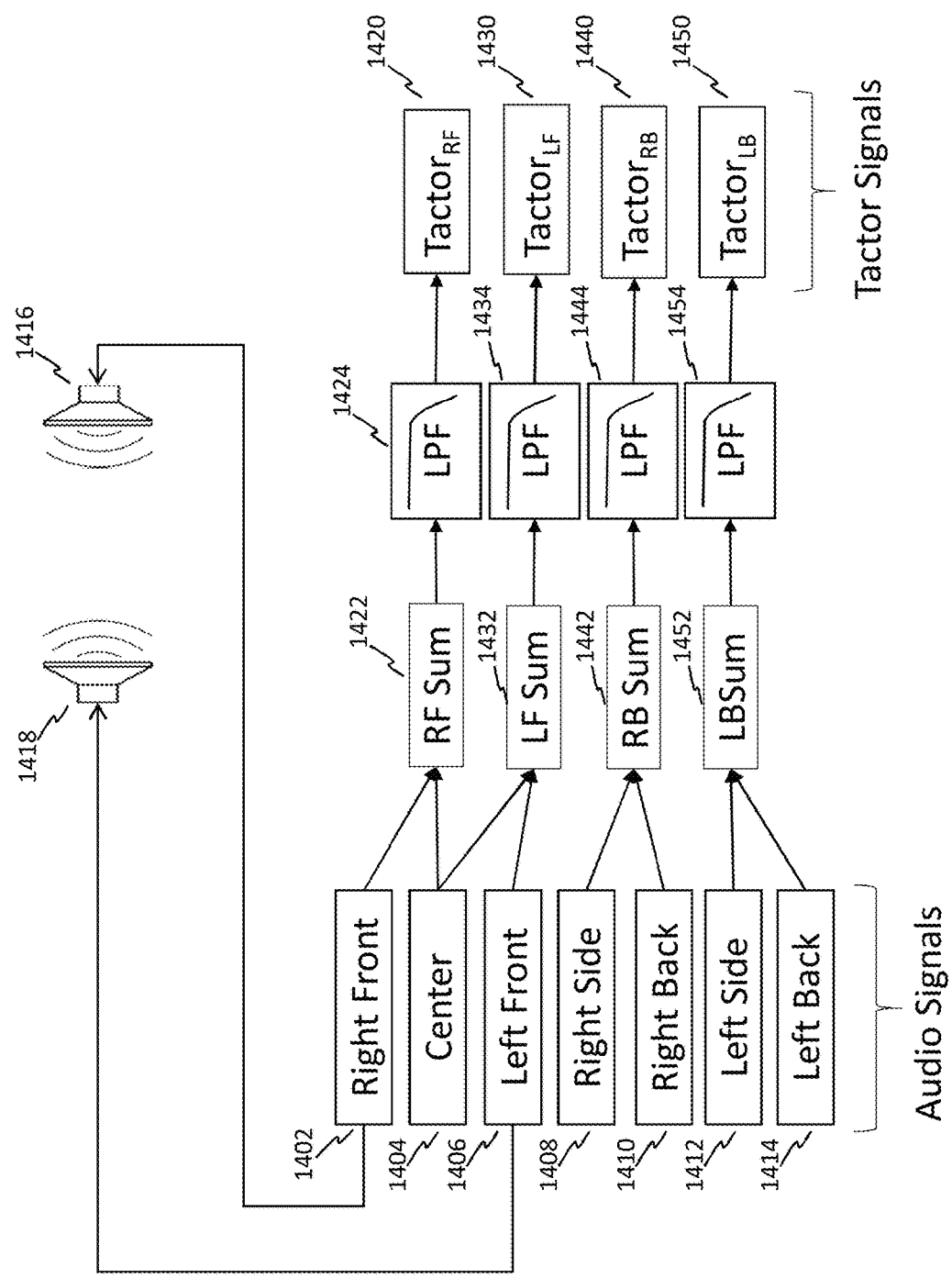
FIG. 14 shows a schematic representation of an exemplary mapping of a 7.1-encoded program to a headphone system consisting of two audio drivers and four tactors, in accordance with various embodiments.

One method of mapping the 8 channels of a 7.1-encoded program to a headphone system consisting of two audio drivers and four tactors is shown in FIG. 14. Signals used to generate tactor output include right front 1402, center channel 1404, left front 1406, right side 1408, right back 1410, left side 1412 and left back 1414. In addition to being processed for taction, right front channel 1402 is also transmitted to the main audio driver for the right headphone cup 1416; left front channel 1404 is sent to both taction processing and to main audio driver 1418 for the left side. The signal sent to the right front tactor 1420 is created by summing 1422 the signals from right front channel 1402 and center channel 1406; passing that signal through low pass filter 1424, and then passing the signal through appropriate amplification, etc. (not shown) to tactor 1420. The signal sent to the left front tactor 1430 is created by summing 1432 the signals from left front channel 1404 and center channel 1406; passing that signal through low pass filter 1434, and then passing the signal through appropriate amplification, etc. (not shown) to tactor 1430. The signal sent to the right back tactor 1440 is created by summing 1442 the signals from right side channel 1408 and right rear channel 1412; passing that signal through low pass filter 1444, and then passing the signal through appropriate amplification, etc. (not shown) to tactor 1440. The signal sent to the left back tactor 1450 is created by summing 1452 the signals from left side channel 1410 and left back channel 1414; passing that signal through low pass filter 1454, and then passing the signal through appropriate amplification, etc. (not shown) to tactor 1450.

Figure 15:
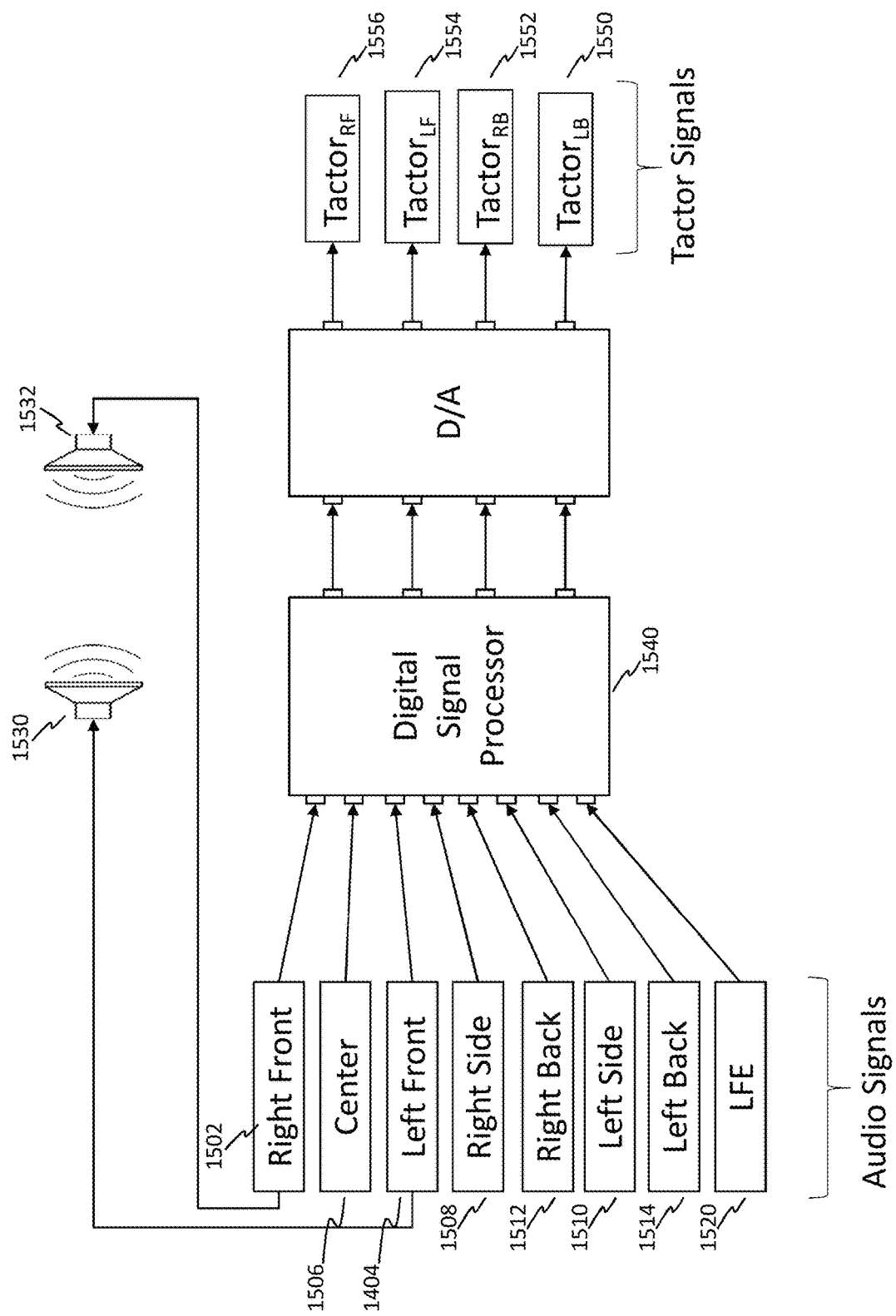
FIG. 15 shows a schematic representation of an exemplary mapping of a low frequency effects (LFE) channel to tactors, in accordance with various embodiments.

In order to achieve these effects, it is necessary for the full multi-channel signal set to reach the processors performing the steps listed above. Thus the result can be accomplished by providing a separate module that is connected between the signal source and the headphones. The signal source may be a game console, home theater receiver or processor, computer, portable device capable of outputting multi-channel audio, or other compatible device. Alternatively, the processors may be located within the headphones themselves, but that approach requires that the information contained in each channel remain separate when conveyed to the headphones, which requires a more complex cable. Alternately, the data may be transmitted wirelessly from the box to the headphone, before or after the summation. An additional alternative is to transmit the audio information to the headphones as an integrated digital signal, with decoding and digital-to-analog conversion taking place in circuitry within the headphones. The particular summing scheme described here is merely an illustrative example, and other relative weight-factors, and additional audio-to-tactile connections are contemplated by the present invention It may be that a movie, game, or song encoded with an existing audio standard such as Dolby 5.1, Dolby 7.1, or DTS already has appropriate low-frequency information in the selected channels that can be present using tactors. In those cases, routing directional cues to the tactors is more straightforward. Or, it may be that a given recording has routed much of the content to a Low Frequency Effects channel (LFE). Where low-frequency content has been routed solely or primarily to the LFE channel, the original information spatial cueing that may have once existed in those signals cannot be perfectly reconstructed. However, given the nature of most naturally occurring sounds, which tend to be comprised of both fundamentals and a series of overtones, a strong impulse in the (directionless) LFE channel, for example, is likely to be correlated with a higher-frequency impulse in one or more of the other directional channels. It is therefore possible to assign the LFE signal to one or more tactors based upon analysis of the signals in the other channels, and thereby providing a significant approximation of a full 5.1 or 7.1 experience with stereo headphones. A simple way to accomplish this is to route low frequency effects to the channel with maximum acoustic power in a specific frequency band, such as the range from 80-200 Hz, as illustrated in FIG. 15.

Figure 18:
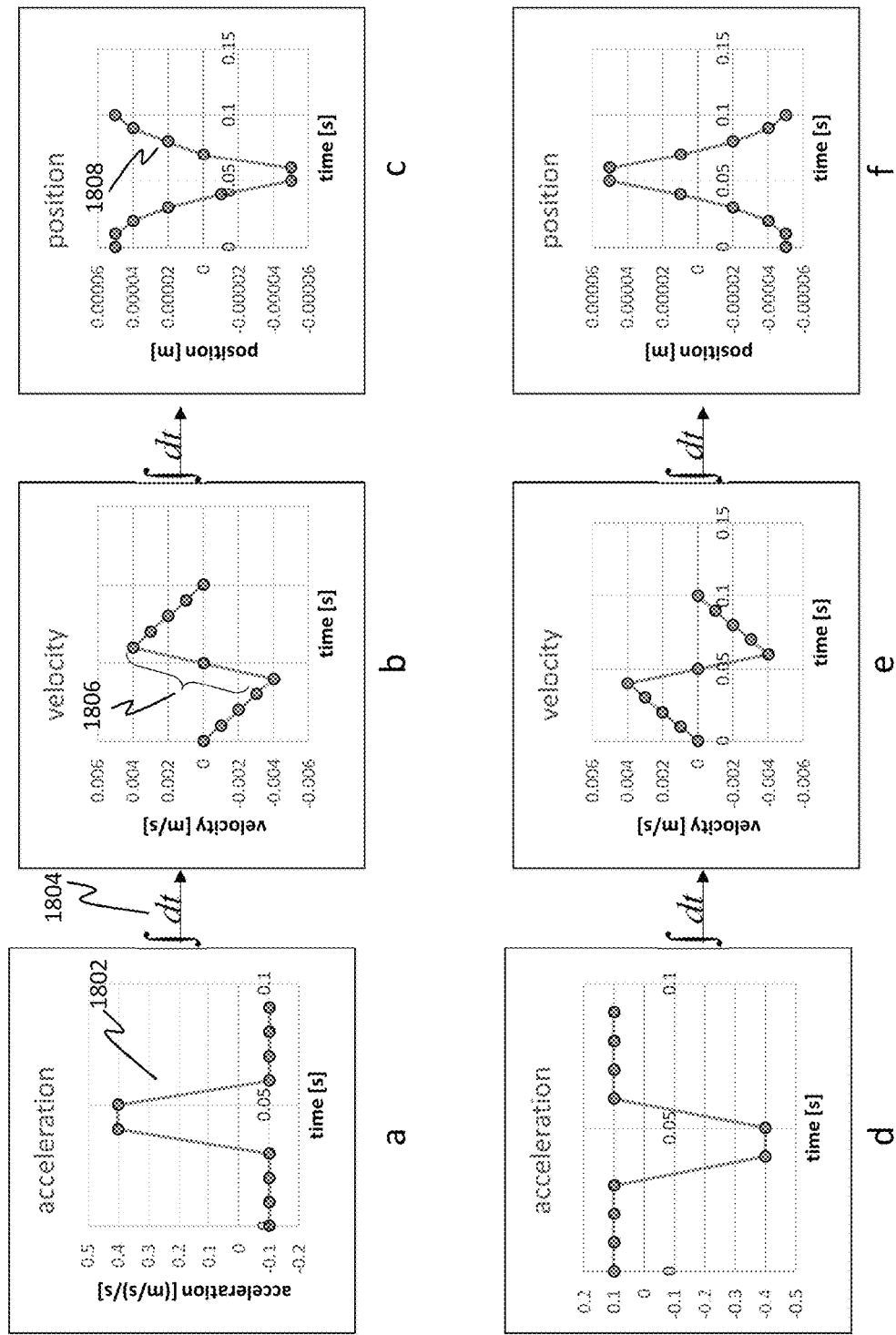
FIG. 18 shows graphs of waveforms that produce a sense of directed force, in accordance with various embodiments.

Although it is possible to achieve at least some version of the type of processing discussed through analog circuitry, it is significantly simpler to do so in the digital domain. Accordingly, the simplest way to accomplish this processing is prior to conversion of the digital multichannel signals into analog signals. However, it can still be accomplished after D/A conversion; it would then however be necessary to re-convert the signal into the digital domain prior to processing, and then process it through a second D/A converter after processing. FIG. 18 assumes that the input signals are in the digital domain.

Input channels may include right front 1502, left front 1504, center 1506, right side 1508, left side 1510, right back 1512, left back 1514, and low frequency energy channel 1520. Front left 1502 and front right 1504 signals are sent to the conventional drivers 1530 and 1532 (through circuitry that may include D/A converters and amplifiers, not shown) in addition to being sent to the digital signal processor (DSP) 1540. The remaining channels including all surround channels and the LFE channel are sent to the DSP 1540.

In an implementation of this approach, DSP 1540 is used to identify from moment to moment which of the seven directional audio channels contains the strongest signal. If, for example, left rear channel 1514 has the strongest signal (as for example, if the sound of an explosion is to be produced at that location), DSP 1540 will direct the signal from LFE channel 1520 to left back tactor 1550. Similar localization based on activity in the directionally specific channels can be used to direct output to right back tactor 1552, left front tactor 1554, or right front tactor 1556.

While some content presents sounds as being delivered purely by a single channel, modern programming sometimes uses multi-channel content in a more sophisticated way in order to present the illusion that sounds are coming from a place between two discrete outputs. For example, a sound that is intended to sound as if it coming from directly behind the listener may be presented with equal intensity in both the left rear and right rear channel, with no related output in any of the other channels. Such weighting is particularly useful when presenting the illusion of motion, so that sounds move smoothly between channels rather than jumping from one source to another; the weighting adjusts incrementally.

These more sophisticated effects can be produced as well using the subject invention. In some embodiments, the intensity of the signal in multiple input channels could be weighted and the output directed to a combination of tactors in order to approximate the ratios in the directional channels—in essence, multiplying the vector of spatial audio signals by a weighting matrix. Thus, for example, if instantaneous volume levels are 40% of maximum in the front right channel 1502, and 80% of maximum in right side 1508, and zero in the other channels, the taction signal would be divided among right front tactor 1556 and right rear tactor 1552 in order to place the subjective source of the sound reproduced by the tactors at a point between the two, but closer to the front tactor 1556.

One limitation of this approach is that in some contexts (particularly those with multiple uncorrelated events) not all sounds being generated are related to the specific content in the LFE channel. Thus a more sophisticated approach would involve analysis of the signals present in each directional channel. Heuristics can then infer sound direction from the waveforms present in each of those channels. For example, it is likely that the sound of an explosion will result (a) in a specific waveform in the LFE channel, and (b) that one or more directional channels will contain a signal that is correlated with that LFE signal. Factors indicating such correlation might include the degree to which frequencies in the audio channel are harmonics of the frequencies in the LFE channel. Or, the sound-power-level in the best audio channel might have the highest correlation with the sound power level in the LFE, or other factors. Those correlations may be used to inform the DSP as to which of the tactors should receive the LFE signal at a given moment.

In the case of many computer games, and for gaming platforms such as the Sony PlayStation and Microsoft X-Box, the problem of delivering directional bass signals to the appropriate tactor is simpler. Position information about sound sources is often available within game software, and the signal can be processed to activate the correct tactor.

Because game audio requires real-time audio-to-tactile filtering, it is most efficient to do taction processing within game-engine software. This approach does the necessary audio processing within the computer, console or other device, prior to generation of the signals for each channel and subsequent conversion to analog audio, as opposed to the methods previously discussed, in which processing occurs after those steps have already occurred.

Application Programming Interfaces for spatializing sound are standard features of video games and virtual reality simulations. The present invention contemplates extending the capabilities of these code libraries by incorporating the audio-tactile algorithms disclosed herein. The coding conventions now used to process monaural sounds into spatial audio apply in a natural way to the structure of the audio-tactile direction cueing algorithms outlined here. That is, the game or VII engine sends the following data to the spatializing sound function (1) position of a sound emitter relative to the listener's head and (2) the digital file of sound to be spatialized. After processing, the function returns to the game engine, or sends to the sound card (1) a right and left audio signal to display to the user and, optionally, (2) additional audio signals for additional transducers, such as the multiple speakers of Dolby 7.1 format.

The algorithms of the present invention are naturally implemented in this established programming structure. For directional tactile cueing, the general process of changing the signal frequencies (spectral filtering), and introducing appropriate time delays is analogous to the processing required for spatial audio.

The output of tactile directional cueing algorithms may be low-frequency modifications to sounds that will be routed to conventional right and left acoustic drivers. These low frequency signals may subsequently be extracted by low pass filtering at a processing component of the tactor driver. Or the signals may be directed to existing signal pathways that are "vestigial" for headphones, such as the multiple channels that remain unused when headphones are plugged into a Dolby 7.1 sound card. These channels may be attached to tactors instead. Or, the output of the algorithms may be directed to entirely new, dedicated tactile channels, by extension of current audio standards.

Another application for the subject invention involves imparting tactile spatial information to a user. A useful metaphor for the tactile spatialization of sound is the concept of "Liquid Sound." The directed sensation of flowing water is familiar to everyone. It has a vibratory component—the impact of individual droplets—and a directed force component: the net momentum of the water stream. Tactile stimulation that can create a sense of directed force can make natural use of this familiar metaphor to cue the direction of sound.

Figure 16:
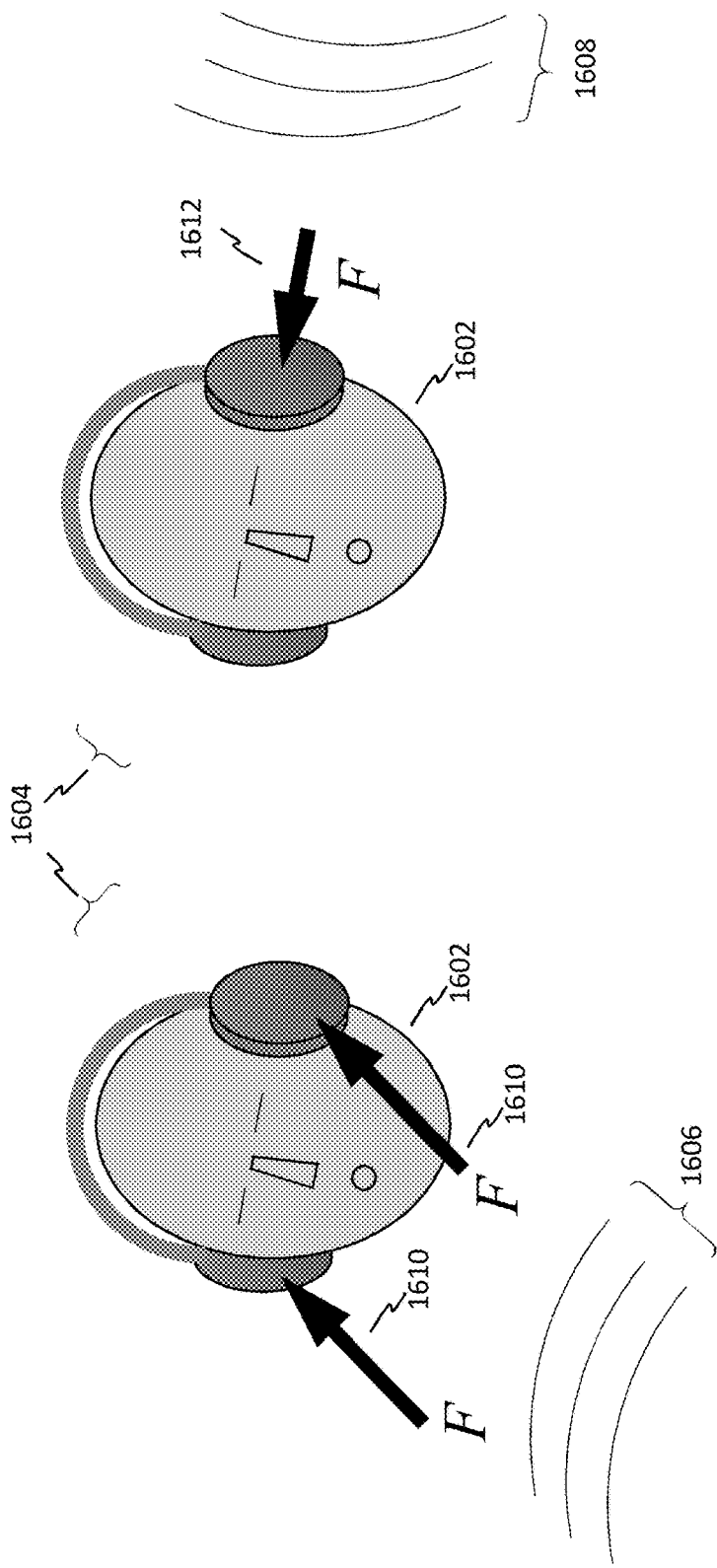
FIGS. 16a and 16b show illustrative pictorial diagrams of providing a sense of directed force via taction, in accordance with various embodiments.

FIGS. 16*a* and 16*b* illustrate this concept. Headphone wearer 1602 listens to sound through headphones 1604. If the sound source is thought of as having a palpable radiation pressure, like water pressure, then sound waves emanating from a source to the front 1606 exert a force 1610 that pushes headphones 1604 backward relative to the listeners head 1602. Sound waves emanating from a source to the side 1608 exert a force 1612 that pushes headphones 1604 to the side relative to the listener's head 1602. And a source to the rear pushes headphones forward, and so on. Through this metaphor, skin tractions may naturally be used to signal the direction of a sound source.

When a conventional symmetrical waveform is applied to the skin via taction in the form of shear vibration, there is no net directional force, and no directional signaling other than that conveyed by the difference in intensity between multiple tactors. That is, in a system comprising x tactors, if all x tactors receive the same symmetrical waveform, no directional cueing takes place. However, when shear vibration is applied to the skin, and the vibration has an appropriate asymmetric acceleration profile, the perception can be one of both vibration and a net pulling force. See T. Amemiya, H. Ando, T. Maeda, "Virtual Force Display: Direction Guidance using Asymmetric Acceleration via Periodic Translational Motion", In Proc. of World Haptics Conference 2005, pp. 619-622. This occurs because the human tactile system is not a perfect integrator, and brief, strong accelerations are felt more than longer weak ones.

Figure 17:
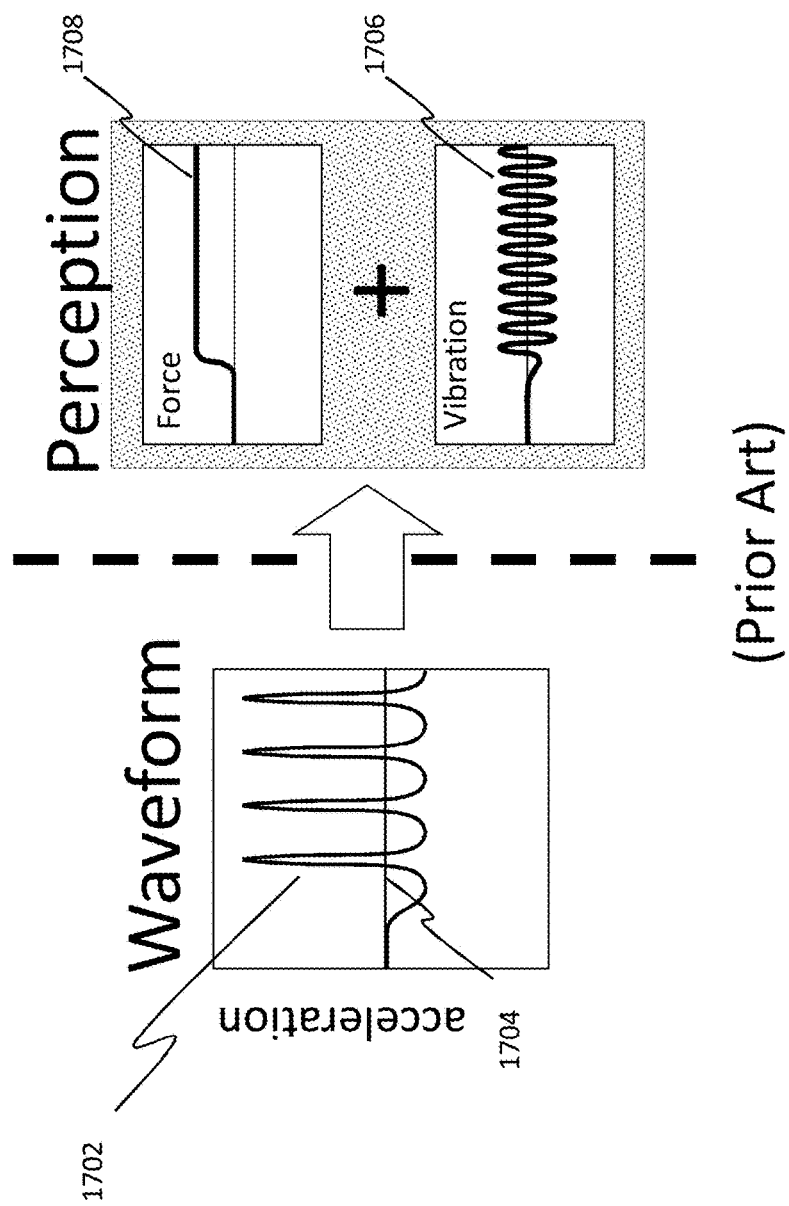
FIG. 17 shows a prior art illustration of a waveform that produces a sense of directed force.

A visual representation of this effect is shown in FIG. 17. An asymmetrical waveform 1702 presents brief, strong acceleration pulses in the positive direction, and longer, weaker accelerations in the negative direction relative to zero line 1704. It has been shown that such a waveform is perceived not as an asymmetric waveform per se, but as an effect having two components: a sensation of vibration at the frequency of the signal input to the tactor 1706, and a sensation of directed pulling force 1708. The technique works best over frequencies between about 7 Hz and 70 Hz, though is effective up to ~250 Hz. In the present invention, we show how to use this illusion to localize sound.

This tactile illusion provides a rich opportunity to convey directional information about sound. It means that a shear tactor located in a left or right ear cup can provide more than just right/left information by virtue of being on or off. It can also provide forward-back information by directing peak accelerations forward or backward. Thus additional directional cues can be derived from fewer tactors.

To do the requisite audio-to-tactile signal processing, it is useful to consider how acceleration pulses that evoke the tactile illusion of directed pulling appear when expressed in terms of velocity and position. This is accomplished by simple integration with respect to time, and it shows that an acceleration pulse is a velocity sawtooth, as illustrated in FIG. 18.

Consider a positively directed acceleration pulse 1802 that evokes a sensation of pulling in the positive direction, as shown in the upper left of FIG. 18 (a). Long periods of low acceleration in the negative direction alternate with brief spikes into positive acceleration. Integration of this acceleration signal with respect to time 1804 shows the velocity of this pulse to be a sawtooth wave with the steep part of the sawtooth 1806 directed in the positive direction. It is useful to express the pulse in this form because, as previously discussed, velocity correlates well with perception intensity, and transducers have been developed that respond as velocity sources. Thus, the waveform shown in 1806 is the presently preferred waveform to be fed to a tactor in order to generate directionally biased perception.

In FIG. 18c, for completeness, the integration is carried one step further, from velocity to position. Thus graph 1808 represents the characteristics of the positively biased waveform in terms of position over time. Graph 1808 shows that the tactor spends most time in one half of its working range and makes takes parabolic ramps to and from a moment of maximum slope change that occurs in the other half of its working range.

The graphs shown in FIGS. 18 d, e, and f, show the same graphs, as those in FIGS. 18 a, b, and c, respectively, except that the pulsatile signal is negatively directed so as to create perceived force in the negative direction.

It should be noted that the equivalent graphs for an un-directed low frequency tone (that is, a sine wave), look very different. The accelerations, velocities and positions- are all simply smooth sinusoids.

When tactors in a wearable device such as headphones are tuned to respond to voltage with velocity, then tactile directional cues may be produced by signal processing methods that turn a low-frequency sine wave (simple vibration) into a saw-tooth wave (directed vibration). The steep part of the sawtooth is the needed acceleration burst. When the position of a sound source is known, as in game software or mixing film audio, the position of the sound source is used to set the polarity and steepness of the burst.

Figure 19:
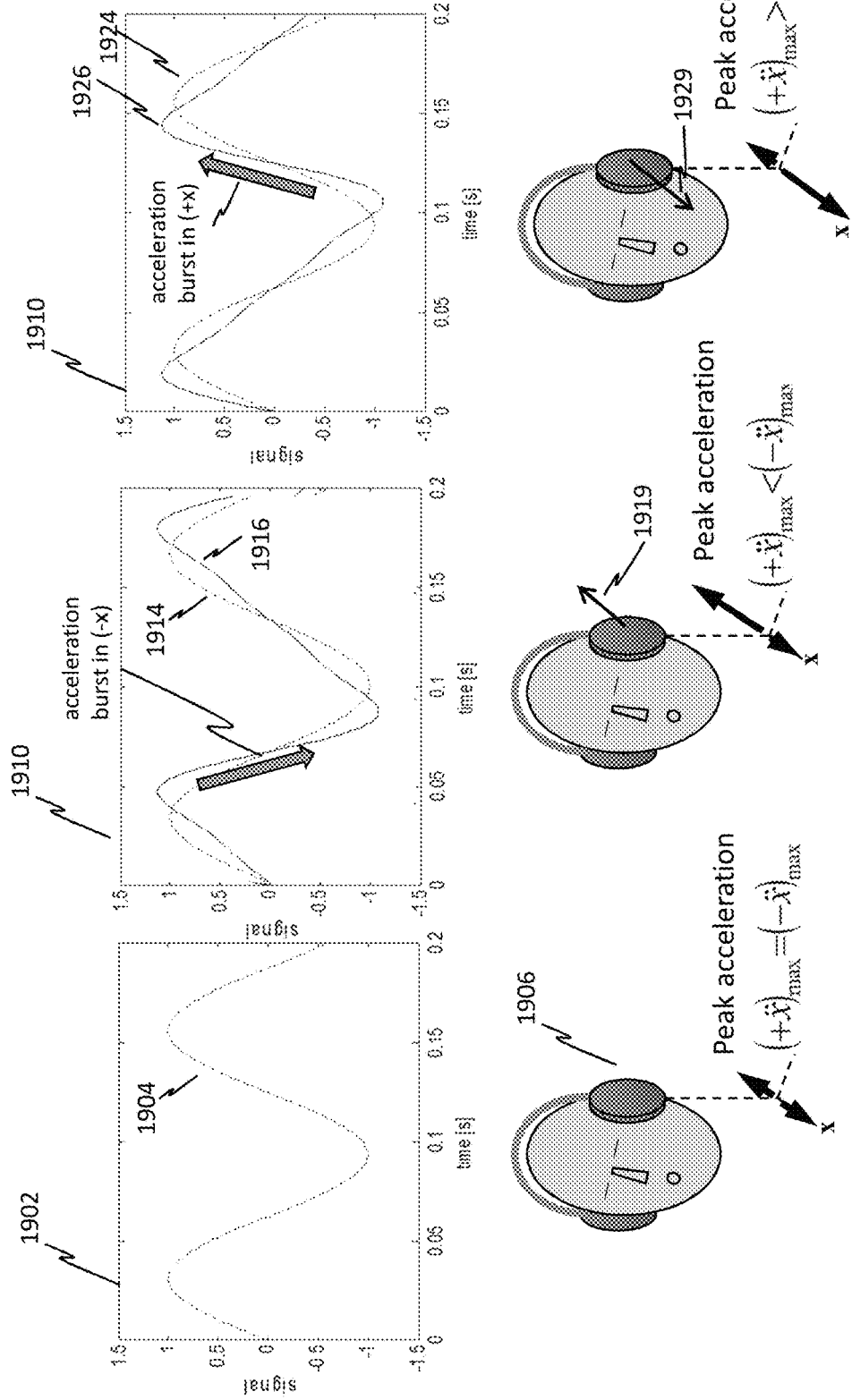
FIG. 19 shows a pictorial diagram illustrating an exemplary method for processing a non-directed waveform into a waveform that produces a sense of directed force, in accordance with various embodiments.

One method of turning a non-directed sine wave into a directed sawtooth is to add higher harmonics. Examples of how this processing affects a sine wave signal are shown in FIG. 19. Graph 1902 illustrates a sine wave 1904. The sine wave has no directional bias, and so the peak acceleration experienced by a person wearing headphone cup 1906 equipped with one or more tactors reproducing that sine wave is equal in both directions, and no net directional force is experienced.

Graph 1910 shows a reference sine wave 1914 identical to sine wave 1904 as well as that waveform processed in order to create polarity and directional cueing, which results in a rough sawtooth wave 1916. (A perfect sawtooth includes all harmonics, and is thus not achievable by a low frequency driver. As a practical matter, adding a few harmonics is currently deemed sufficient and even advantageous.) Rough sawtooth wave 1916 shows a slow rise and a fast fall. It is thus biased in the negative direction, and the person wearing headphone cup 1918 will perceive that the cup is pulling backwards relative to his head, as indicated by arrow 1919.

Graph 1920 shows both the reference sine wave 1924 identical to sine wave 1904 as well as that waveform processed in order to create polarity and directional cueing, which results in a rough sawtooth wave 1926. Rough sawtooth wave 1926 shows a fast rise and a slow fall. It is thus biased in the positive direction, and the person wearing headphone cup 1928 will perceive that the cup is pulling forward relative to his head as indicated by arrow 1929.

Exemplary Matlab code for transforming a non-directed sine wave into a directed one is presented in FIG. 20. The code accepts input signal (x) 2002 and an indicator of, for example, front or back directedness (z) 2004, where z=+1 indicates straight ahead, and z=−1 indicates straight behind. The code adds two higher-order harmonics to the signal to sharpen it into an output (y) 2006. In this example, the contribution of a higher harmonic sin(2θ) is calculated from the input signal sin(θ) by noting that $$2\sin(\theta)\cdot\cos(\theta)=\sin(2\theta) \quad \text{(Eq. 4)}$$

and that $$\cos(\theta) = \frac{d}{dt}\sin(\theta). \quad \text{(Eq. 5)}$$

Thus, differentiation of the input signal, and multiplication of the result with the input signal itself is used to produce the desired harmonics. But it will be clear to one skilled in the art that any number of approaches to "sawtoothing" the sine wave can yield the desired result.

Figure 21A:
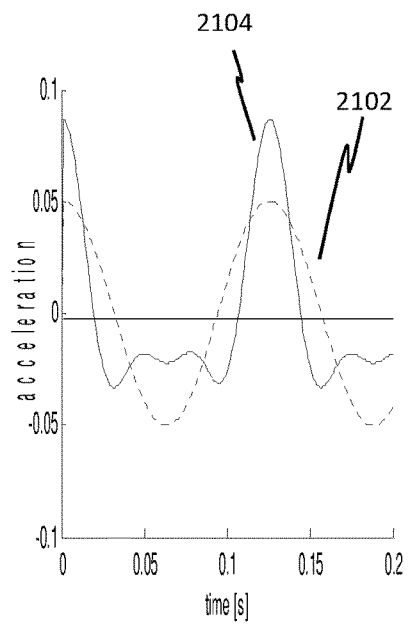
FIGS. 21a-21d show exemplary graphs of the effect signal processing transforming a sine wave into a directed one, in accordance with various embodiments.
Figure 21B:
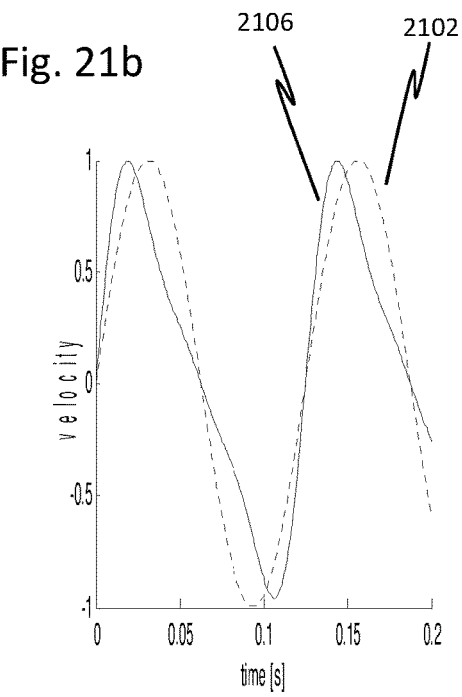
Figure 21C:
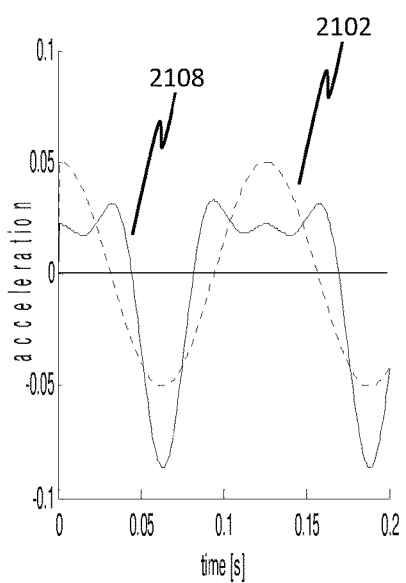
Figure 21D:
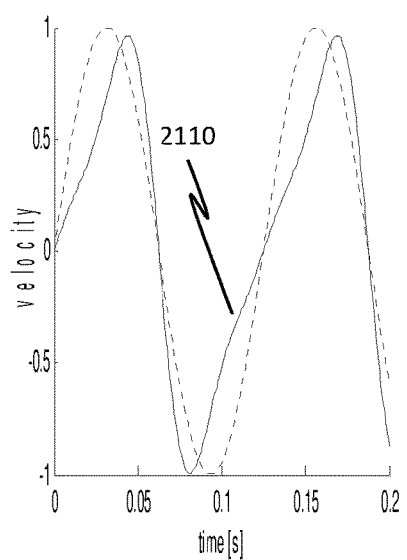

An example of the effect of such processing on a 15 Hz sine wave is shown in terms of the expected velocity and acceleration of a tactor-enabled headphone driven by that signal in FIGS. 21a-21d. As shown in FIG. 21a, a waveform that would have produced simple sinusoidal motion 2102 is converted by the code shown in FIG. 20 into one that produces positively directed acceleration pulses (z=+1) 2104. As shown in FIG. 21b, the effect is achieved by commanding the transducer, which acts as a velocity source, to follow the sawtooth with steep regions directed positively 2106, as calculated by the code. Transformation of the signal to produce negatively directed acceleration pulses (z=−1) 2108 is shown in FIG. 21c. The accelerations are produced by the transformed velocity command 2110 in FIG. 21d.

Figure 22:
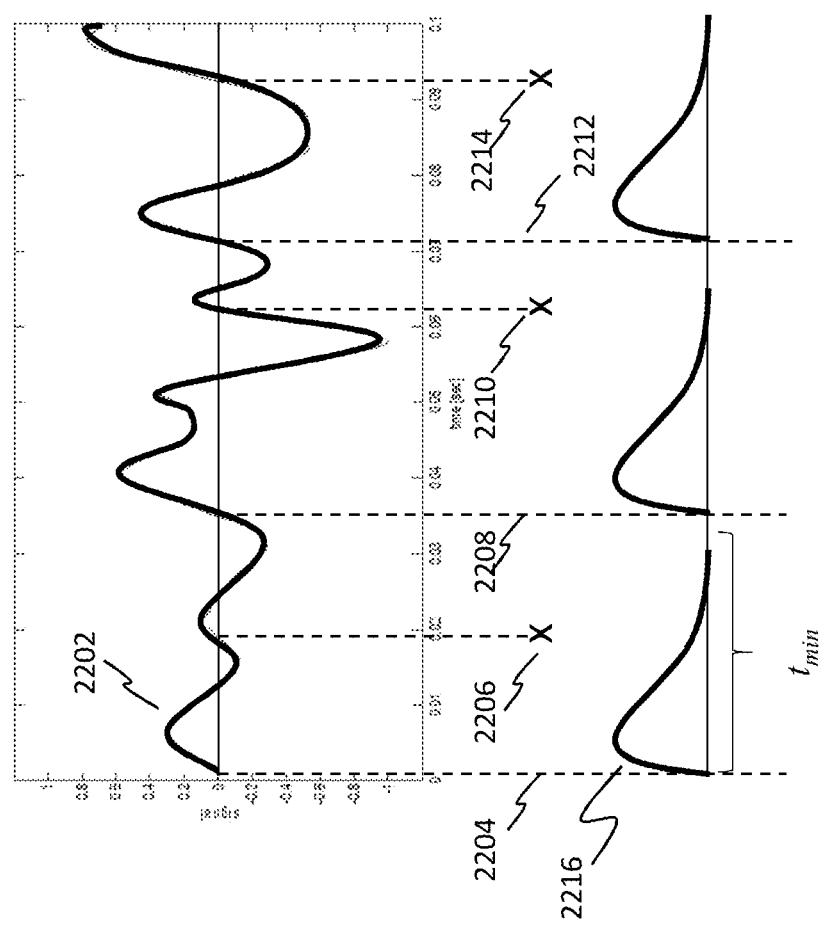
FIG. 22 shows a graph of another exemplary method for transforming a non-directed sine wave into a directed one, in accordance with various embodiments.

This harmonics-based filter (which synthesizes higher harmonics based on the frequency of the fundamental) is just one exemplary method for creating the same directed effect. One possible disadvantage of this particular approach is that the velocity calculation step is sensitive to noise. This may in some cases increase distortion. Another exemplary method for adding directionality that does not have those effects is to detect zero-crossings and add a polarizing bump to the signal when appropriately-directed crossings are detected. A graphic representation of this approach is shown in FIG. 22.

Audio waveform 2202 is a complex signal. The portion of the signal displayed includes 11 zero crossings. It should be noted that adding a positive pulse at an upward zero crossing produces a smooth, continuous, and positively-directed directional signal, while adding a negative pulse at downward zero crossing smoothly produces the opposite result. Thus when seeking to produce a directional cue, on average half of the zero crossings will be appropriate to modify and half will not. In the illustrated example, the six negative-to-positive crossings are at 2204, 2206, 2208, 2210, 2212 and 2214. A pulse 2216 of a given duration, $t_{min}$, is added when an appropriate zero crossing is detected at 2202. To prevent prematurely re-triggering the pulse, once a first pulse is triggered, additional zero-crossing are disregarded until $t_{min}$ has elapsed. Thus negative-to-positive crossings 2206, 2210 and 2214 do not receive the polarizing bump because they are too temporally proximate to the previous pulses. By this means, a series of directed asymmetric velocity pulses may be added to an audio signal at a frequency approximately equal to $(1/t_{min})$. By adding these pulses at zero crossings, audible discontinuities in the signal are avoided.

This approach has the advantage of simplicity and robustness. If a pulse shape and frequency that best evokes the haptic illusion of directed pulling is determined, for example by deconvolution, it guarantees that exactly this signal is added, and that it is added at approximately the best frequency. It is an approach that prioritizes the directed pulling sensation.

In contemplating the range of processing techniques that may produce the directed pulling sensation, this approach lies at one extreme. It is almost indifferent to the input signal. At the other end is the first algorithm presented, in which the sharpening harmonics are derived entirely from the input signal. In this range, one skilled in the art may imagine a variety of processing techniques, some that conform more closely to the input signal, and others that prioritize production of the directed tactile illusion. These two non-limiting embodiments merely serve to illustrate the range of techniques for processing audio into directed tactile sensation that will occur to one skilled in the art.

Pseudocode and an illustration of the zero-crossing method are provided in FIG. 23. An upward directed zero-crossing detector 2302 monitors the input signal for moments when the last point was below zero, and the next is above it. When this occurs it raises a flag by setting ("upzerocross=1"). A next block of code 2304 checks to see if the "upzerocross" flag is up, and if it is time to play a bump (testing to see whether $t_{elapsed} > t_{min}$). As long as this is true the code pointwise adds the bump to the input signal. A third block of code 2306 detects that the bump is completely played (i>bumplength) and, if it is, resets the flags to prepare for playing the next bump. It will be apparent to one skilled in the art that the introduction of a signed variable for bump direction and size, analogous to (−1<z<1) used in previous illustrations, may be introduced to trigger detection of downward going zero-crossings, and addition of negatively directed pulses. Likewise, intermediate values of this "z" direction variable will be suitable for scaling the size of the bump to vary the pulse intensity.

Many other synthesis or filtering methods are possible, and fall within the scope of the present invention. Generally speaking, appropriately-directed acceleration bursts consonant with the existing low-frequency audio (that is, appropriately related both harmonically and temporally) can be generated, where the polarity and sharpness of the bursts indicate the direction and proximity of the sound source.

An advantage of the "bump" method of adding these bursts is that the shape of the bump can be tailored to the step response of the wearable system. That is, the bump can be whatever wave shape best produces the desired acceleration burst on the body. The shape of this wave can be found, for example, by deconvolving the desired velocity profile with the step response of the system.

Despite best design efforts, an inertial tactor cannot be a perfect velocity source. There are several limitations on performance. The rate of velocity change is limited by peak power. The peak velocity is limited by damping. The velocity can go in one direction for only a limited time before the inertial mass hits a travel stop. The overall system of tactor, headphone, and head may be slightly underdamped, and therefore remain in motion after zero velocity is commanded. Furthermore, different users with different skin mechanics will introduce different stiffness and damping into the system, altering the system response. For all these reasons, inertial tactors are an imperfect velocity source.

In the presence of these limitations, the degree to which the system follows a desired velocity trajectory can be improved with signal processing. Deconvolution, for example, may be applied to a target tactor velocity signal, so that the tactor does the best possible job of reproducing it. A full discussion of deconvolution is beyond the scope of this disclosure, but briefly, the steps are these.

First, the deconvolution filter is found with the following steps:
 (1) apply a voltage pulse (d) to a tactor in the system;
 (2) measure the velocity response (b) of the system, for example via the signal of an accelerometer on an ear-cup, appropriately integrated in order to determine ear cup velocity;
 (3) calculate the Fourier transform of the detected pulse (b);
 (4) calculate the Fourier transform of the desired voltage pulse that was applied to the system (d); and
 (5) calculate the frequency response of the filter. The frequency response of the filter (f) is the frequency spectrum of the desired pulse, (d), divided by the frequency spectrum of the detected pulse (b).

A deconvolution filter that gives good results for most people may be found by testing tactor-equipped headphones on multiple people and averaging their deconvolution filters. Alternately, a user-specific custom filter can be determined by the system automatically upon startup. To do this the system follows steps 1-5 upon startup. To use the deconvolution filter, the following steps are undertaken:
 (6) in suitably-sized blocks, the Fourier transform of the target signal is calculated, including both amplitudes and phases;
 (7) in the Fourier domain, the spectrum of the target signal is divided by the Fourier spectrum of the deconvolution filter;
 (8) the result of this division is transformed back from the Fourier domain to the time domain in order to get the corrected signal; and
 (9) the corrected signal is sent to the tactor.

In view of the above, one skilled in the art will understand that applying a deconvolution filter to an input signal can correct, to limited degree, deficiencies in the ability of a tactor to faithfully reproduce the target velocity signal. Limitations of the deconvolution approach include sensitivity to noise, and the introduction of lag. Thus, it is particularly appropriate for offline processing. A good application of deconvolution processing is to determine the voltage signal that best produces a velocity sawtooth that makes an acceleration pulse that evokes the tactile illusion of directed pulling.

A logical place to implement this kind of directional filtering is in the audio API of a game engine, for real-time processing. For offline work, the directional filtering can be embodied in plug-ins for sound editing software, such as in VST or AU plugins, for example.

Figure 24:
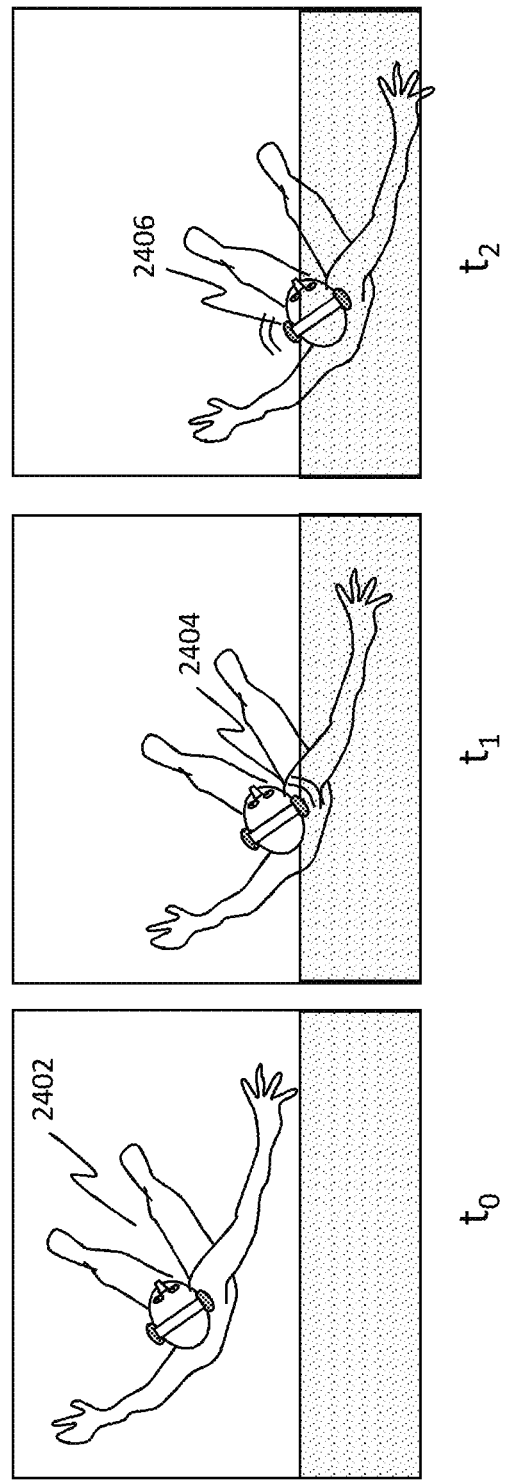
FIGS. 24-26 show pictorial representations of providing temporally based tactile sensations, in accordance with various embodiments.

As discussed above, asymmetric waveforms can be used to present directional effects with tactors. Additional effects can be presented (or other effects can be made more convincing) by using tactile timing cues for signaling the direction of a sound source. Because the speed of sound in air is fast (~343 m/s), the interaural time differences normally used by our audio cortex (that is, differences in arrival time of sound waves between our two ears) are short (sub-millisecond). Applying such short delay may be effective in synthesizing locational cues when applied to conventional drivers in headphones. Unfortunately, this timescale is too short for the tactile system, which is "blurry" by comparison the human body perceives tactile events less than about 20 milliseconds apart as simultaneous. One may imagine, however, that a time interval perceptible to the tactile system would occur if, for example, one could fall slowly into water, as illustrated in FIG. 24.

At time $t_0$, subject 2402 has not yet contacted the water. Tactor-equipped headphones would ordinarily not be called upon to produce any effect related to the impending event. At time $t_1$, the right side of the head of subject 2402 has entered the water. In order to simulate this effect, one or more tactors in right headphone cup 2404 would generate a pulse. At time $t_2$, the left side of the head of subject 2402 has entered the water. In order to simulate this effect, one or more tactors in left headphone cup 2406 would generate a pulse. The delay between the first pulse in right headphone cup 2404 and the second pulse in left headphone cup 2406 could reinforce the illusion of that event. That is, the water line might nudge a closer ear cup first at time $t_1$ and a further ear cup second at time $t_2$. In the absence of all other information, the relative timing of the events would provide some information about the orientation of the water surface relative to the head.

Absent specific preparation as described below, no preloading or other preparatory action is generally taken in the use of tactors or loudspeakers. The maximum force a tactor can generate is defined at least in part by its maximum travel and the maximum speed with which it can cover that distance. Tactors, such as those described herein, are likely to move more or less symmetrically about a resting position. In the simplified case in which a tactor is completely idle until time $t_1$, at which point it is called upon to deliver a single maximal impulse, only half of the total potential travel of the tactor is available.

A method for increasing the capacity of tactor to convey such an effect would be to use a low-velocity signal to give the tactor a "backswing," allowing it to reach maximum travel in the "minus" direction immediately before it is asked to deliver a maximal pulse in the positive direction, and vice versa in the opposite case. If the "backswing" is sufficiently slow, it will be imperceptible to the wearer, but this technique will effectively double the power available for single impulse without requiring a more massive tactor or a more powerful amplifier.

Delivering such an effect requires a preview capability: the ability (preferably in the digital domain) to insert a backswing into the signal stream before the event that is to be modified. Inserting this pre-pulse "backswing" is straightforward when processing sound files offline, such as in the production of sound for movies and music. In real-time spatial audio applications, such as computer gaming and virtual reality, a reasonable approach is to include the "back swing" at the end of the pulse. Although the first pulse in a train of pulses does not get the benefit of a back-swing, all subsequent pulses do, and no lag is introduced into the system. With this approach, the backswings will generally (but not always) be correctly oriented, since the direction of a sound emitter in a virtual environment changes slowly with respect to the frequency of the pulses. In situations with multiple sound emitters from multiple directions (requiring oppositely directed backswings), this approach degrades naturally to be no better or worse on average than performance without backswing.

Figure 25:
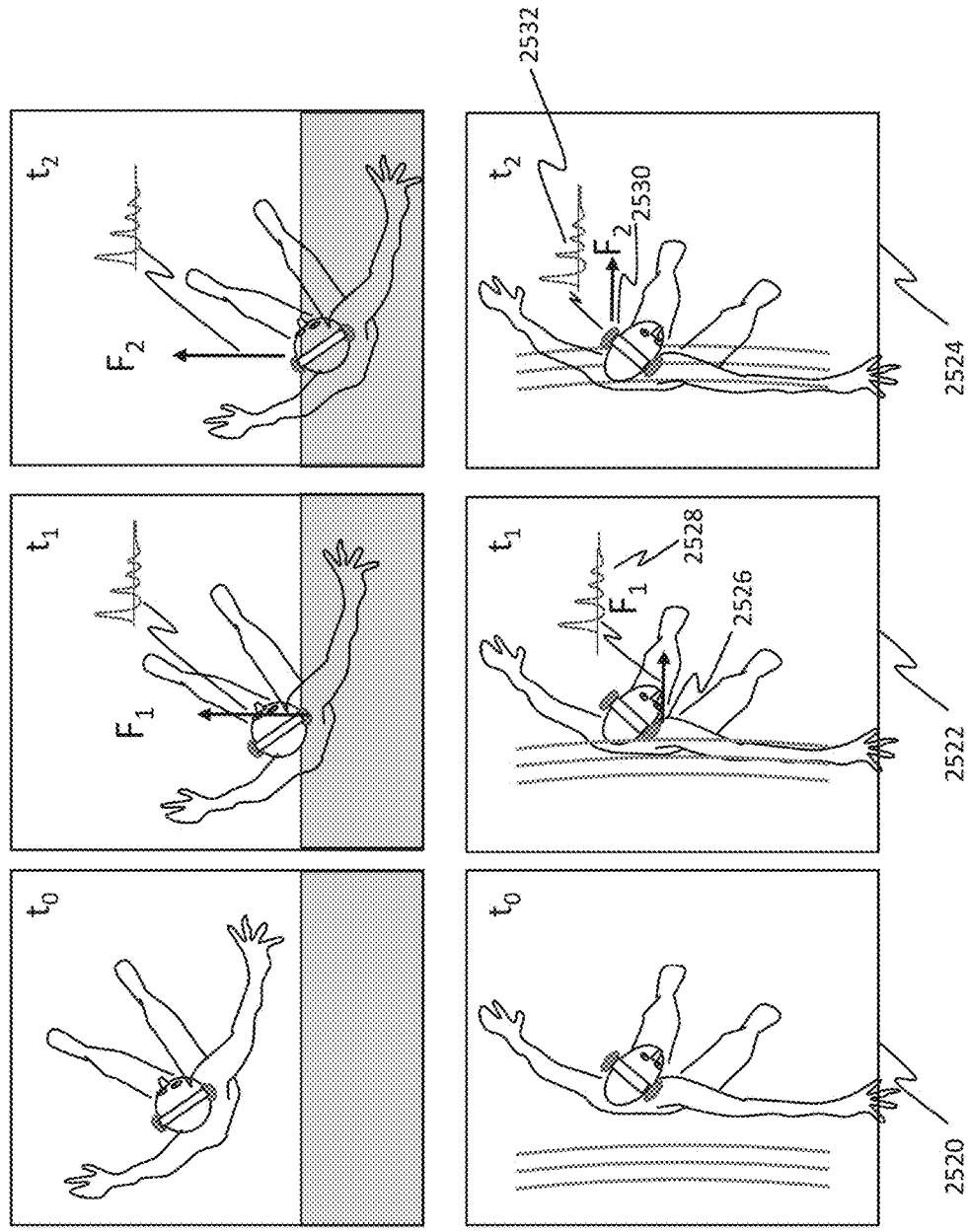

This general idea about timing and directional taction (Liquid Sound) can be extended from the situation of falling slowly into water to perceiving a very slowly moving shock wave in air, as shown in FIG. 25. Images 2502, 2504 and 2506 show the same conceptual scene discussed with respect to FIG. 24, as observed at times $t_1$, $t_2$ and $t_3$, respectively. At $t_1$, force $F_1$ 2508 pushes against the right side of the subject's head; the tactor in the right ear cup generates waveform 2510 in order to simulate that force. At $t_2$, force $F_2$ pushes against the left side of the subject's head; the tactor in the left ear cup generates waveform 2514 in order to simulate that force. From that conceptualization one can imagine how tactors can simulate a slow shock wave emanating from any given sound source. The key is to make the interval between arrival times long enough for the tactile system to perceive. Studies with low-resolution tactors applying tones to the back of the torso have shown that time intervals for delays between tactors in the range 20-120 milliseconds are most useful for conveying a sense of fluid tactile motion.

Accordingly, an aspect of the subject invention is to cue sound direction by processing audio so that amplitude of a tactor farther from a sound source is kept low for an interval long enough for the tactile system to perceive the onset difference (e.g. 50 milliseconds). This adds a tactually perceptible time difference cue to the acoustically perceptible interaural time difference cue that the nervous system already uses to localize sound. Thus in FIG. 25, at time $t_0$ as shown in image 2520, the shockwave has not yet reached the (headphone-wearing) subject. At time $t_1$, as shown in image 2522, the shockwave has reached the right side of the subject's head, which is simulated by the tactor in the right headphone cup 2526, which produces waveform 2528. As the simulated shock wave reaches the subject's left ear at time $t_2$ as shown in image 2524, the tactor in left headphone cup 2530 produces waveform 2532.

Figure 26:
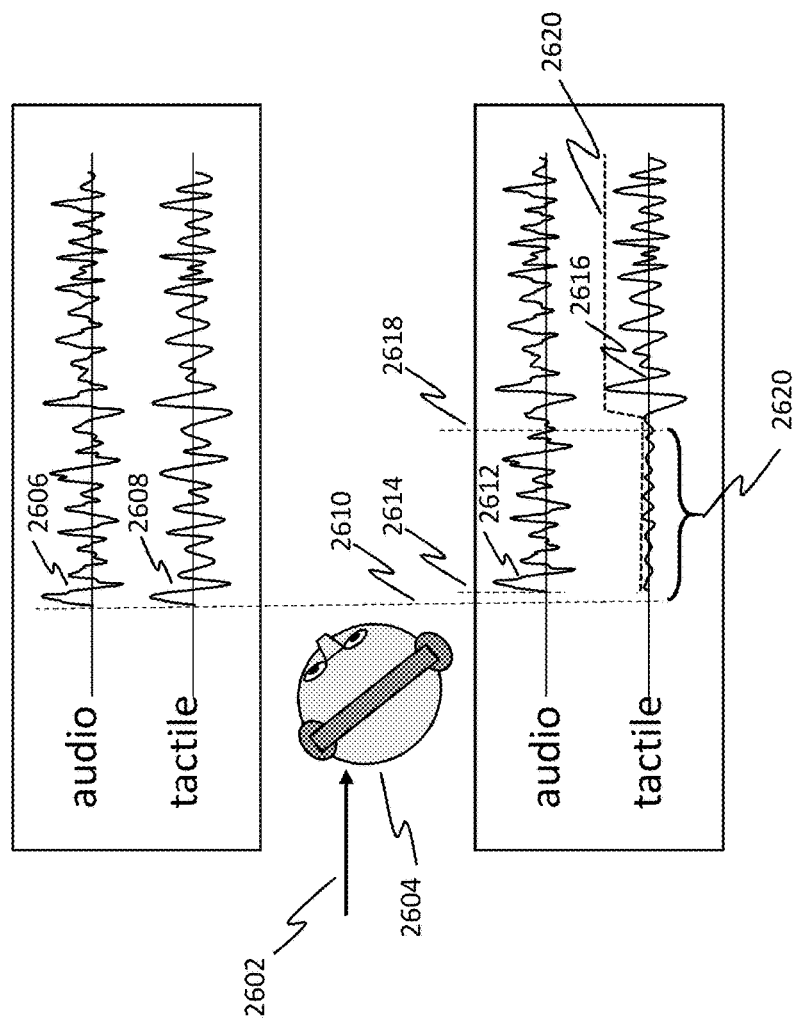

Another view of this method for delivering spatial cueing is shown in FIG. 26. What is represented is a method for rendering a tactile inter-aural arrival time cue that is long enough for the tactile system to perceive, so as to cue the direction of a sound 2602 arriving at the head 2604. The signals sent to the ear closer to the simulated sound source (in this case the left ear) includes audio signal 2606 and tactile signal 2608, which are both presented to this side without any delay at time 2610. The ear that is further away from the simulated sound source (in this case, the right ear) receives signals related to the same event, but with delays. This ear receives audio signal 2612 at time 2614, about 0.4 milliseconds after time 2610. The more distant ear receives tactile signal 2616 at time 2618. The delay 2620 between the closer tactile signal initiation point 2610 and the more distant side tactile initiation point 2618 is delay 2620, which may be two orders of magnitude longer than the delay in the audio signal, since the auditory system intuits direction from delays of around 0.4 millisecond, and the tactile system intuits direction from delays of around 40 millisecond.

The delay 2620 between tactile signal 2608 and tactile signal 2616 may be produced in a number of ways. One method is to apply an envelope filter 2620 to tactile signal 2616, with the duration of the "closed" phase of the envelope filter's action timed to equal the desired delay. However, for events of very short duration, this method may eliminate a significant portion of the desired signal. Thus another approach would be to produce the same signal in the delayed channel as in the non-delayed channel, but provide delay, a process best performed in the digital domain, though analog delay lines could also be used.

A number of variations on this general approach are contemplated. The signals sent to the left and right tactors may be the same, so that only the time delay distinguishes them. They may be different, so that additional cues are provided by other characteristics such as phase differences, amplitude differences and the like. More nuanced presentation is also possible if more than one tactor is present on each side. Each tactor may also use filtering and/or waveform synthesis in order to provide polarization of one or more of the signals, as described above. These techniques may be combined in order to enhance the effect.

Some previously discussed embodiments assume that the tactor is rigidly mounted to the cup of the headphone. This approach requires that the tactor move at least the entire mass of the headphone cup, and in many cases some portion of the mass of the rest of the headphone system, in order to produce motion at the wearer's skin. This approach is analogous to holding one's hand against the side of a bookshelf loudspeaker: in order to produce sensible vibration, the driver must not merely excite air, as loudspeakers are intended to do; it must shake the entire cabinet, which is considerably more demanding. Thus significant force is required to excite the entire headphone cup, which necessitates a relatively powerful motor and amplifier, as well as a large battery or other power source.

It would be advantageous to provide a method for producing tactive forces without having to excite the relatively large mass of the entire headphone assembly. An additional aspect of the subject invention is therefore the use of tactive cushions movable on actuated plates that are partially decoupled from the headphone cups, so that the cushions efficiently transmit shear to the skin without having to excite the mass of the rest of the headphone assembly.

It is clear that there are some advantages to this approach over vibrating an entire ear cup, as disclosed in application Ser. No. 14/864,278, now issued as U.S. Pat. No. 9,430,921. If only the cushion is moved, as opposed to the entire headphone assembly, the effective moving mass is reduced and less force is required for a given tactive output. Also, everything in the headphone that is not the cushion becomes a reaction mass (analogous to the cabinet of a conventional loudspeaker when producing sound waves), providing a heavier platform for the cushion to push off of, enabling the tactor to provide output at lower frequencies.

Figure 27:
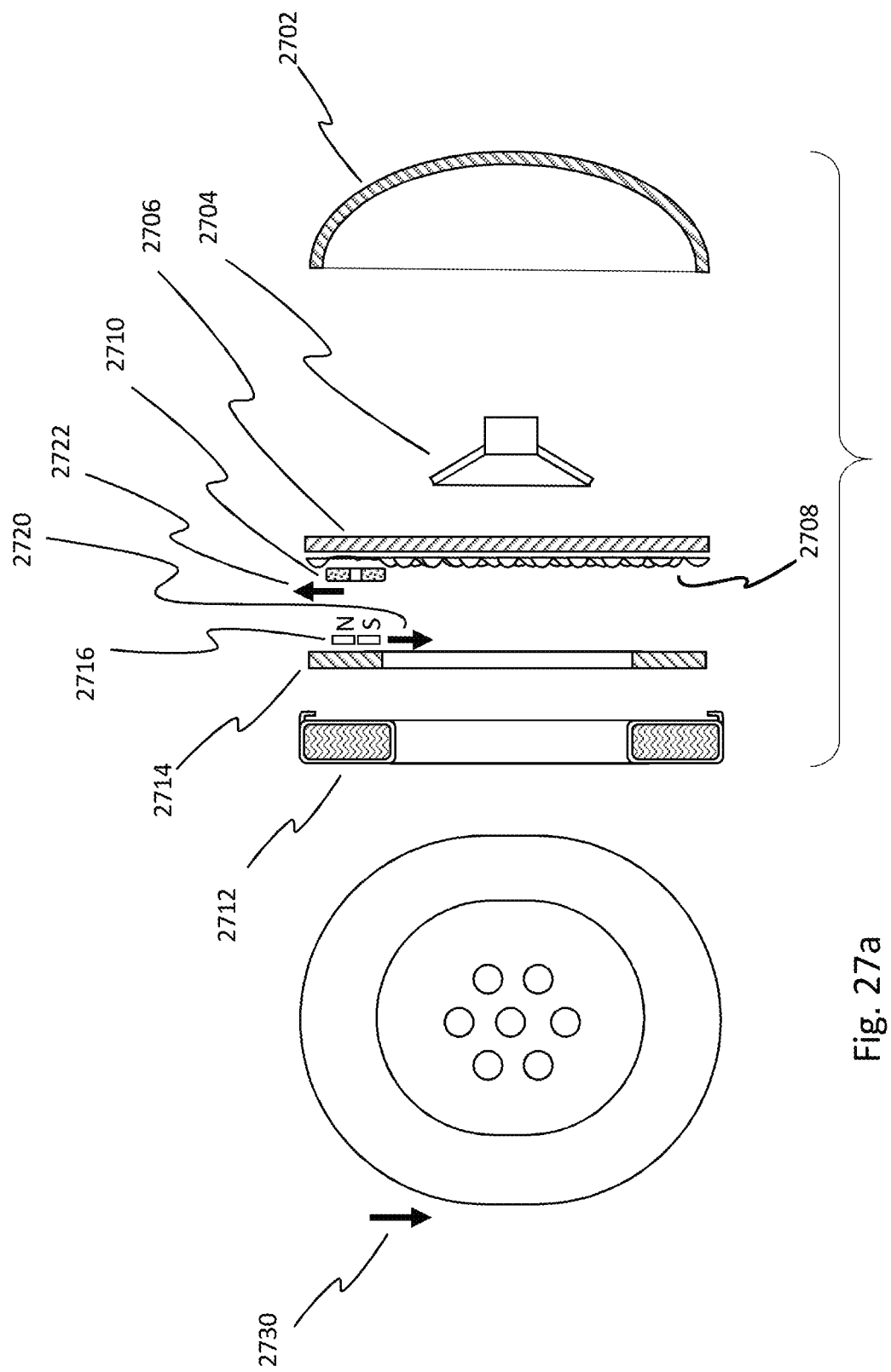
FIGS. 27a and 27b illustrate simplified partial plan and exploded sectional views, respectively, of components that may be used in order to move a cushion independently of the headphone housing with taction, in accordance with various embodiments.

FIG. 27 illustrates simplified partial plan and exploded sectional views of components that may be used in order to move a cushion independently of the headphone housing with taction. Ear cup 2702 and sound baffle plate 2706 are rigidly connected to each other, and form the enclosure for audio driver 2704. (As previously discussed many variations on these structures are possible, including multiple drivers, open-backed headphones, etc.)

The conformable portion of cushion 2712 is rigidly coupled to moveable stage 2714. In a conventional headphone, the cushion would be attached to the cup and/or baffle plate 2706 so as to allow minimal shear motion of the cushion relative to the baffle plate, and to damp whatever motion is permitted. In the subject invention, moveable stage 2714 is permitted to move relative to baffle plate 2706 by suspension 2708, described in greater detail below.

One or more tactors are mounted so as to provide motive force to the moveable stage relative to the baffle plate. This may be accomplished, for example, by attaching magnets 2716 to moveable stage 2714, and electrical coil 2710 to the baffle plate. When current is applied to coil 2710 in the form of a waveform the magnets attached to the stage experience a force in one direction 2720, and coil attached to the baffle plate experiences an equal force in the opposite direction 2722. Where cushion 2712 and moveable stage 2714 together have significantly lower mass than baffle plate 2706 and all of the elements rigidly attached thereto, the primary result will be the desired motion 2730 of the stage 2714 and cushion 2712 (shown in plan view), applies shear traction to the skin of the wearer.

The suspension of a tactor as movable cushion must meet a daunting array of challenges. In the preferred embodiment, it should be thin, drop-proof, allow multiple degrees of freedom, limit over-travel, and be silent.

Figure 28:
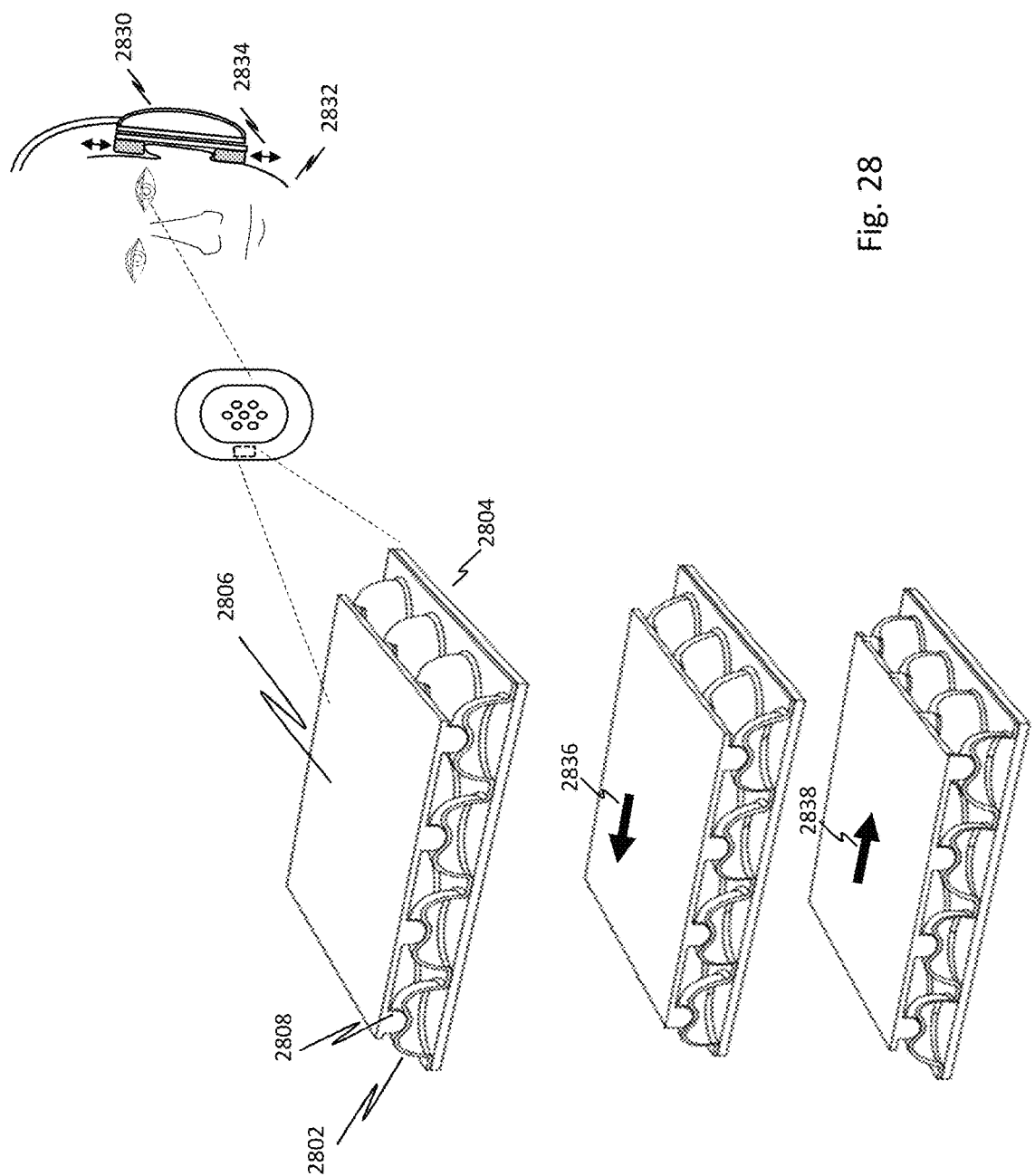
FIG. 28 shows perspective views of a suspension system that includes elastic domes resting on a first plate and supporting a second plate having projecting bosses that partially deform the domes, in accordance with various embodiments.

A first example of such a suspension is shown in FIG. 28. The suspension system includes elastic domes 2802 resting on a first plate 2804 supporting a second plate 2806 with projecting bosses 2808 that partially deform and ride domes 2802. Domes 2802 may be filled with air or fluid that may damp audible vibration. One of the plates may be, for example, the sound baffle plate of a headphone, and the other may be a movable stage carrying the cushion of said headphone.

Such a suspension system may be mounted so that both the first plate 2804 and second plate 2806 are mounted between headphone cup 2830 and the rest of the headphone system, so that both plates are roughly parallel to the sagittal plane of the listener's head 2832, and relative motion 2834 is enabled between the stage 2806 that carries the cushion and headphone cup 2830 along an axis parallel to the sagittal plane.

When tactive force 2836 is applied, plates 2806 and 2804 attempt to move relative to each other, and elastic domes 2802 deform as bosses 2808 move against the domes. When the opposite force is applied 2838, the domes distort in the other direction. Because the domes are elastic, they provide restorative force as well as a measure of damping.

Such a suspension system may require restraining means so that the cushion assembly is generally attached to the cup assembly. One means for restraining the cushion assembly is illustrated in FIGS. 29a and 29b, which show alternative perspective views of suspension system 2900, in accordance with some embodiments. As discussed in relation to FIG. 28, the suspension system may include two plates 2902 and 2904. Suspension means 2906 located between them may not inherently prevent the two plates from separating. One mechanism for performing that function is an elastic loop 2908 firmly attached to one plate and protruding through an opening 2910 in the other plate. A guiding feature 2912, such as a hook or a loop sized to hold the elastic loop 2908 firmly attached to the second plate prevents the two plates from pulling apart. Movement of the cushion relative to the baffle plate may be produced by fixing a coil to the baffle plate and a pair of transversely-polarized magnets to the stage so that energizing the coil moves the stage and the cushion attached to it.

Components of a second suitable suspension are shown in FIGS. 30a-30d. As illustrated in exploded perspective view 30a, suspension system 3000 includes an elastic ball bearing 3002 tethered in place with elastic tether 3004 so that it cannot contact the edge of the ball cage 3005. To further quiet the device, vibration of the tethers may be damped by a ring of damping material 3006. Ball cage 3005 may include features including tabs 3008 that retain damping ring 3006 and help it maintain contact with tethers 3004, and slots 3010 that may provide clearance for tethers 3004. Assembled tethered ball bearing 3012 is illustrated in FIG. 30b.

One direction a tethered ball bearing allows is axial motion transverse to the orientation of the tether. Thus as illustrated in FIG. 30c, if ball 3002 is held by tether 3004 between plates 3020 and 3022, and there is some slack 3023 in tether 3004, then movement 3024 or 3026 that is transverse to the axis of the tether will be permitted, and ball 3002 will roll until elastic restoration force in tether 3004, which is no longer slack, counters this plate movement.

Although a tether as shown in FIGS. 30a-30d appears to orient the travel of ball bearing 3002 along a single axis, tether 3004 and ball 3002 can be dimensioned to permit sufficient plate travel in both x and y.

FIG. 30d illustrates how the tethered ball bearing permits movement along the axis of tether 3004. If ball 3002 is held by tether 3004 between plates 3020 and 3022, and there is some slack in tether 3004, then movement 3024 or 3026 that is in-line with the axis of the tether will be permitted and ball 3002 will roll until elastic restoration force in tether 3004 counters this plate movement.

Figure 31:
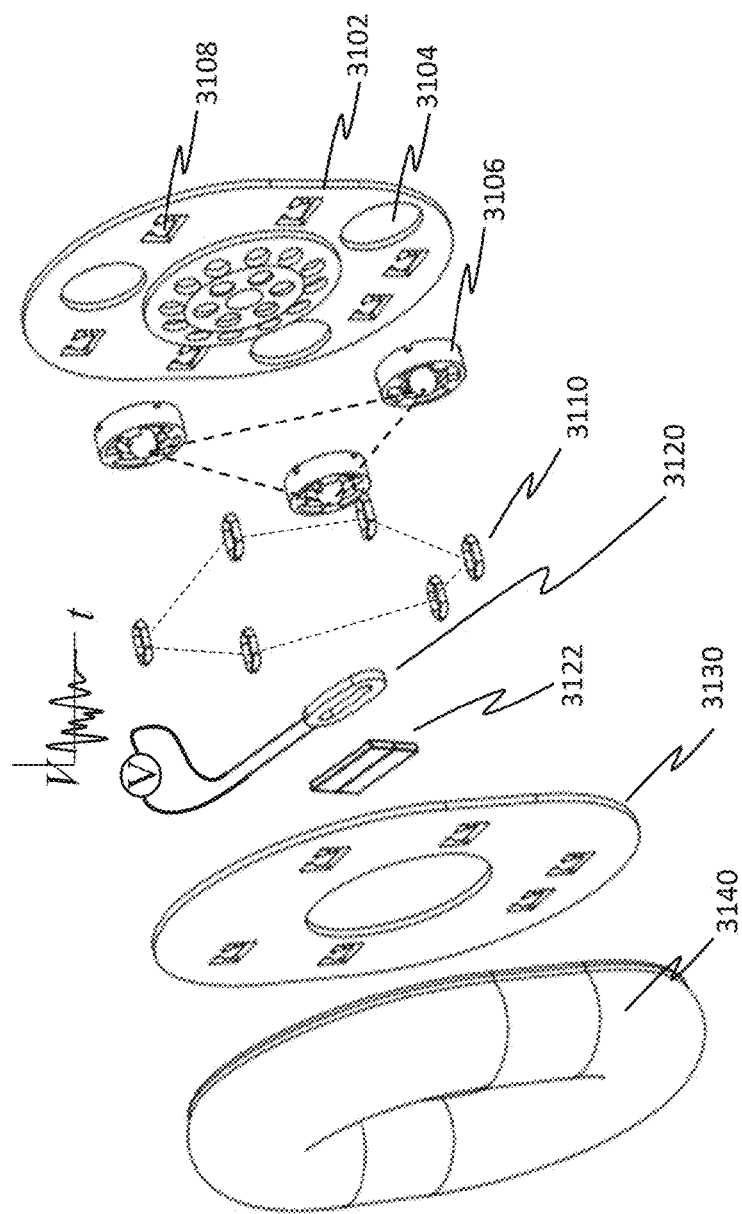
FIG. 31 shows an exploded view of an ear cup with three tethered ball bearings providing bounded relative motion, in accordance with various embodiments.

In some embodiments, multiple bearings may be arranged by receiving features in a baffle plate, so as to define a movement plane for a cushion stage. The bearings may be pre-compressed by elastic elements to prevent rattling and to elastically limit lateral travel of the stage. An exploded view of certain components of one side of a pair of headphones with three tethered ball bearings providing bounded relative motion is shown in FIG. 31.

Baffle plate 3102 attaches to main headphone structure, including the cups. It also provides locating features for other components, including recesses 3104 for each of the three bearings 3106, as well as tabs 3108 for retaining elastic pre-loading elements 3110. These pre-loading elements, which may be composed of silicone or other elastic material, may both pre-load the bearings in order to minimize noise generated by the bearings, and may also provide means for preventing separation of the overall assembly.

One or more tactors consist of at least a coil 3120 and at least a pair of magnets 3122. One of coil 3120 and magnets 3122 will be fixed relative to baffle plate 3104; the other will be fixed relative to moveable stage 3130, which is in turn attached to cushion 3140. Moveable stage 3130 may also include tabs for attaching elastic pre-loading elements 3110. When an appropriate signal is fed to coil 3120, relative motion between the two assemblies is created, limited by bearings 3106 and/or elastic preloading elements 3110.

An alternative embodiment of the tethered ball bearing would include a second tether orthogonal to the first tether and anchored to the plate that the first tether is not tethered to. This implementation would provide both the function of a bearing and the function of holding the two major assemblies together. A variation on this embodiment would use elastic tethers in addition to the elastic balls (potentially molded as a single component) so that the tethers themselves provide sufficient pre-load to address potential noise caused by relative movement of the assemblies.

Figure 32:
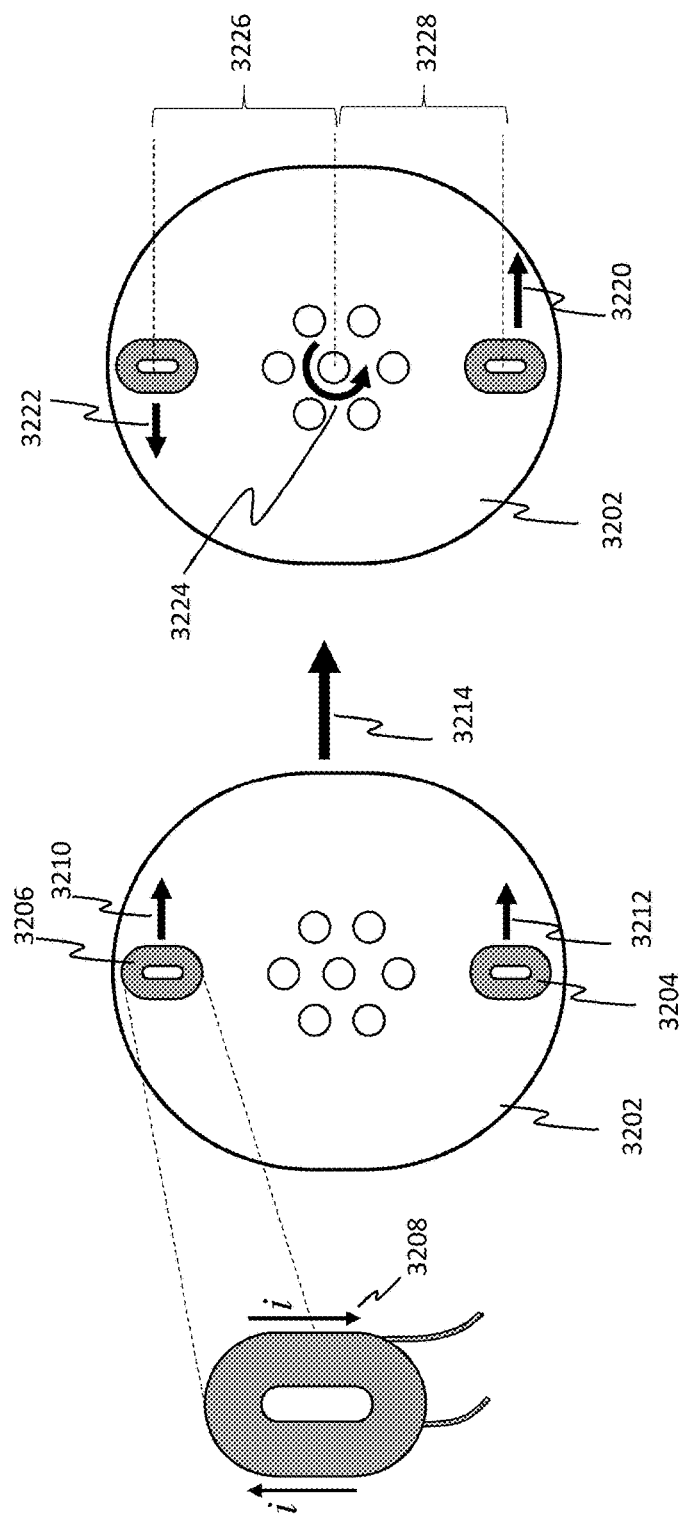
FIG. 32 shows a simplified plan view of a baffle plate, upon which conductive coils for two tactors are mounted, in accordance with various embodiments.

It is convenient that these suspensions allow translation in two axes and rotation to facilitate additional drivable degrees of freedom. For example, FIG. 32 illustrates a simplified view of baffle plate 3202, upon which the conductive coils for two tactors 3204 and 3206 are mounted. For purposes of this illustration, the magnets that form the other half of each of the tactors are assumed to be affixed to the moveable stage holding the cushion, none of which are shown for simplicity.

When current i 3208 flows through each of coil 3204 and 3206, motion relative to the magnets mounted on the opposite component is created. A positive voltage moves the system in one direction; a negative voltage moves it in the other. When two tactors are mounted as shown in FIG. 32, it is possible to produce both translation and torque.

If coil 3206 is driven to produce translational force 3210, and coil 3204 is driven to produce translational force 3212, and both force 3212 and 3210 are aligned, then the resulting action will be a translational force 3214 that is the combined force of the individual tactors (less system losses). However, if both coils are driven so that coil 3204 delivers force 3222 which is 180 degrees from force 3220 generated by coil 3706, the result is not translation but rotational movement 3224 (i.e., torque). In video games and virtual reality simulations, torque may be used, for example, to cue changes to the user's pitch orientation, such as the moment the orientation of a roller-coaster cart changes from uphill to downhill. The magnitude of that torque will depend on both the force of the individual tactors and the radii 3226 and 3228 that define the distance between each tactor and the center of rotation.

With additional coils, three degrees of freedom may be controlled individually; these may be thought of as (i) front-to-back motion, (ii) up-and-down motion, and (iii) rotation around an axis running between the wearer's ears. However, other orientations are also possible. Two exemplary coil layouts are shown, but many are possible and lie within the scope of the present invention.

FIG. 33a illustrates how various vectors of movement can be accomplished with an array of three coils, coil 3302, coil, 3304 and coil 3306. Combining signals to the three coils can produce rotational displacement when all three coils are fed the same polarity signal. Translational movement can be caused in any direction that may be described in relation to axis 3310 and axis 3320 (effectively the x and y axes) by modifying the current to the various coils.

While three tactors will be generally less expensive than four tactors as illustrated in FIG. 33b, a three-tactor system has other drawbacks. Generating the appropriate control signals is computationally slightly more expensive given the sine and cosine terms required to get x and y motion. The three-actuator array is also somewhat inefficient, due to cancellation of forces when attempting to use multiple tactors to generate translational motion. Thus when coil 3302 generates translational force 3322 and coil 3304 generates translational force 3324 the resolved force 3326 is different from either of the two original forces.

A four-tactor array is illustrated in FIG. 33b. It includes tactors 3350, 3352, 3354 and 3356. When tactor 3350 is energized to create force 3360, and tactor 3354 is energized to produce force 3362, the result is torque 3364. The magnitude of that torque will depend on both the force of the individual tactors and the radii 3370 and 3372 that define the distance between each tactor and the center of rotation. Torque 3364 can be doubled if the other two tactors also generate forces that reinforce that motion.

Translational motion can be generated in any direction along the x and y axes through various combinations of signals to the four tactors. In an example case, current through tactor 3356 generates force 3382 and current through tactor coil 3352 generates force 3380 and those two forces combine to generate the vertical component of force 3384. The horizontal component of force 3384 comes from the net difference of oppositely directed forces 3360 and 3362 produced by the other two coils. If both of these actions take place simultaneously; that is, if tactors 3352 and 3356 both generating translational force 3384, and tactors 3350 and 3354 generate rotational force 3364, the resulting force 3390 both torque and a net force vector are simultaneously produced. Combining signals in this way permits the creation of force along any vector in the plane defined by the x and y axes, and simultaneous presentation of an arbitrary torque.

Figure 34B:
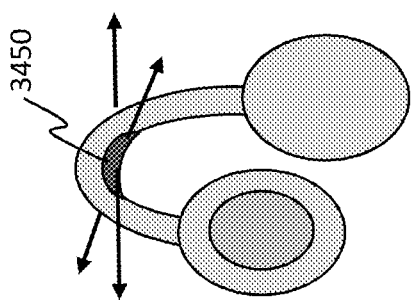
FIG. 34b shows a perspective view of tactors located in the headphone bow, in accordance with various embodiments.
Figure 34A:
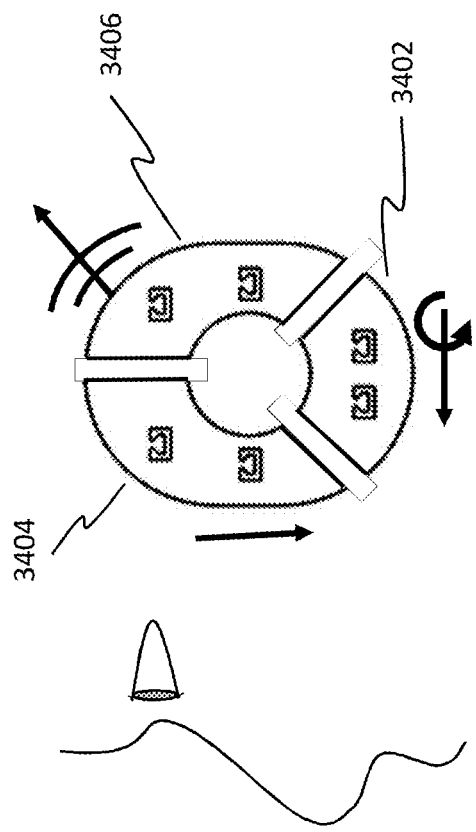
FIG. 34a shows a partial plan view of tactors mounted on separate plates, in accordance with various embodiments

As shown above tactors may be mounted on plates that move separately from the headphone cups. A further embodiment of the invention provides multiple moving segments, to provide additional tactile expressiveness, as shown in FIG. 34a. For example, a headphone cushion may be divided into three segments: stage segment 3402, stage segment 3404 and stage segment 3406. More or fewer segments can also be provided. Each segment may incorporate a single tactor, or one or more segments may incorporate multiple tactors. If each segment contains only a single tactor, segmentation provides the ability to stimulate different portions of the skin surrounding the ear. If each segment contains multiple tactors, as shown in FIG. 34a, more complex signaling can take place. As shown in FIG. 34a, segment 3402 generates torque and forward while segment 3404 generates a downward force and segment 3406 generates reciprocating forces along a third vector.

In addition to locating tactors in the cups of the headphone, it is also possible to locate them in other parts of the headphone, such as the bow connecting the cups, which often distributes the weight of the headphones to the top of the head, and thus provides another point of contact. As illustrated in FIG. 34b, tactors located in the headphone bow 3450 can be used to generate directional cueing in multiple directions as well.

One of the challenges associated with delivering taction transmitted through headphones is that the signal generator (the tactor) generally does not directly contact the skin of the user: it has to transmit its signal through the cushions used to locate the audio driver relative to the wearer's ear, and to provide comfort and (in most cases) noise isolation. Those cushions tend to consist of a pliable outer material such as leather, vinyl or fabric, and an inner component, which is generally resilient foam, but may also me comprised of liquid, air or other material. Some headphones provide only open-cell foam, and dispense with the separate outer layer. One purpose of the combined inner and outer portions of the cushion is to conform to the complex and irregular topology of the head in the immediate vicinity of the ear (or, in the case of on-ear headphones, the ear itself.) A second goal is to absorb sound—from outside the earphone, in order to provide a level of isolation, and in some cases to absorb unwanted reflections from hard surfaces inside the headphone. These goals are generally achieved by configuring the cushion assembly so that is soft and dissipative—that is, so that it will absorb vibration. This property works at cross-purposes with a tactor, in effect potentially throwing away a significant portion of the energy generated by the tactor before it reaches the listener.

When headphones include tactors as described herein, the headphone cushion may ride on a stage, moving in-plane, with the goal of applying shear taction to the skin. It may be desirable that the displacement of the stage not be consumed by the elastic compliance of the cushion. However, reducing losses by reducing compliance through existing methods is likely to cause sacrifices in the performance of the cushion in other aspects like conformance to the head or ear, sound isolation and comfort.

An aspect of the invention is to improve the performance of the taction system without significant adverse effect on the other aspects of cushion performance. This goal may be achieved by employing an anisotropic material as part of the construction of the headphone cushion; in other words, a material that is stiff in shear, so that it is effective in transmitting the shear force of the tactor(s), but still compliant and comfortable in compression. A full discussion of anisotropic linear elasticity is beyond the scope of this specification, and may be reviewed elsewhere (for example see Piaras Kelly, Solid Mechanics Lecture Notes, Part I—An Introduction to Solid Mechanics, Section 6.3, pg. 157—Anisotropic Elasticity, University of Aukland, 2013). That said, a brief explanation is required in order to be clear about the sort of anisotropic material properties the present invention teaches.

For an isotropic material, the shear modulus (G) and Elastic Modulus (E) are related by Poisson's ratio (v), which captures volumetric compressibility of the material. For an isotropic material the ratio of shear modulus to elastic modulus is:

$$\frac{G}{E} = \frac{1}{2(1+v)} \quad \text{(Eq. 6)}$$

Where $$G = \frac{F_z z_0}{A \Delta x}; \quad \text{(Eq. 7)}$$

$$E = \frac{F_z z_0}{A \Delta x}; \quad \text{(Eq. 8)}$$

G=Shear modulus, [N/m$^2$]'
$F_x$=A shear force directed along the top surface of the material, [N];
$z_0$=thickness of the material, [m];
A=Area over which the force is applied, [m$^2$];
$\Delta x$=lateral shear displacement of the top surface of the material, [m];
E=Elastic modulus (also called Young's modulus), [N/m$^2$];
$F_z$=Force directed normal to the top surface of the material, [N];
$\Delta z$=Change in thickness of the material in response to the normal force, [m]; and
v=Poisson's ratio $(\Delta x/x_0)/(\Delta z/z_0)$, which typically ranges from z=0.5 (incompressible) to z=−1 (completely compressible).

The present invention teaches headphone cushions comprised of anisotropic materials, where the ratio of shear modulus to elastic modulus is greater than it would be for an isotropic material. That is, where $$\frac{G_{xz}}{E_{zz}} = \frac{1}{2(1+v)} \quad \text{(Eq. 9)}$$

Since typical foams have Poisson's ratio around 0.3, the present invention teaches the use of materials where the unitless ratio of shear modulus to elastic modulus ($G_{xz}/E_{zz}$) is greater than 0.4. Specifically, where:
$G_{xz}$=Shear modulus in response to a lateral traction in the x-direction that is applied on the top z-surface of the material; and
$E_{zz}$=Elastic modulus in response to compressive traction in the negative z-direction on the top z-surface of the material.

The cushion material is oriented so that the (softer) z-axis of the material points at the wearer's skin, and the (stiffer)

x-axis of the material points parallel to the skin, in the direction shear forces are to be applied to the skin by the cushion. Soft materials are of particular interest. Accordingly, the present invention teaches the use of anisotropic materials with elastic modulus in the range typical of cushioning foams, 10 kPa<E<10 MPa.

A simplified cross-sectional view of the foam commonly found in headphone cushions is shown in FIG. 35a. Image 3502 is a cross-sectional view of an actual headphone cushion. It includes a backing fabric 3504, and a contact material 3506, which is what rests against the user's head or ear. Contact material 3506 may be fabric or leather or another material, with suitable comfort and appearance. Captured between backing fabric 3504 and contact material 3506 is foam 3508. Typically foam 3508 is an open cell polymer, which is more or less equally compliant in all directions. That is, the material of a conventional cushion is an isotropic foam. An illustration of a magnified cross-section of such foam is shown as 3510.

There has been at least one prior design applied to a headphone cup that may provide some anisotropic stiffness. Kokoon has marketed a design that includes a low-profile cushion support comprised of discrete flexures, as illustrated in FIG. 35b. The headphone cup includes a resilient plastic member 3520, comprising an array of separate "fingers" 3522 likely to flex so as to permit movement orthogonal to the plane of the wearer's head while resisting lateral movement along that plane. Although this construction was developed for improved ventilation and rather than shear stiffness, the geometry likely provides anisotropic stiffness. Plastic member 3520 flexes when force is applied along one axis 3524, but not when force is applied from other directions. In embodiments of the present invention, this geometry may be applied to the problem of creating anisotropic stiffness rather than providing ventilation. To be usefully applied to tactile headphones, the discrete finger geometry embodied by this prior art would likely need to be further slotted and thinned in order to provide adequate compliance in the direction orthogonal to the taction effects. And the center of the geometry would need to be removed, so that the structure was ring-shaped, to provide a cushion support, rather than a back housing. The general effect of this repurposing of the geometry into a cushion support may be inventive and is so shown in FIG. 35c.

An aspect of the subject invention that overcomes some drawbacks of art shown in FIGS. 35a and 35b is the use of one or more suitable cushion filling materials. Foams with anisotropic properties are available, and may be created through a variety of means. Good anisotropic properties are also produced by a mat with fibers oriented principally in-plane. There is already commercial production of material with suitable anisotropy. Scotch-Brite™ pads made by 3M are one example. Thermoplastic foam, heated and pulled in plane so as to orient cell walls also has suitable properties.

Figure 36:
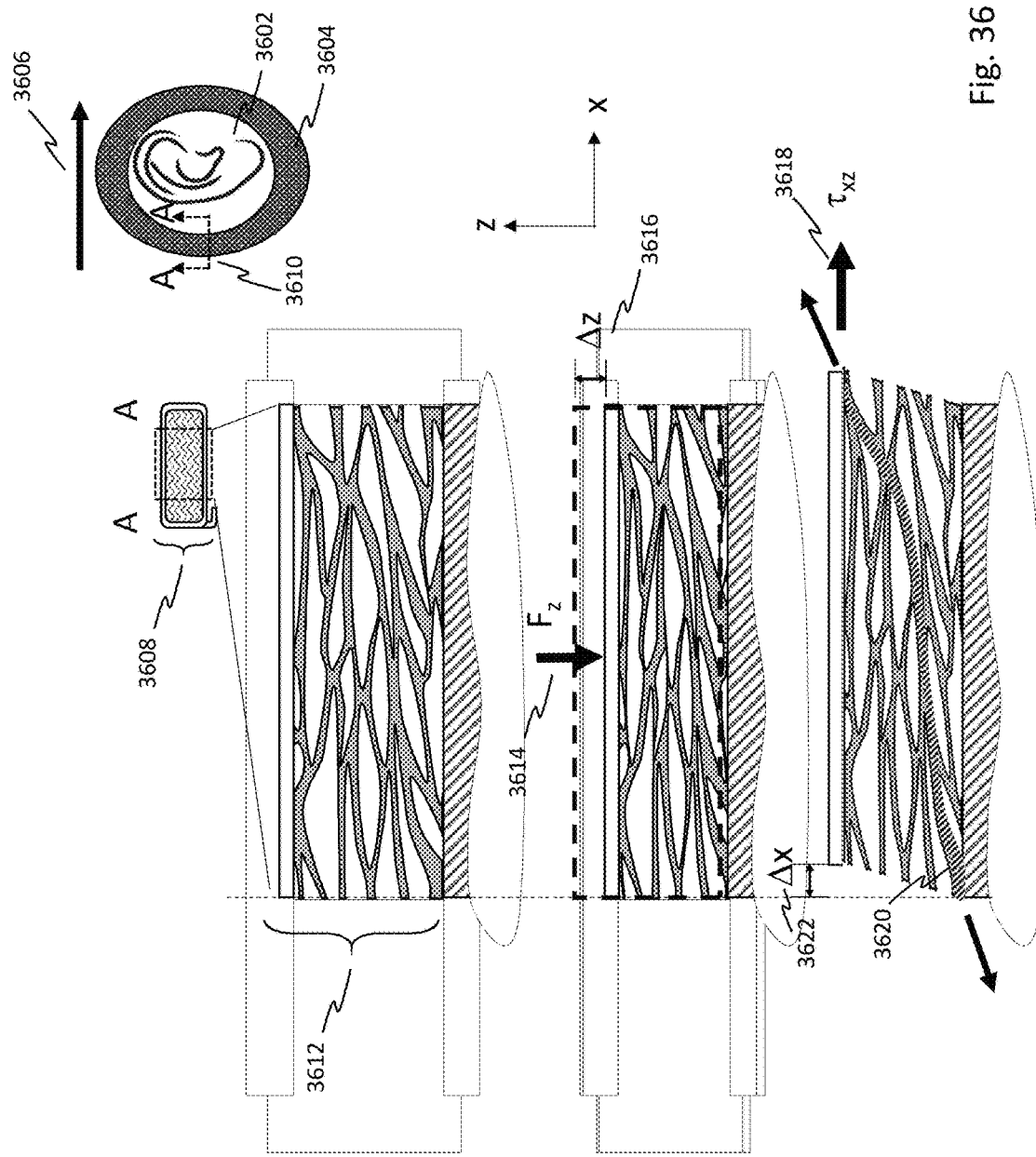
FIG. 36 shows exemplary pictorial diagrams that illustrate how an anisotropic material can enhance the taction capabilities of a headphone, in accordance with various embodiments.

FIG. 36 shows how an anisotropic material can enhance the taction capabilities of a headphone. Ear 3602 is contained within cushion 3604. Reciprocating Force 3606 shears the skin parallel to the sagittal plane. Orienting an anisotropic material within the cushion so that the cushion efficiently transmits force 3606 while remaining conformable in other directions.

Sectional view 3608 is taken from cushion 3604 through section A-A 3610. A magnified view of the material within the cushion is shown in 3612 in its relaxed state (that is, uncompressed). It illustrates a means for creating an anisotropic compressible material: its fibers (and the airspaces between these fibers) are not randomly shaped or oriented, but instead are elongated along the plane in which motion is to be resisted. Thus when force 3614 is applied transverse to the face of the cushion, material 3612 offers relatively little resistance to deformation 3616 (compression Δz). However, when shear traction 3618 is applied to cushion material 3612, multiple individual fibers such as 3620 are oriented so that they run in a plane relatively parallel to the force applied, and are relatively resistant to tensile deformation, so that overall movement 3622 (lateral displacement Δx) is relatively small. Thus a headphone cushion comprising an anisotropic material will improve the efficiency with which the output of tactors is conveyed to the skin of the person wearing tactor-equipped headphones.

Another aspect of the invention is a tactor capable of both inertial and impact actuation in multiple degrees of freedom. Inertial actuation may be thought of as the generation of vibrations with a tactor over a range of motion in which the relation between input signal and output is relatively linear—that is, that an increase in the magnitude of the input signal (generally measured in voltage) results in a proportionate increase in forces generated by the tactor. As a practical matter, a tactor as described in as disclosed previously in application Ser. No. 14/864,278, now issued as U.S. Pat. No. 9,430,921, will perform in inertial mode so long as its displacement does not cause it to make contact with its frame.

When a tactor is driven with enough energy to cause it to make contact with its frame, the tactor is operating as an impact device. In impact mode, additional input force does not materially increase travel. The difference is illustrated in FIG. 37a. Applied force is shown on the y-axis and displacement is shown on the x-axis. In the inertial range 3702, displacement increases in a linear fashion with increasing input signal. In the impact range 3704, the moving mass of the tactor has exceeded the travel of its suspension system, and additional force will not significantly increase travel.

Single-axis impact tactors are already known from prior art, but can make noise unsuitable for headphones. They generally include a metal moving mass and a frame made of metal or other material, and the transition from inertial to impact mode creates undesirable noises as the mass hits the frame. Metal-to-metal collisions are particularly loud. Accordingly, an aspect of the invention is an inertial/impact tactor suspended by collapsible elastic elements that change spring rate more smoothly than a metal-to-metal collision, thereby minimizing acoustic noise.

FIG. 37b illustrates a simplified exploded view of the relevant mechanical components of a tactor without such collapsible elastic elements. Moving mass 3710 is held within frame 3712, and is restrained from movement other than that in the desired plane by end plates 3714 and 3716. When inertial travel limits are exceeded, mass 3710 will collide with frame 3712, generating unwanted noise.

FIG. 37c illustrates a perspective view of an embodiment of the collapsible elastic element 3720. One possible embodiment is a hollow cylinder made of silicone or another resilient and flexible material.

FIG. 37d shows a sectional view of a tactor in which eight such collapsible elements 3720 locate and suspend the moving mass 3710 inside frame 3712. Magnets 3722 are oriented to enable the mass 3710 to move along the axis 3724. As mass 3710 travels along that axis, the two collapsible elements 3720 on one end compress against frame 3712, while the two collapsible elements 3720 on the other end expand.

The four collapsible elements on the sides orthogonal to the compressing and elongating collapsible elements are free to roll in order to maintain contact with both the frame 3712 and the mass 3710. Collapsible elements 3720 also provide a method for delivering impact taction while suppressing the undesirable noise associated with contact between hard surfaces. Where a tactor without a suspension such as described herein would sharply transition between inertial and impact regions with an audible "click" or other similar noise, collapsible elements 3720 may offer a smoother transition, permitting effective use of impact taction. If a fully relaxed collapsible element is round cylinder 3730, when force is applied a partially compressed collapsible element will begin to flatten 3732. If sufficient force is applied, the collapsible element will fully collapse 3734. If the collapsible element is made of a material that is itself compressible, such as silicone or similar materials, then additional force may provide slightly greater travel. However, the collapsible elements may also be made of incompressible materials, such as string steel. In that case it is possible that the collapsible element would reach a point at which no (relevant) force will yield additional travel.

A further advantage of this arrangement of compressible elements is that motion in multiple degrees of freedom is supported. FIG. 37e illustrates one means by which this may be achieved. Frame 3740 and moving mass 3742 may be substantially similar to those shown in FIG. 37c. In order to generate movement along two axes, two motors are provided; this may be achieved magnet pair 3744 and magnet pair 3746, which is oriented orthogonally relative to magnet pair 3744. (Also required are two separate conductive coils, not shown for clarity.) Magnets 3744 (and their associated coil) provide motion along axis 3748; magnets 3746 (and their associated coil) provide motion along axis 3750. Such embodiments will also permit torsional taction, as well as more complex cueing involving hybrids of linear and torsional cueing.

FIGS. 38a and 38b show detailed cross sectional and exploded views of a tactor, in accordance with some embodiments. Moving mass 3802 is located within frame 3804 as well as top cover 3806 and bottom cover 3808. Additional components related to the suspension of the mass include eight elastic elements 3810, as well as top retainer plate 3812 and bottom retainer plate 3814, both of which are fixed to moving mass 3802, and are used to retain elastic elements 3810. Each retainer plate includes four tabs or hooks 3816.

In this embodiment, elastic elements 3810 are beveled 3820 on both ends so that the elastic element has a short side and a long side. Elastic elements 3810 are oriented in the assembly so that the long side 3822 contacts the frame 3804 and the short side 3824 faces the moveable mass 3802. The reason for the bevel is highlighted in the detail view 3840. It provides the clearance that allows the mass 3802 and retainer plates 3812 and 3814 to move without scraping against cover plates 3806 and 3808.

Mass 3802 moves within frame 3804. Moving mass 3802 is fixed to retainer plates 3812 and 3814, which move with moving mass 3802. Each of the four hooks 3816 on the top retainer plate 3812 inserts into the cylinder of a respective elastic element 3810 from the top; each of the four hooks 3816 on the bottom retainer plate 3814 inserts into the cylinder of a respective elastic element 3810 from the bottom, so that each of the eight cylinders is retained by one hook.

It should be noted that multiple variations on the embodiments described are contemplated. Elastic members may be made of any resilient material, including metals that can function as springs. Elastic members may be shapes other than cylinders, such as leaf springs, coil springs, foam cubes, or other shapes and materials. Tactors and their housing can be shaped in a variety of forms other than squares or rectangles, such as circles, toroids, sections of toroids, etc. More or fewer elastic members may be used to suspend the mass and to elastically limit travel.

Together and separately, these improvements enhance perception of bass and improve spatialization of sound. Benefits for spatial reaction time and hearing health are demonstrated, in addition to numerous other benefits as previously described.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

It is also to be understood that the following claims are intended to cover all of the generic and specific features of the invention herein described, and all statements of the scope of the invention that, as a matter of language, might be said to fall there between.

The systems described herein, or portions thereof, can be implemented as a computer program product or service that includes instructions that are stored on one or more non-transitory machine-readable storage media, and that are executable on one or more processing devices to perform or control the operations described herein. The systems described herein, or portions thereof, can be implemented as an apparatus, method, or electronic system that can include one or more processing devices, parallel processing devices, and memory to store executable instructions to implement various operations.

What is claimed is:

1. An apparatus for generating tactile directional cues to a user via electromagnetically actuated motion, the apparatus comprising a first ear cup configured to be located proximate to a first one of the user's ears and a second ear cup configured to be located proximate to a second one of the user's ears, each ear cup comprising:
    a vibration module that produces motion in a plane substantially parallel to the sagittal plane of a user's head;
    a cushion in physical contact with the vibration module, wherein the vibration module of each ear cup is independently addressable, and wherein electrical signals delivered simultaneously to each vibration module produce independent vibration profiles in each vibration module which, when applied to the user's skin, produce a directionally indicative tactile sensation, wherein the electrical signals comprise:
    a first sinusoidal signal directed to the vibration module of the first ear cup; and
    a second sinusoidal signal directed to the vibration module of the second ear cup, wherein the second sinusoidal signal is offset in time from the first sinusoidal signal, and wherein the second sinusoidal signal begins more than 20 ms after the first sinusoidal signal begins.

2. The apparatus of claim 1, wherein the electrical signals comprise:
    a first sinusoidal signal directed to the vibration module of the first ear cup; and a second sinusoidal signal directed to the vibration module of the second ear cup, wherein an amplitude of the second sinusoidal signal is less than an amplitude of the first sinusoidal signal.

3. The apparatus of claim 1, wherein each ear cup further comprises a second vibrational module that produces motion in the plane substantially parallel to the sagittal plane of a user's body, and wherein the second vibrational module of each ear cup is independently addressable with respect to the other vibrational modules.

4. An apparatus for generating tactile directional cues to a user via electromagnetically actuated motion, the apparatus comprising a first ear cup configured to be located proximate to a first one of the user's ears and a second ear cup configured to be located proximate to a second one of the user's ears, each ear cup comprising:
   a vibration module that produces motion in a plane substantially parallel to the sagittal plane of a user's head; and
   a cushion in physical contact with the vibration module, wherein the vibration module of each ear cup is independently addressable, and wherein electrical signals delivered simultaneously to each vibration module produce independent vibration profiles in each vibration module which, when applied to the user's skin, produce a directionally indicative tactile sensation,
   wherein each ear cup further comprises a second vibrational module that produces motion in the plane substantially parallel to the sagittal plane of a user's body, and wherein the second vibrational module of each ear cup is independently addressable with respect to the other vibrational modules, and wherein:
      the first vibrational module of each ear cup is configured to be located in an anterior direction relative the user's ear; and
      the second vibration module of each ear cup is configured to be located in a posterior direction relative to the user's ear.

5. The apparatus of claim 4, wherein:
   each ear cup further comprises a third and a fourth vibrational module that produce motion in the plane substantially parallel to the sagittal plane of a user's body, and wherein the third and fourth vibrational modules of each ear cup are independently addressable with respect to the other vibrational modules.

6. An apparatus for generating tactile directional cues to a user via electromagnetically actuated motion, the apparatus comprising a first ear cup configured to be located proximate to a first one of the user's ears and a second ear cup configured to be located proximate to a second one of the user's ears, each ear cup comprising:
   a vibration module that produces motion in a plane substantially parallel to the sagittal plane of a user's head; and
   a cushion in physical contact with the vibration module, wherein the vibration module of each ear cup is independently addressable, and wherein electrical signals delivered simultaneously to each vibration module produce independent vibration profiles in each vibration module which, when applied to the user's skin, produce a directionally indicative tactile sensation,
   wherein each ear cup further comprises a second vibrational module that produces motion in the plane substantially parallel to the sagittal plane of a user's body, and wherein the second vibrational module of each ear cup is independently addressable with respect to the other vibrational modules, and
   wherein each ear cup further comprises a third and a fourth vibrational module that produce motion in the plane substantially parallel to the sagittal plane of a user's body, and wherein the third and fourth vibrational modules of each ear cup are independently addressable with respect to the other vibrational modules, and wherein:
      the third vibrational module of each ear cup is configured to be located in an superior direction relative the user's ear; and
      the fourth vibration module of each ear cup is configured to be located in an inferior direction relative to the user's ear.

7. The apparatus of claim 6, wherein the electrical signals accelerate at least one of the vibration modules more quickly when said waveform is moving in one direction and more slowly when the waveform is moving in the opposite direction.

8. The apparatus of claim 7, wherein the electrical signals direct the at least one of the vibration modules to vibrate with a velocity represented by a substantially sawtooth-shaped graph.

9. An apparatus for generating tactile directional cues to a user via electromagnetically actuated motion, the apparatus comprising a first ear cup configured to be located proximate to a first one of the user's ears and a second ear cup configured to be located proximate to a second one of the user's ears, each ear cup comprising:
   a vibration module that produces motion in a plane substantially parallel to the sagittal plane of a user's head; and
   a cushion in physical contact with the vibration module, wherein the vibration module of each ear cup is independently addressable, and wherein electrical signals delivered simultaneously to each vibration module produce independent vibration profiles in each vibration module which, when applied to the user's skin, produce a directionally indicative tactile sensation;
   each ear cup comprising:
      a conductive coil;
      a pair of magnets aligned with the magnetic field generated by said conductive coil;
      a stationary member comprising and one of the pair of magnets and the conductive coil;
      a moveable member comprising the other of the pair of magnets and the conductive coil;
      a cushion coupled directly to the moveable member;
      a suspension that guides said moveable member and the cushion with respect to stationary member; and
      a damping member in communication with said moveable member.

10. An ear cup for generating tactile directional cues to a user via electromagnetically actuated motion, comprising:
   a conductive coil;
   a pair of magnets aligned with the magnetic field generated by said conductive coil;
   a stationary member comprising one of the pair of magnets and the conductive coil;
   a moveable member comprising the other of the pair of magnets and the conductive coil;
   a cushion directly coupled to the moveable member;
   a suspension that that guides said moveable member and the cushion with respect to stationary member; and
   a damping member in communication with said moveable member.

11. The ear cup of claim 10, further comprising:
a second conductive coil configured to generate a magnetic field that has an orientation that is substantially orthogonal to the orientation of the magnetic field generated by the conductive coil;
and a pair of magnets aligned with the magnetic field generated by said second conductive coil, wherein:
the stationary member comprises one of the second pair of magnets and the second conductive coil;
wherein the moveable member comprises the other of the second pair of magnets and the second conductive coil.

12. The ear cup of claim 10, the cushion comprising:
a compressible material having a first dimension and a second dimension, wherein:
- the second dimension is orthogonal to said first dimension;
- the compressible material has a compressive stiffness in the first dimension and a different shear stiffness in the second dimension, wherein the difference in compressive stiffness and shear stiffness arise from material anisotropy by use of a material where the ratio of shear modulus to elastic modulus exceeds 0.4 and the elastic modulus is in the range 10 kPa-10 MPa; and
- the compressible material has a modulus of compression in the first dimension that is greater than its modulus of compression in said second dimension.

13. The ear cup of claim 10, the suspension comprising:
a plurality of elastic domes coupled to the stationary member, wherein the moveable member comprises a plurality of projecting bosses, each projecting boss partially deforming a corresponding elastic dome.

14. The ear cup of claim 13, wherein the plurality of elastic domes are filled with a fluid that damps audible vibrations.

15. The ear cup of claim 10, the suspension comprising:
an annular ball cage fixedly coupled to one of the stationary member and the moveable member; and
an elastic ball located within the annular ball cage, the elastic ball contacting the stationary member and the moveable member.

16. The ear cup of claim 15, the suspension further comprising:
a tether coupling the elastic ball to the ball cage such that the elastic ball cannot directly contact the ball cage.

* * * * *